US010395187B2

(12) United States Patent
Weyl et al.

(10) Patent No.: US 10,395,187 B2
(45) Date of Patent: Aug. 27, 2019

(54) MULTILEVEL ASSIGNMENT OF JOBS AND TASKS IN ONLINE WORK MANAGEMENT SYSTEM

(75) Inventors: Stephen Weyl, Los Altos Hills, CA (US); Daniel J. Elenbaas, Woodinville, WA (US); Rajesh Krishnan, San Francisco, CA (US)

(73) Assignee: CLEARSHIFT CORPORATION, Kirkland, WA (US)

(*) Notice: Subject to any disclaimer, the term of this patent is extended or adjusted under 35 U.S.C. 154(b) by 0 days.

(21) Appl. No.: 12/368,796

(22) Filed: Feb. 10, 2009

(65) Prior Publication Data

US 2009/0204470 A1 Aug. 13, 2009

Related U.S. Application Data

(60) Provisional application No. 61/027,576, filed on Feb. 11, 2008, provisional application No. 61/056,389, filed on May 27, 2008, provisional application No. 61/056,387, filed on May 27, 2008, provisional application No. 61/056,390, filed on May 27, 2008, provisional application No. 61/056,392, filed on May 27, 2008, provisional application No. 61/074,761, filed on Jun. 23, 2008, provisional application No. 61/074,778, filed on Jun. 23, 2008, provisional application No. 61/075,504, filed on Jun. 25, 2008, provisional application No. 61/075,502, filed on Jun. 25, 2008, provisional application No. 61/080,622, filed on Jul. 14, 2008, provisional application No.

(Continued)

(51) Int. Cl.
*G06Q 10/06* (2012.01)

(52) U.S. Cl.
CPC ....... *G06Q 10/06* (2013.01); *G06Q 10/06311* (2013.01)

(58) Field of Classification Search
CPC ......................... G06Q 10/06; G06Q 10/06311
USPC ............................................ 705/8, 7.11–7.42
See application file for complete search history.

(56) References Cited

U.S. PATENT DOCUMENTS

| | | | | |
|---|---|---|---|---|
| 5,717,865 | A | 2/1998 | Stratmann | |
| 5,765,140 | A * | 6/1998 | Knudson | G06Q 10/06311 705/7.15 |
| 5,790,645 | A | 8/1998 | Fawcett et al. | |
| 6,101,481 | A * | 8/2000 | Miller | G06Q 10/06311 705/7.13 |

(Continued)

OTHER PUBLICATIONS

PCT International Search Report and Written Opinion; International Application No. PCT/US 09/33690; dated Mar. 23, 2009; 12 pages.

(Continued)

*Primary Examiner* — Foloshade Anderson
(74) *Attorney, Agent, or Firm* — Patent Law Works LLP

(57) ABSTRACT

An online work management system provides a marketplace for multiple job owner and workers. The job owners provide a job description that defines task. The job description may be processed to generate task descriptions that may be published for workers' application. The task descriptions specify the qualification or restrictions for workers to have the task assigned. The online work management system also provides various functions supporting coordination and management of task assignment such as determining the trust level of the user's identity, search the tasks or workers, monitoring the progress of job, managing payment to workers, training and testing the workers, evaluating the review by the job owners, and generation of surveys.

6 Claims, 48 Drawing Sheets

Related U.S. Application Data

61/080,625, filed on Jul. 14, 2008, provisional application No. 61/080,638, filed on Jul. 14, 2008.

(56) References Cited

U.S. PATENT DOCUMENTS

| | | | | |
|---|---|---|---|---|
| 6,601,048 | B1 | 7/2003 | Gavan et al. | |
| 6,801,606 | B1 | 10/2004 | Edwards | |
| 6,871,181 | B2 | 3/2005 | Kansal | |
| 6,952,678 | B2 | 10/2005 | Williams et al. | |
| 7,069,229 | B1 * | 6/2006 | Richardson | G06Q 10/06311 705/7.15 |
| 7,082,430 | B1 * | 7/2006 | Danielsen | G06F 17/30575 |
| 7,155,400 | B1 * | 12/2006 | Jilk | G06Q 10/06 705/7.14 |
| 7,155,435 | B1 * | 12/2006 | Day | G06Q 10/00 715/751 |
| 7,181,438 | B1 | 2/2007 | Szabo | |
| 7,313,531 | B2 | 12/2007 | Chappel et al. | |
| 7,315,826 | B1 | 1/2008 | Guheen et al. | |
| 7,318,038 | B2 | 1/2008 | Labbi | |
| 7,343,316 | B2 | 3/2008 | Goto et al. | |
| 7,379,880 | B1 | 5/2008 | Pathria et al. | |
| 7,406,432 | B1 * | 7/2008 | Motoyama | G06Q 10/06 705/7.16 |
| 7,487,115 | B2 | 2/2009 | Clark | |
| 7,490,086 | B2 | 2/2009 | Joao | |
| 7,587,367 | B2 | 9/2009 | Mengerink | |
| 7,668,800 | B2 * | 2/2010 | Motoyama | G06Q 10/06 707/718 |
| 7,676,483 | B2 * | 3/2010 | Klug | G06Q 10/06 703/6 |
| 7,734,491 | B2 * | 6/2010 | Kayahara | G06Q 10/06313 705/7.23 |
| 7,774,742 | B2 * | 8/2010 | Gupta | G06Q 10/06 717/100 |
| 8,099,312 | B2 * | 1/2012 | Jin | G06Q 10/06 705/7.17 |
| 8,300,798 | B1 | 10/2012 | Wu et al. | |
| 8,554,601 | B1 | 10/2013 | Marsh et al. | |
| 8,595,041 | B2 | 11/2013 | Schmidt | |
| 8,606,611 | B1 * | 12/2013 | Fedorov | G06Q 10/06 705/7.13 |
| 9,652,992 | B2 * | 5/2017 | Kaleal, III | G09B 5/02 |
| 2002/0059130 | A1 | 5/2002 | Cheng et al. | |
| 2002/0065700 | A1 | 5/2002 | Powell et al. | |
| 2002/0078007 | A1 * | 6/2002 | Herrero | G06Q 10/10 |
| 2002/0138402 | A1 | 9/2002 | Zacharia et al. | |
| 2002/0194112 | A1 | 12/2002 | dePinto et al. | |
| 2003/0004783 | A1 | 1/2003 | Calderaro et al. | |
| 2003/0014463 | A1 * | 1/2003 | Togawa | G06F 9/4887 718/100 |
| 2003/0055705 | A1 | 3/2003 | Kilpatrick | |
| 2003/0088534 | A1 * | 5/2003 | Kalantar | G06Q 10/06 706/50 |
| 2003/0120586 | A1 | 6/2003 | Litty | |
| 2003/0152212 | A1 | 8/2003 | Burok et al. | |
| 2003/0182171 | A1 | 9/2003 | Vianello | |
| 2003/0236692 | A1 * | 12/2003 | Hertel-Szabadi | G06Q 10/06 705/7.14 |
| 2004/0078330 | A1 | 4/2004 | Henry | |
| 2004/0148275 | A1 | 7/2004 | Achlioptas | |
| 2004/0176993 | A1 | 9/2004 | Rajasingham | |
| 2004/0210470 | A1 * | 10/2004 | Rusk | G06Q 10/06311 705/7.15 |
| 2004/0261013 | A1 * | 12/2004 | Wynn | G06Q 10/10 715/229 |
| 2005/0005111 | A1 | 1/2005 | Brebner et al. | |
| 2005/0027585 | A1 | 2/2005 | Wodtke et al. | |
| 2005/0080656 | A1 | 4/2005 | Crow | |
| 2005/0209902 | A1 | 9/2005 | Iwasaki et al. | |
| 2005/0210285 | A1 | 9/2005 | Williams | |
| 2006/0009994 | A1 | 1/2006 | Hogg et al. | |
| 2006/0031177 | A1 | 2/2006 | Rule | |
| 2006/0036456 | A1 | 2/2006 | Wu | |
| 2006/0042483 | A1 | 3/2006 | Work et al. | |
| 2006/0053043 | A1 * | 3/2006 | Clarke | G06Q 10/06311 705/7.17 |
| 2006/0069658 | A1 | 3/2006 | Haller et al. | |
| 2006/0106675 | A1 | 5/2006 | Cohen et al. | |
| 2006/0143068 | A1 | 6/2006 | Calabria | |
| 2006/0167784 | A1 | 7/2006 | Hoffberg | |
| 2006/0173724 | A1 | 8/2006 | Trefler et al. | |
| 2006/0178918 | A1 | 8/2006 | Mikurak | |
| 2006/0182029 | A1 | 8/2006 | Kealy et al. | |
| 2006/0212925 | A1 | 9/2006 | Shull et al. | |
| 2006/0229902 | A1 | 10/2006 | McGovern et al. | |
| 2006/0229933 | A1 | 10/2006 | Stith | |
| 2006/0230039 | A1 | 10/2006 | Shull et al. | |
| 2006/0235783 | A1 | 10/2006 | Ryles et al. | |
| 2006/0252479 | A1 | 11/2006 | Lydon et al. | |
| 2006/0282835 | A1 * | 12/2006 | Bascom | G06Q 10/109 718/100 |
| 2007/0078699 | A1 | 4/2007 | Scott et al. | |
| 2007/0079136 | A1 | 4/2007 | Vishik et al. | |
| 2007/0083283 | A1 | 4/2007 | Ara et al. | |
| 2007/0106582 | A1 | 5/2007 | Baker et al. | |
| 2007/0107057 | A1 | 5/2007 | Chander et al. | |
| 2007/0124579 | A1 | 5/2007 | Haller | |
| 2007/0136178 | A1 | 6/2007 | Wiseman et al. | |
| 2007/0150327 | A1 * | 6/2007 | Dromgold | G06F 17/30551 705/7.17 |
| 2007/0208613 | A1 | 9/2007 | Backer | |
| 2007/0226033 | A1 * | 9/2007 | LoPresti | G06Q 10/06 705/7.15 |
| 2007/0244734 | A1 | 10/2007 | McGovern et al. | |
| 2007/0244736 | A1 * | 10/2007 | Johnson | G06Q 10/0633 705/7.21 |
| 2007/0282658 | A1 * | 12/2007 | Brintle | G06Q 10/06 705/7.15 |
| 2007/0294339 | A1 | 12/2007 | Ala-Kleemola et al. | |
| 2008/0059267 | A1 * | 3/2008 | Hamilton | G06Q 10/00 705/7.15 |
| 2008/0077515 | A1 | 3/2008 | Zoldi et al. | |
| 2008/0086342 | A1 | 4/2008 | Curry et al. | |
| 2008/0091471 | A1 | 4/2008 | Michon et al. | |
| 2008/0091681 | A1 | 4/2008 | Dwivedi et al. | |
| 2008/0114629 | A1 | 5/2008 | Pavlov | |
| 2008/0189164 | A1 | 8/2008 | Wiseman et al. | |
| 2008/0189724 | A1 | 8/2008 | Tien et al. | |
| 2008/0244744 | A1 | 10/2008 | Thomas et al. | |
| 2008/0301296 | A1 * | 12/2008 | York | G06Q 10/06 709/225 |
| 2008/0306806 | A1 * | 12/2008 | Van Wyk | G06Q 10/06 705/7.26 |
| 2009/0049443 | A1 | 2/2009 | Powers et al. | |
| 2009/0063242 | A1 * | 3/2009 | Shaouy | G06Q 10/06 705/7.14 |
| 2009/0132689 | A1 | 5/2009 | Zaltzman et al. | |
| 2009/0144308 | A1 | 6/2009 | Hule et al. | |
| 2009/0164282 | A1 | 6/2009 | Goldberg | |
| 2009/0172776 | A1 | 7/2009 | Makagon et al. | |
| 2009/0199185 | A1 | 8/2009 | Slawson et al. | |
| 2009/0204470 | A1 * | 8/2009 | Weyl | G06Q 10/06 705/7.13 |
| 2010/0030779 | A1 | 2/2010 | Tan | |
| 2012/0054281 | A1 * | 3/2012 | Westmoreland | G06N 3/006 709/205 |
| 2012/0278117 | A1 * | 11/2012 | Nguyen | G06Q 10/06 705/7.15 |
| 2013/0024231 | A1 * | 1/2013 | Gordon | G06Q 10/06 705/7.17 |
| 2014/0288987 | A1 * | 9/2014 | Liu | G06Q 10/06 705/7.15 |
| 2014/0289022 | A1 * | 9/2014 | Kamiya | G06Q 10/06398 705/7.42 |

OTHER PUBLICATIONS

"VeriSign Identity Protection Fraud Detection Service: An Overview"; 2006; VeriSign, Inc.; 13 pages.

(56) References Cited

OTHER PUBLICATIONS

Monster.com Introduces Monster 2000; New Site Launch Features Innovative Technology, New Interface and Design Business/ Technology Editors. Business Wire. New York: Feb. 8, 2000. 5 pgs.
Maps of Somerset Coutny, PA and nrearby Allegany County, MD, korns org wepages, undated. Http://koms.org/misc/Southampton_map_index.html http://koms.org/misc/Deakins-Survey/annotated-1939-MD-Map.jpg.
Mrs. Bowie, The Hunger Games, Film editing, wordpress webpages, Oct. 12, 2012 https://hungergames4b3.wordpress.com/2012/10/12/fast-and-slow-editing/.
Flip book—Wikipedia, the free encyclopedia, wikipedia webpages, Dec. 12, 2008 https://web.archive.org/web/20081212053323/ http://en.wikipedia.org/wiki/Flip_book.

* cited by examiner

ClearShift (logo)    Home    About ClearShift    For Workers    For Job Owners    My Account    Contact Us Returning user? Sign in!

Username [ ]

Password [ ]

GO

Job Registration: Start

Choose from one of our Job templates:

- Modify Image / Audio / Video / Document File
- Product / Service / Media Promotion (AdverPloyment)
- Proofreading – General Document Review
- Proofreading – Resume Cover Letter Proofreading
- Transcription
- Translation
- Legal – Contract Review
- Legal – Create New Company Procedure (Company Type TBD)
- Legal – Create C Corporation
- Legal – Create S Corporation Procedure
- Legal – Create LLC Creation Procedure
- Legal – Create LLP Creation Procedure
- Legal – Will & Estate Procedure
- Legal – Consulting Contract Drafting
- Legal – General Contract Drafting
- Auditing – Restaurant
- Auditing – Trademark
- Auditing – Franchise

— 502

[Submit]

[link to Template for selected Type]

Copyright statement    Patents Pending    Terms of Use    Site Map    Privacy Statement
(need text for each item)

500

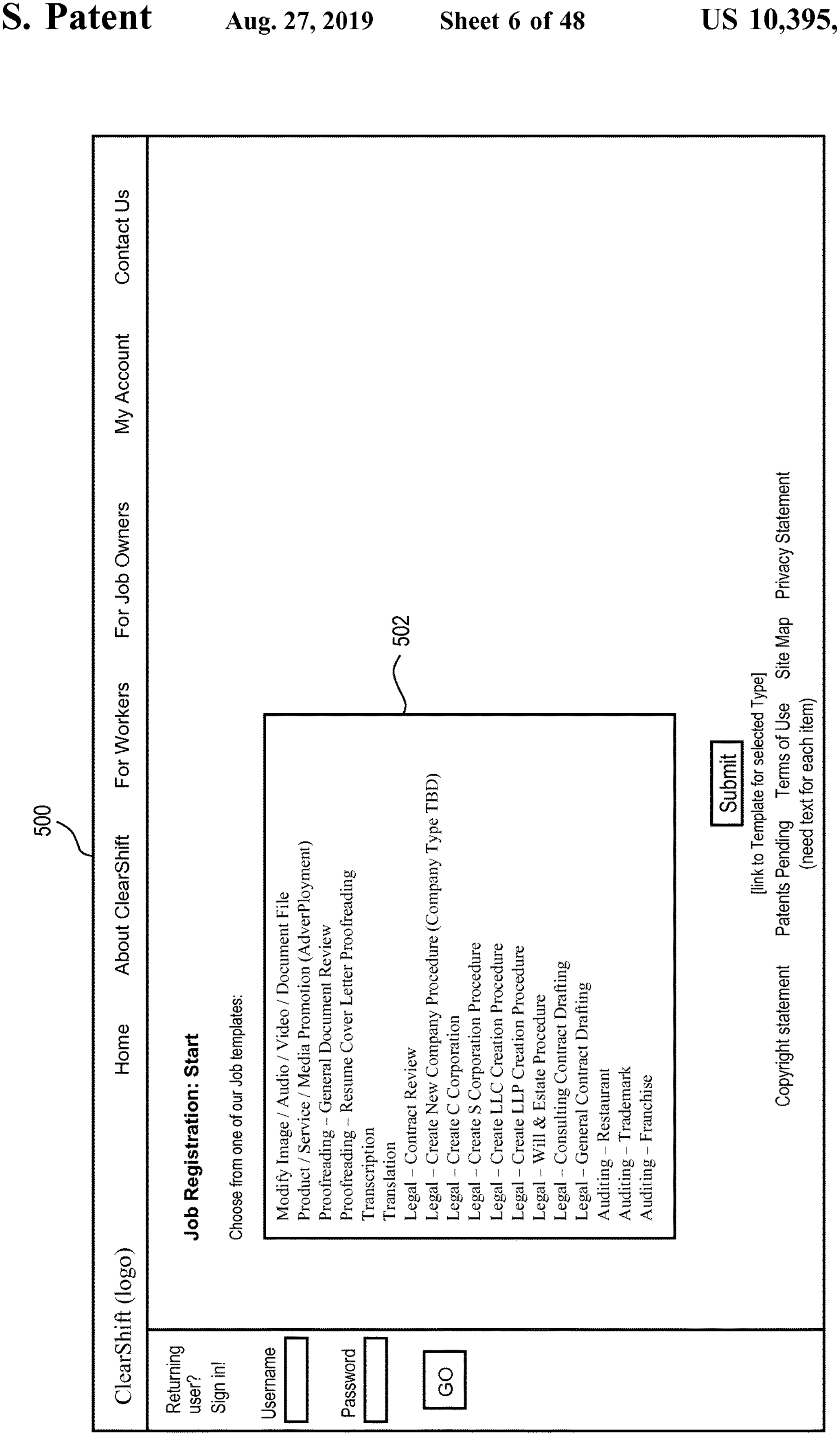

FIG. 5A

ClearShift (logo)    Home    About ClearShift    For Workers    For Job Owners    My Account    Contact Us Returning user? Sign in!

Username: [        ]

Password: [        ]

[ GO ]

Custom Job: Job Tasks

ClearShift organizes work into "Jobs" and "Tasks." A "Job" is an overall piece of work that you would like to accomplish. Each Job can be composed of one – or many – Tasks which can work individually or in combination to accomplish your Job! For example, a "Job" might be "Translate this audio file", but it might be broken into two separate Tasks: Task 1: Translate the audio file, and Task 2: Review the written translation and check for grammatical and spelling mistakes. As the Job Owner, you might specify that a bilingual Worker performs the translation while a native English speaker checks for grammatical and spelling mistakes.

The outputs of one Task can be the inputs to another Task. This is called "Linked Tasks" and a series of Linked Tasks can complete a "Job."

There are two general rules that define whether one Task is separate from another Task. Tasks should be separated if:
1) The Worker prerequisites for one Task are significantly different than the Worker prerequisites for another Task
2) There are benefits from having different Workers to different parts of the Job Does your Job have one Task or many Tasks (don't worry – you can always change your answer later) List Tasks in the order in which they will be performed.

○ One Task   ● More than One Task

516 ↗ Click here to chat with a ClearShift representative for job design tips!

Please name each Task in your job. You can always change this later! —512

| Task # | Task Name |        |        |        |        |        |        |        |        |        |        |        |
|--------|-----------|--------|--------|--------|--------|--------|--------|--------|--------|--------|--------|--------|
|        |           |        |        |        |        |        |        |        |        |        |        |        |

510

[ Submit ]

Copyright statement    [link to Custom Job. Specify Worker Requirements]
Patents Pending    Terms of Use    Site Map    Privacy Statement
(need text for each item)

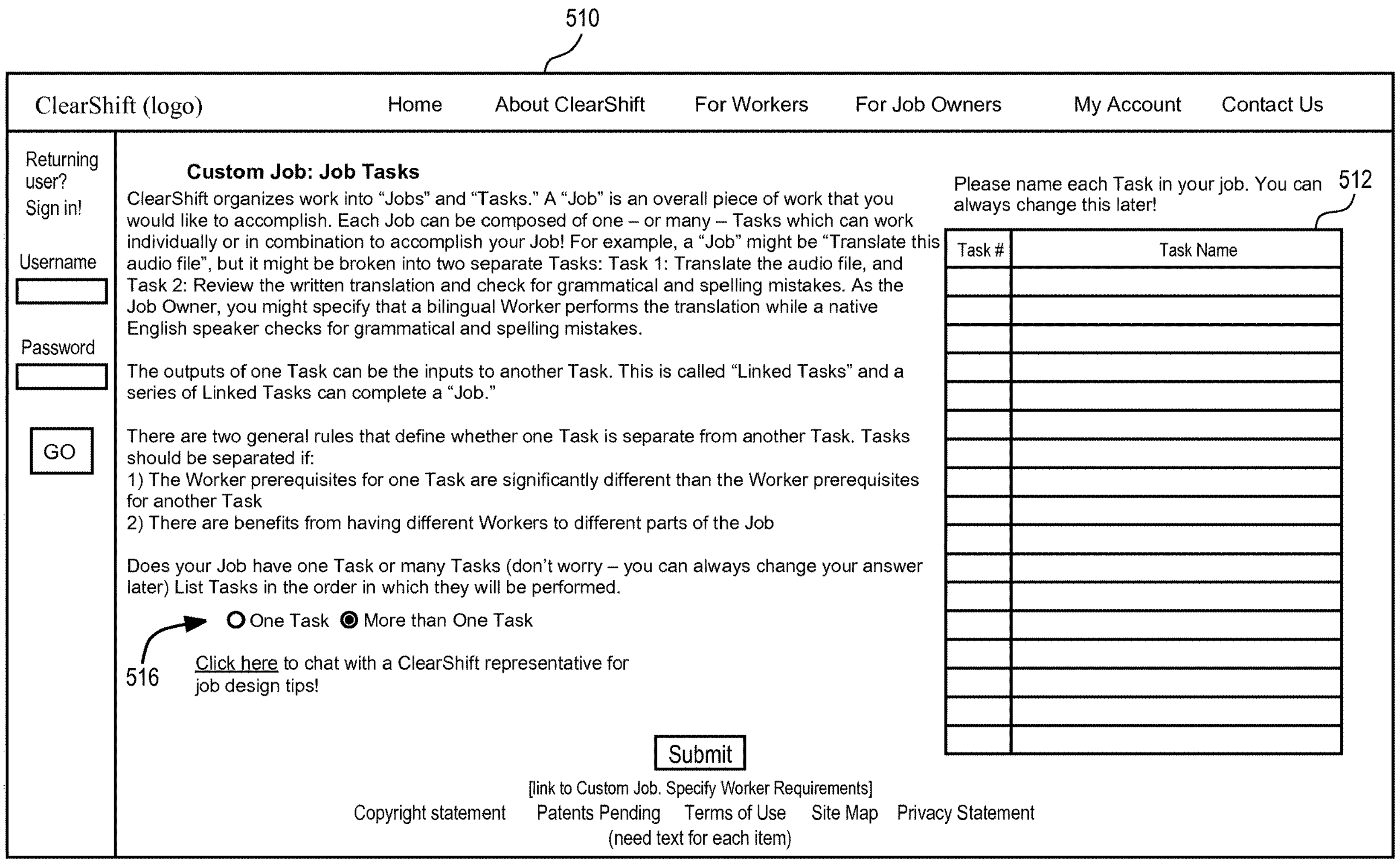

FIG. 5B

ClearShift (logo)         Home      About ClearShift      For Workers      For Job Owners      My Account Returning user? Sign in!

Username: [        ]

Password: [        ]

[GO]

Custom Job: Specify Job and Tasks

[Job Name] Task n [Task Name]

You have successfully defined Worker qualifications for the Job. "[Job Name]" / Task [X]: [Task Name]. What would you like these Workers to do?

Define Job Inputs

{
Please provide the directions for these Workers. You can type them into the Text Box below, or attach a file.
Type Directions Here: [Text Box]
Or, attach file here: [Text Box] [Browse]

Upon choosing to execute this Task, how much time does the qualified Worker have to complete the Task?
Days: [Text Box] Hours: [Text Box]

Name your File: [Text Box]

What type of file have you attached?
  Audio      Video      Document

How much time will it take to [read/watch/listen] to the attached file? [Text Box]

What directions would you like to provide to the Worker associated with this file? [Text Box]
Click here to attach additional files.

Advanced: Click here if you would like to create a data feed that electronically feeds files to ClearShift for repeated high-volume Tasks.
} 552

[Submit]

Copyright statement    [link to Monitoring and Quality Assurance]
                       Patents Pending    Terms of Use    Site Map    Privacy Statement
                       (need text for each item)

550

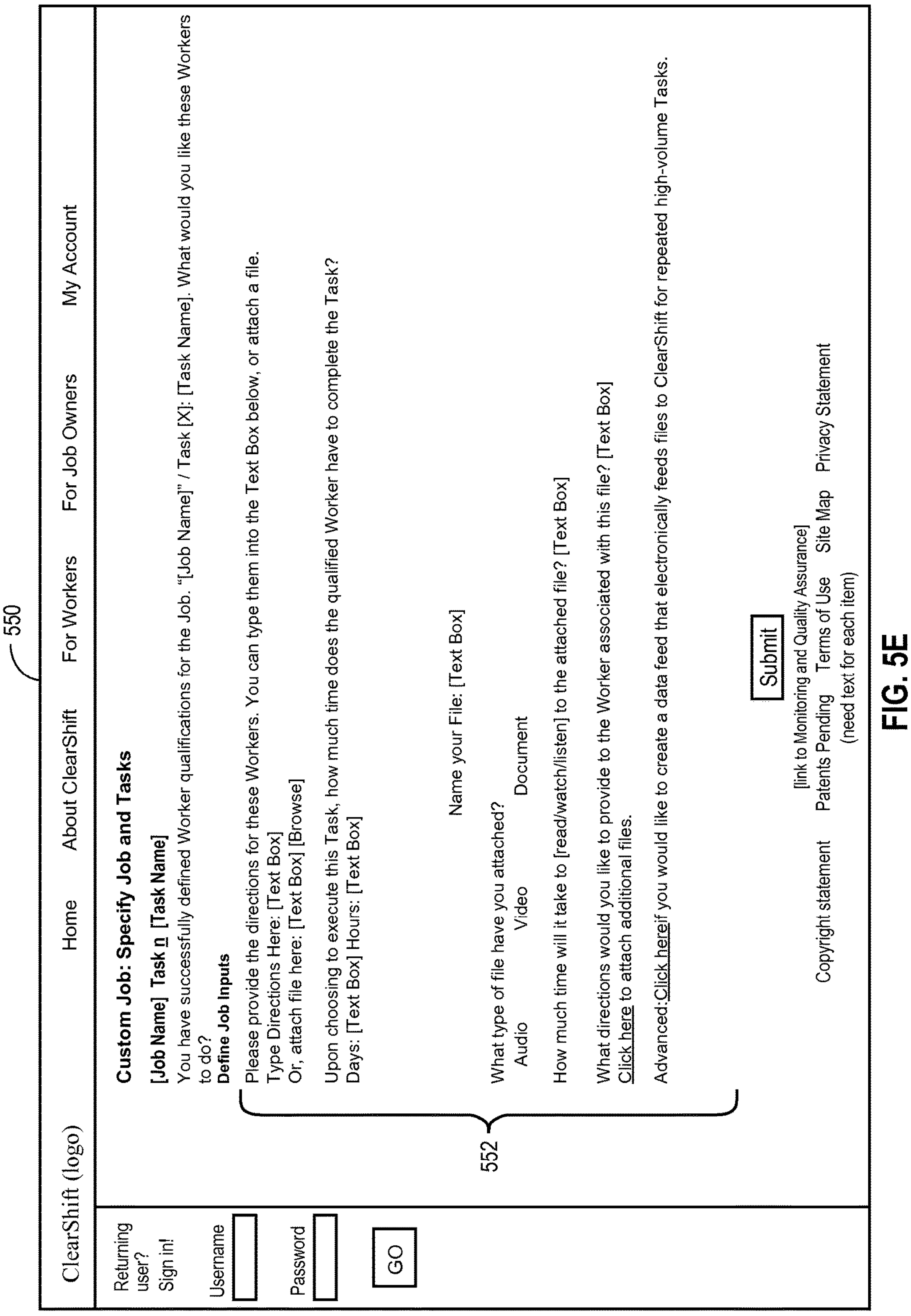

FIG. 5E

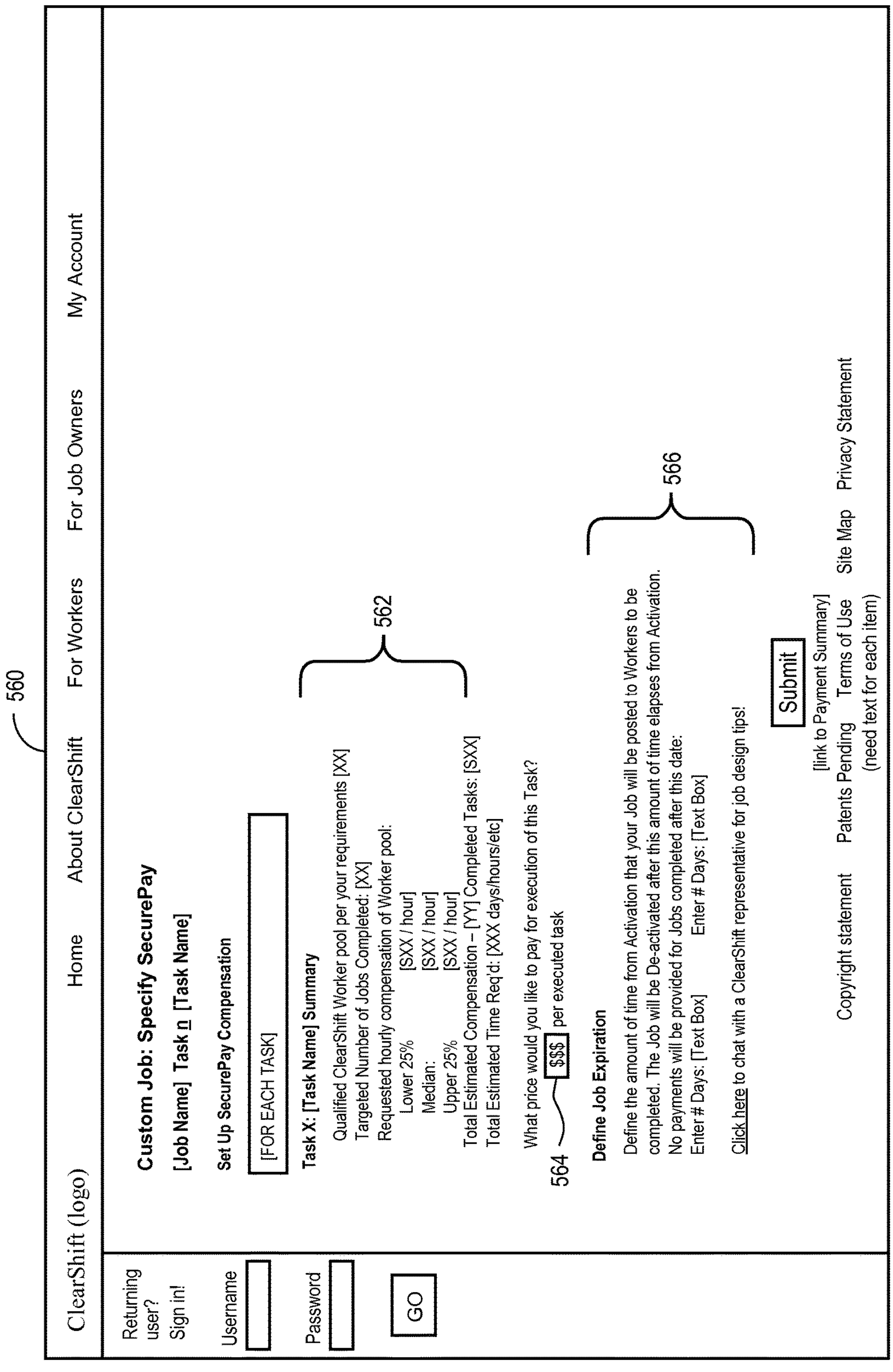

FIG. 5F

ClearShift (logo)   Home   About ClearShift   For Workers   For Job Owners   My Account

/— 560

Returning user?
Sign in!

Custom Job: Specify SecurePay
[Job Name] Task n [Task Name]

Set Up SecurePay Compensation

Username [         ]

Password [         ]

[FOR EACH TASK]

[ GO ]

Task X: [Task Name] Summary
  Qualified ClearShift Worker pool per your requirements [XX]
  Targeted Number of Jobs Completed: [XX]
  Requested hourly compensation of Worker pool:
    Lower 25%:   [$XX / hour]
    Median:      [$XX / hour]
    Upper 25%:   [$XX / hour]
  Total Estimated Compensation – [YY] Completed Tasks: [$XX]
  Total Estimated Time Req'd: [XXX days/hours/etc]                    } 562

What price would you like to pay for execution of this Task?
564 —— [$$$] per executed task

Define Job Expiration
Define the amount of time from Activation that your Job will be posted to Workers to be
completed. The Job will be De-activated after this amount of time elapses from Activation.
No payments will be provided for Jobs completed after this date:
Enter # Days: [Text Box]   Enter # Days: [Text Box]                    } 566

Click here to chat with a ClearShift representative for job design tips!

[ Submit ]

[link to Payment Summary]
Copyright statement   Patents Pending   Terms of Use   Site Map   Privacy Statement
                                   (need text for each item)

612

| Job Table | | |
|---|---|---|
| Field | Type | Size |
| Nick Name | TXT | 24 |
| Type(s) | ARR | 64 |
| User ID source | PTR | |
| PID source Contact | PTR | |
| User ID provider | PTR | |
| PID provider Contact | PTR | |
| ProjectDataFolder | PTR | |
| Job/Task ID | INT | 64 |
| Comments | TXT | 256 |
| Status | INT | |
| Sec Clear | INT | |
| Geogr. | INT | |
| Subprojects | PTR | |

614

| Task Table | | |
|---|---|---|
| Field | Type | Size |
| Nick Name | TXT | 24 |
| Type(s) | ARR | 64 |
| User ID source | PTR | |
| PID source Contact | PTR | |
| User ID provider | PTR | |
| PID provider Contact | PTR | |
| ProjectDataFolder | PTR | |
| Job/Task ID | INT | 64 |
| Comments | TXT | 256 |
| Status | INT | |
| Sec Clear | INT | |
| Geogr. | INT | |
| Subprojects | PTR | |

616

| Subtask Table | | |
|---|---|---|
| Field | Type | Size |
| Nick Name | TXT | 24 |
| Type(s) | ARR | 64 |
| User ID source | PTR | |
| PID source Contact | PTR | |
| User ID provider | PTR | |
| PID provider Contact | PTR | |
| ProjectDataFolder | PTR | |
| Job/Task ID | INT | 64 |
| Comments | TXT | 256 |
| Status | INT | |
| Sec Clear | INT | |
| NULL | | |

FIG. 6A

ClearShift (logo)    Home    About ClearShift    For Workers    For Job Owners    My Account

— 1740

Returning user? Sign in!

Username [ ]

Password [ ]

[GO]

Custom Job: Monitoring and Quality Assurance

[Job Name] Task n [Task Name]

ClearShift's Monitoring and Quality Assurance functionality automatically helps you monitor and verify progress and quality and also allows you to customize how you would like to oversee completion of your job.*

You have specified discretionary approval processes for the following Tasks:

[ list output specifications in which approval is contingent on approval at Job Owner discretion (by Job Owner) ]

☐ I will be a Reviewer on behalf of [Job Owner Name].*

☐ Search for [Org. Name] staff that will be tasked with reviewing the reviews provided by Workers.*
   [Text Box]

☐ Invite staff at [Org. Name] to register with ClearShift by entering their email address here. We will send them an email so that they can register to provide reviews for these tasks.
   [Text Box]

[Submit]

[link to Monitoring and Quality Assurance (Continued)]

Copyright statement    Patents Pending    Terms of Use    Site Map    Privacy Statement
(need text for each item)

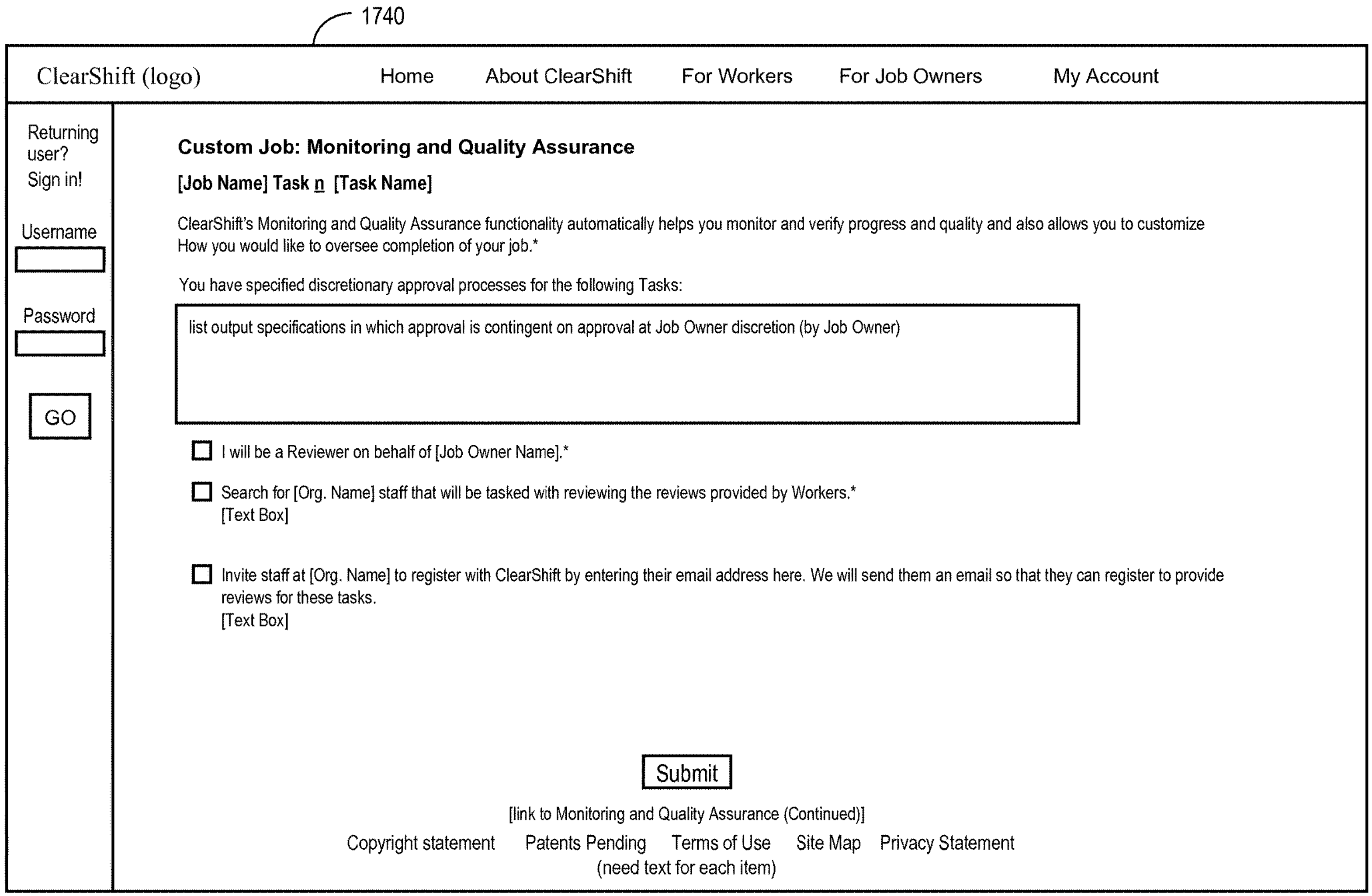

FIG. 17C

ClearShift (logo)　　　Home　　About ClearShift　　For Workers　　For Job Owners　　My Account Returning user? Sign in!

Username: [ ]

Password: [ ]

[GO]

BigCorp Job Management ——1754

List each Job Name],[Job Description][Date Job Activated]
[List each TASK under each JOB]　　　　　　　　　1752

Number of Jobs completed
　Number of Jobs outstanding (to be completed)
　Total Compensation per Job: [Sum of compensation for all Tasks]      ⎫
　% of Jobs Completed                                                    ⎬ —1756
　Job expiration Date: [Expiration Date][Edit]                           ⎭
　Obtain results / Reports [GO TO "Job results / Reports"]
1760　[TOGGLE]: Activate Job / Deactivate Job   ↙1758

For each Task display next to the [Task Name]:
- "(Independent)" if the Task is independent, OR
- "(Dependent on Task X, Task Y)" where the variables are the task numbers on which the Task is Dependent Under each Task, display:
　Number of Jobs completed
　Number of Jobs outstanding (to be completed)
　% of Tasks Completed
　Specified compensation per task

[Edit Task – Worker Qualifications][To page in Job Registration]
[Edit Task – Task Definition][To page in Job Registration]
[Edit Task – Compensation][To page in Job Registration]

[TOGGLE]: Activate Task / deactivate Task

Copyright statement　Patents Pending　Terms of Use　Site Map　Privacy Statement
(need text for each item)

——1750

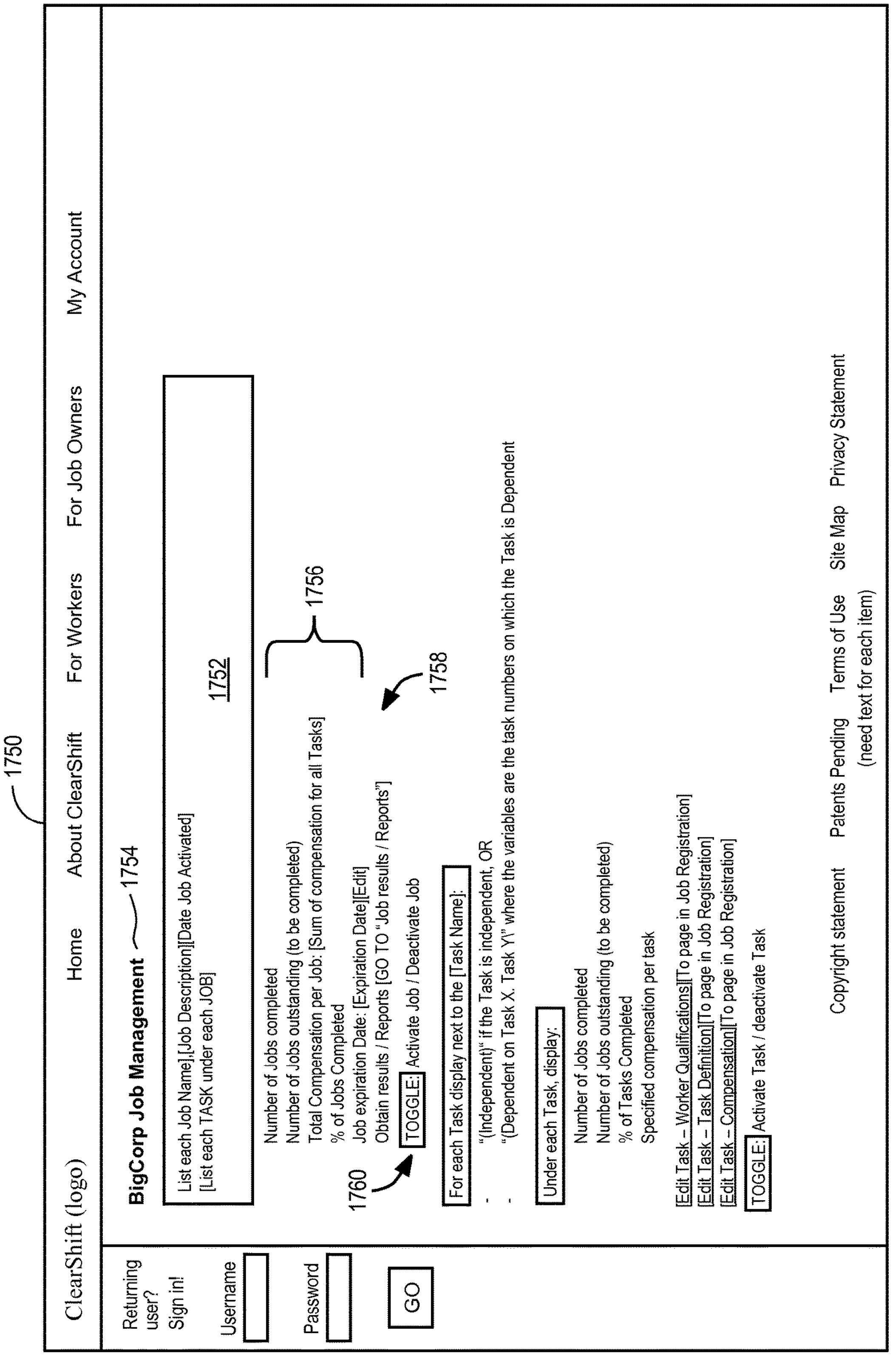

FIG. 17D

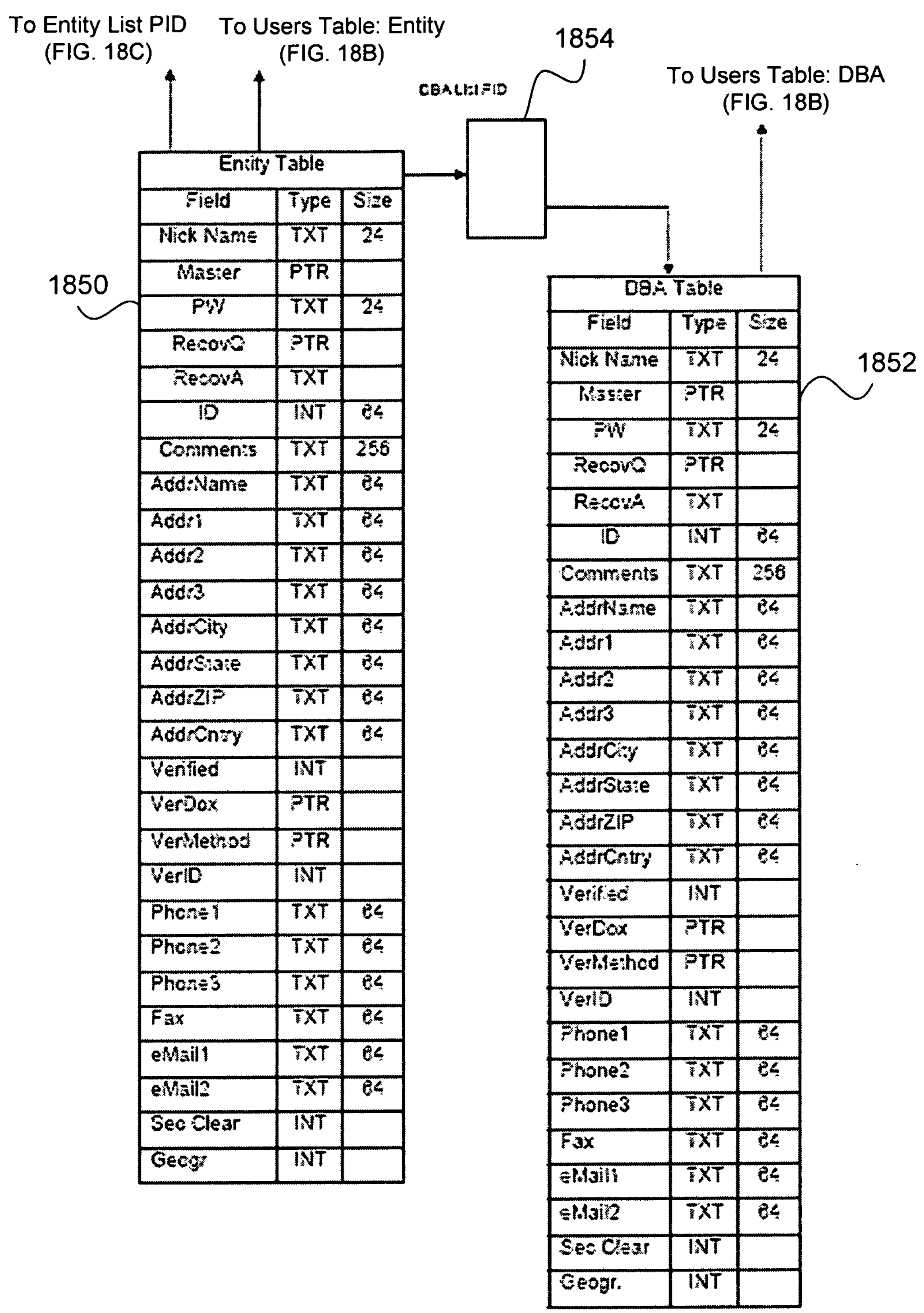

Entity Table

| Field | Type | Size |
|---|---|---|
| Nick Name | TXT | 24 |
| Master | PTR | |
| PW | TXT | 24 |
| RecovQ | PTR | |
| RecovA | TXT | |
| ID | INT | 64 |
| Comments | TXT | 256 |
| AddrName | TXT | 64 |
| Addr1 | TXT | 64 |
| Addr2 | TXT | 64 |
| Addr3 | TXT | 64 |
| AddrCity | TXT | 64 |
| AddrState | TXT | 64 |
| AddrZIP | TXT | 64 |
| AddrCntry | TXT | 64 |
| Verified | INT | |
| VerDox | PTR | |
| VerMethod | PTR | |
| VerID | INT | |
| Phone1 | TXT | 64 |
| Phone2 | TXT | 64 |
| Phone3 | TXT | 64 |
| Fax | TXT | 64 |
| eMail1 | TXT | 64 |
| eMail2 | TXT | 64 |
| Sec Clear | INT | |
| Geogr | INT | |

DBA Table

| Field | Type | Size |
|---|---|---|
| Nick Name | TXT | 24 |
| Master | PTR | |
| PW | TXT | 24 |
| RecovQ | PTR | |
| RecovA | TXT | |
| ID | INT | 64 |
| Comments | TXT | 256 |
| AddrName | TXT | 64 |
| Addr1 | TXT | 64 |
| Addr2 | TXT | 64 |
| Addr3 | TXT | 64 |
| AddrCity | TXT | 64 |
| AddrState | TXT | 64 |
| AddrZIP | TXT | 64 |
| AddrCntry | TXT | 64 |
| Verified | INT | |
| VerDox | PTR | |
| VerMethod | PTR | |
| VerID | INT | |
| Phone1 | TXT | 64 |
| Phone2 | TXT | 64 |
| Phone3 | TXT | 64 |
| Fax | TXT | 64 |
| eMail1 | TXT | 64 |
| eMail2 | TXT | 64 |
| Sec Clear | INT | |
| Geogr. | INT | |

FIG. 18D

MULTILEVEL ASSIGNMENT OF JOBS AND TASKS IN ONLINE WORK MANAGEMENT SYSTEM

CROSS-REFERENCE TO RELATED APPLICATIONS

This application claims priority under 35 U.S.C. § 119(e) to U.S. Provisional Patent Application No. 61/027,576 entitled "On-Line System for Job/Task Scheduling, Distribution, and Fulfillment" filed on Feb. 11, 2008; U.S. Provisional Patent Application No. 61/056,389 entitled "Method and System for Reputation Measurement and Management in an Online Micro-work Management System" filed on May 27, 2008; U.S. Provisional Patent Application No. 61/056,387 entitled "Method and System for User Interface in an Online Micro-Task Environment Management System" filed on May 27, 2008; U.S. Provisional Patent Application No. 61/056,390 entitled "Method and System for Worker Preparation in an Online Micro-Work Management System" filed on May 27, 2008; U.S. Provisional Patent Application No. 61/056,392 entitled "Method and System for Assigning Location Specific Tasks in an Online Micro-Work Management System" filed on May 27, 2008; U.S. Provisional Patent Application No. 61/074,761 entitled "Method and System for Job Creation in an Online Micro-Work Management System" filed on Jun. 23, 2008; U.S. Provisional Patent Application No. 61/074,778 entitled "Enhanced Method and System for Managing Financial and Risk Aspects in an Online Micro-Work Management System" filed on Jun. 23, 2008; U.S. Provisional Patent. Application No. 61/075,504 entitled "Enhanced Method and System for Job Execution in an Online Micro-Work Management System" filed on Jun. 25, 2008; U.S. Provisional Patent Application No. 61/075,502 entitled "Enhanced Method and System for Security in an Online Micro-Work Management System" filed on Jun. 25, 2008; U.S. Provisional Patent Application No. 61/080,622 entitled "Enhanced Method and System for Integrating Software Functionality into an Online Micro-Work Management System" filed on Jul. 14, 2008; U.S. Provisional Patent Application No. 61/080,625 entitled "Enhanced Method and System for Integrating Software Functionality into an Online Micro-work Management System" filed on Jul. 14, 2008; and U.S. Provisional Patent Application No. 61/080,638 entitled "Enhanced Method and System for Evaluation and Feedback in an Online Micro-Work Management System" filed on Jul. 14, 2008, which are incorporated by reference herein in their entirety.

BACKGROUND OF THE INVENTION

1. Field of the Invention

This invention relates generally to establishing a market place for workers and job owners, and more specifically to coordinating jobs or tasks among a plurality of job owners and workers online.

2. Description of the Related Art

The last quarter of the twentieth century and the twenty-first century have seen increasing numbers of workers seeking employment, and employers offering employment in temporary jobs. Temporary work agencies for a long time have provided the services of matching up temporary or transient workers with job owners. At best, such existing agencies were only able to provide workers for the most general of positions, which results in high turnover and a significant inconsistency between the qualifications of the workers and the needs of the position. Furthermore, temporary job agencies are finding it increasingly difficult to meet demands for workers looking for flexible working conditions. Higher flexibility and smaller tasks make the coordination of jobs between a job owner and a worker even more difficult. The higher flexibility means that the work agencies must spend more time and effort to find workers and job owners that need each other. Further, as the size of the tasks becomes smaller, the complexity f managing such tasks increases. The increased complexity and cost makes it difficult to create a marketplace for small tasks.

SUMMARY OF THE INVENTION

Embodiments disclose a method and a system for managing a job in an online work management system that allows a job to be divided into more than one level of tasks and subtasks. A job as defined by a job description and is divided into one or more tasks. A task is a separable unit of work that can be assigned to different users. At least one task as defined by a task description is divided into two or more subtasks. Based on the job description, one or more task descriptions each defining a task are generated. The task description may specify the restrictions and qualifications of a worker eligible to work on the task. The task is assigned to a user based on the task description. The work management system supports assigning at least part (i.e., subtask) of the assignment to another user.

In one embodiment, the subtask description defining the subtask is generated based on a task description defining the task. The subtask description specifies the restrictions and qualifications of a worker eligible to work on the subtask. Based on the subtask description, the subtask may be assigned to a user.

In one embodiment, the user assigned the task may be a general contractor who performs part of task and assigns the rest of the task as subtasks to other users. The general contractor may review, assess and modify the results of the subtasks, and combine the results of the subtasks for submission to the job owner.

In one embodiment, the identity of job owner and/or users applying for tasks or subtask is made anonymous in the work management system to conceal their identity. The job owner and/or other users may prefer to hide their true identity for various reasons. This has the advantage of allowing jobs, tasks or subtasks originating from the job owner to be offered to other users who are members of the same organization as the job owner without revealing the identity of the job owner or the other users to facilitate efficient distribution of tasks and subtasks.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 5A is a graphic representation of a user interface for receiving a job registration from a job owner, according to one embodiment.

FIG. 5B is a graphic representation of a user interface for receiving the descriptions of tasks associated with a job, according to one embodiment.

FIG. 5E is a graphic representation of a user interface for defining a task, according to one embodiment.

FIG. 5F is a graphic representation of a user interface for receiving information with respect to compensation for a task, according to one embodiment.

FIG. 6A is a diagram illustrating data structures for storing job or task descriptions, according to one embodiment.

FIG. 17C is a graphic representation of a user interface displayed for setting up a process to monitor the progress of a job or task, according to one embodiment.

FIG. 17D is a user interface displayed for allowing a job owner to confirm the status of tasks, according to one embodiment.

FIG. 18D is a diagram illustrating relationships between an entity table, a DBA (Doing Business As) table and related data structures, according to one embodiment.

DETAILED DESCRIPTION OF THE EMBODIMENTS

Figure 1:
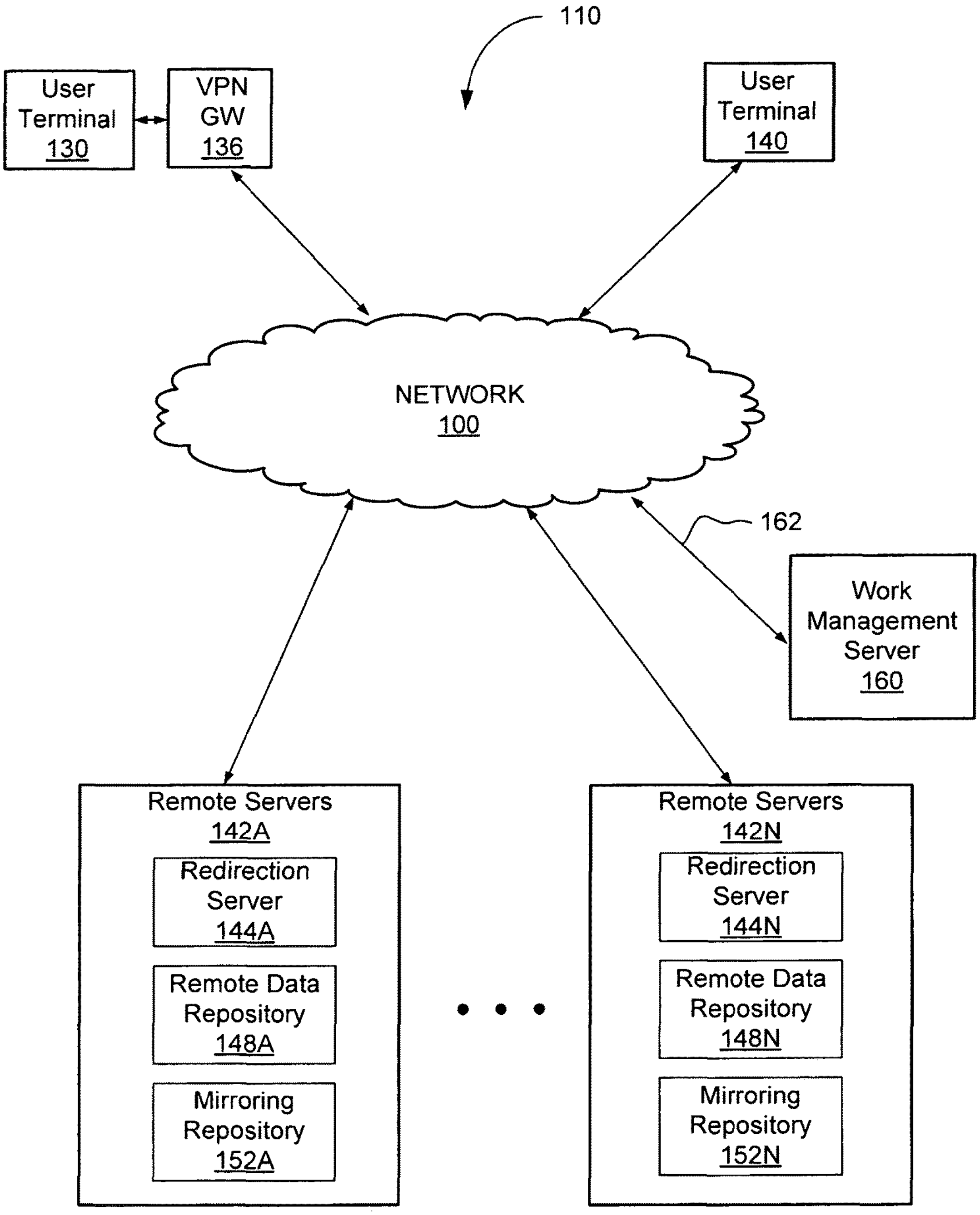
FIG. 1 is a diagram illustrating components of a work management system communicating over a network, according to one embodiment.

Embodiments relate to providing various functions associated with the creation of a marketplace for job owners and workers, and managing the assignment of jobs and tasks to one or more workers. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment," "an embodiment" or "the embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, a personal digital assistant (PDA), a cellular telephone or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, flash memory or drives, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Architecture of Work Management System

FIG. 1 is a block diagram illustrating the components of a work management system 110 communicating over a network 100, according to one embodiment. The work management system 110 includes, among other components, a work management server 160 and user terminals 130, 140. A user accesses the work management server 160 via a network 100. A communication link 162 links the work management server 160 to the network 100. In one embodiment, the work management server 160 stores the data associated with work management in its local data repository 240. Alternatively, at least part of the data associated with the work management is stored in a distributed manner in remote servers 142A through 142N (hereinafter collectively referred to as "the remote servers 142").

Each set of remote servers 142 may be located in distinct geographic locations or jurisdictions remote from the work management server 160. Due to various legal constraints or practical reasons associated with, for example, preferences of job owners, security, and government regulations, certain restricted data must be retained within certain geographies. By locating the remote servers 142 in such geographic locations or jurisdictions and storing the restricted data in certain remote servers 142, such legal constraints or practical needs for storing the data in a particular geographic location or jurisdiction are addressed. In one embodiment, the remote servers 142 include, among other servers, redirection servers 144A through 144N (hereinafter collectively referred to as "the redirection servers 144"), remote data repositories 148A through 148N (hereinafter collectively referred to as "the remote data repository 148"), and mirroring repositories 152A through 152N (hereinafter collectively referred to as "the mirroring repositories 152"). Each server 142 may be embodied as a computing device including, among other components, a processor, memory, input modules and output modules. These components may be coupled via a bus. Further, each server 142 may include only a subset of the redirection server 144, the remote data repository 148 or the mirroring repository 152.

The redirection servers 144 receive requests from users for data needed for work management operations. In response, the redirection servers 144 redirect the request to the remote data repositories 148 or the mirroring repositories 152. The mirroring repositories 152 cache the data in the remote data repositories 148 and serves data in place of the remote data repositories 148 if the load at the remote data repositories 148 is excessive. The mirroring operation may be performed transparently in a manner that is well known to a person skilled in the art.

Access to the data in the remote servers 142 may be restricted to users in certain geographic locations. For example, users in unsecure geographies (using the user terminal 130) access the remote servers 142 of certain geographic regions only when the users communicate via a secure channel implemented using techniques such as a Virtual Private Network (VPN). The users in the unsecure geographies may communicate with the work management server 160 via a VPN gateway 136. The redirection servers 144 or the work management server 160 may verify the geographic region where the user is located by analyzing the user's IP (Internet Protocol) address.

Users may access the work management server 160 or the remote servers 142 from user terminals (e.g., the user terminal 130 or 140) via a network 100 (e.g., the Internet). The users of the work management server 160 include, among others, workers, job owners and intermediators. In one embodiment, the users are presented with a typical interactive Web user interface for operations associated with the work management system 110. In one embodiment, a user logs into the work management server 160 and chooses a job. In response, the user terminal 130 or 140 receives location information about the data location associated with the job from the work management server 160. The work management server 160 may include look-up tables that store the location of data associated with the job. Based on entries in the look-up tables, the user accesses the data for remote servers 142. Alternatively, the data associated with the work management system 110 may be stored exclusively in the local repository 240 of the work management server 160. For the purpose of explanation, it is assumed hereinafter that the data associated with work management is stored in the work management server 160.

In one embodiment, the user terminals 130, 140 and the work management server 160 form a client-server architecture. The user terminals 130, 140 may be, among others, a hand-held device, a laptop or desktop computer, a Web appliance, or any other of various well known computing devices. Client software instance (not shown) is executed on the user terminals 130, 140. In one embodiment, the client software instance may be a plug-in to a web browser that is downloaded in runtime or be stored in the user terminals 130, 140. In another embodiment, the client software instance performs operations offline and sends the results to the work management server 160 when user terminals 130, 140 are connected to the network 100. Various components of the work management server 160 may be implemented as a Web server application such as IBM WebSphere and Apache Web server. The work management server 160 may also run a middle layer application such as a personal home page (PHP) engine (e.g., an HTML preprocessor) that allows users to perform functions and interface with back-end applications such as SQL database application also running on the work management server 160. Various components such as the Web server, the PHP, and the SQL server may be separated into different physical servers or run on the same server either as separate applications or in virtual instantiations.

In one embodiment, the work management server 160 receives and stores location or regional requirement during registration of the tasks. The location or regional requirement of the task may require, for example, that the task be eligible only for worker in the U.S. or certified for certain tasks in a region (e.g., rendering of legal opinion in a jurisdiction).

In one embodiment, the work management system 110 further includes emails and voice communication system (not shown) to facilitate various operations including, among others, job scheduling, notification, and reporting of the results of the tasks.

Architecture of Work Management Server

Figure 2:
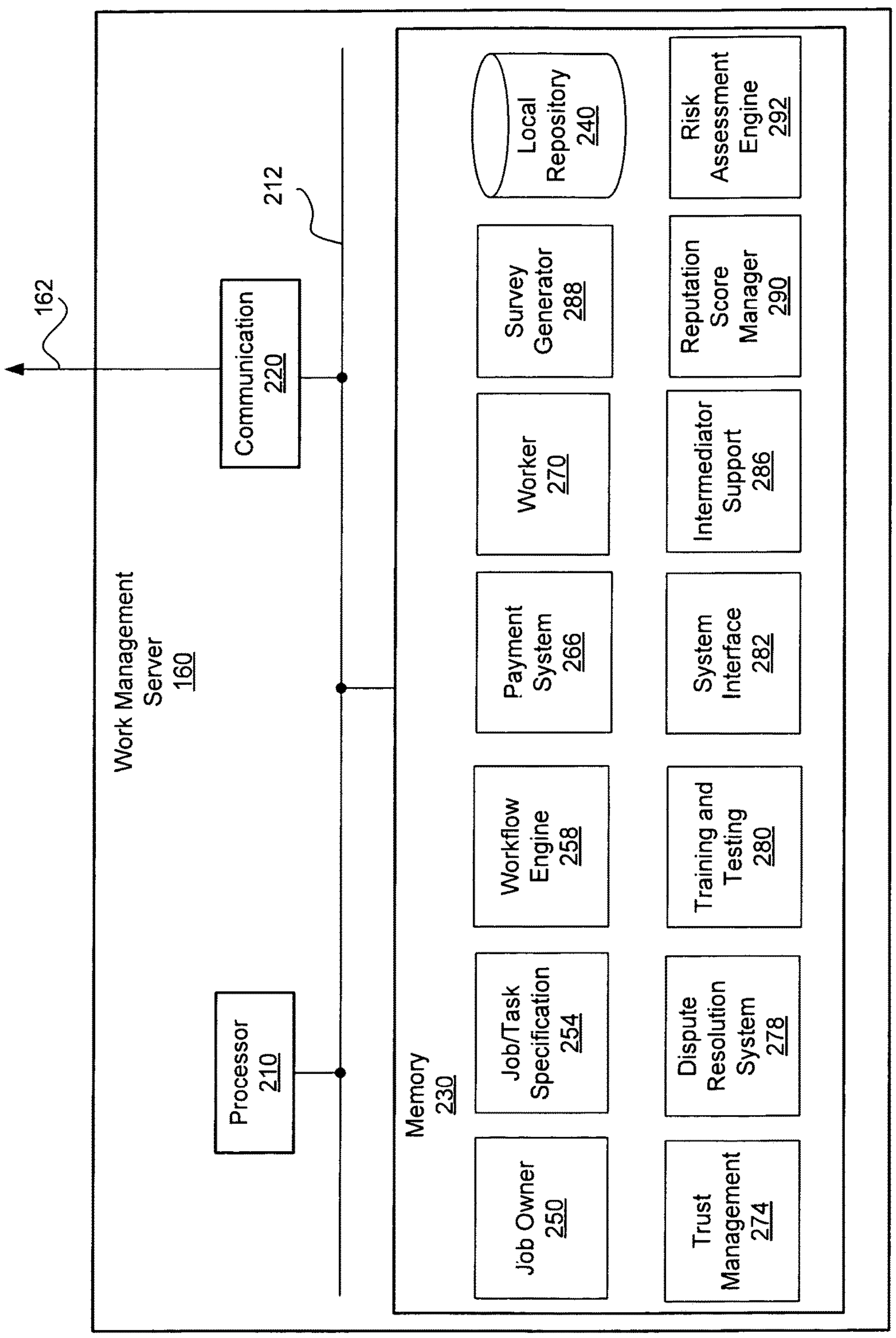
FIG. 2 is a block diagram illustrating a work management server, according to one embodiment.

FIG. 2 is a block diagram illustrating the work management server 160, according to one embodiment. The work management server 160 includes, among other components, a processor 210, a communication module 220 and memory 230. These components are coupled via a bus 212. The processor 210 reads instructions from the memory 230 and performs various operations associated with work management. The processor 210 comprises various computing architectures including a complex instruction set computer (CISC) architecture, a reduced instruction set computer (RISC) architecture, or an architecture implementing a combination of instruction sets. Although only one processor 210 is illustrated in FIG. 2, a plurality of processors may be used. The communication module 220 communicates with other components of the work management system 110 via the communication link 162 using various protocols including, for example, TCP/IP (Internet Protocol Suite), HTTP (Hypertext Transfer Protocol), HTTPS (Hypertext Transfer Protocol Secure) and SMTP (Simple Mail Transfer Protocol). The communication module 220 links the processor 210 to the network 100 that may include multiple processing systems and in one embodiment is a network controller. The network of processing systems may comprise a local area network (LAN), a wide area network (WAN) (e.g., the Internet), and/or any other interconnected data path across which multiple devices may communicate. The communication module 220 provides other conventional connections to other systems such as a network for distribution of files (media objects) using standard network protocols such as TCP/IP, HTTP, HTTPS, and SMTP.

The memory 230 stores instructions and/or data that may be executed by the processor 210. The instructions and/or data may comprise one or more code modules for performing any and/or all of the techniques described herein. The memory 230 may be a dynamic random access memory (DRAM) device, a static random access memory (SRAM) device, or some other memory device known in the art. The memory 230 stores, among other components, a job owner module 250, a job/task specification module 254, a workflow engine 258, a payment system 266, a worker module 270, a trust management module 274, a dispute resolution system 278, a training and testing module 280, a system interface module 282, an intermediator support module 286, a survey generator 288, a reputation score manager 290, a risk assessment engine 292 and a local repository 240. One or more of these modules may be combined into a single code module or be divided into a plurality of distinct code modules.

The job owner module 250 interacts with job owners to perform various operations associated with managing jobs or tasks assigned to workers using the work management system 110. The job owner module 250, in conjunction with the processor 210, may perform, among others, the following functions: authenticating job owners, retrieving data associated with the job owners, processing the data into a format convenient for the job owners' access, receiving instructions from the job owners (e.g., approving workers and approving payment), and storing processed data in the local repository 240. The job owner module 250 may, in conjunction with the workflow engine 258, allow the job owner to track the status of jobs or tasks assigned to workers using the work management system 110. The job owner module 250 also communicates with other modules of the work management server 160 to present information to job owners and/or receive inputs from the job owners.

A job/task specification module 254 communicates with the job owner via the job owner module 250 to facilitate configuration of job descriptions. Specifically, the job/task specification module 254 receives user inputs associated with jobs and outputs the job descriptions. The job/task specification module 254 may store a plurality of templates that may be chosen and modified by the job owners. For certain types of jobs, job templates allow inexperienced job owners to define the tasks by filling necessary fields. Alternatively, the job-task specification module 254 includes a wizard program that presents the job owners with a series of questions and generates job description according to the job owners' answers. In one embodiment, the job/task specification module 254 is installed on the user terminals 130, 140 instead of the work management server 160 to generate the job descriptions at the user terminals 130, 140. After the job descriptions are generated by the job/task specification module 254, the job descriptions are processed by the workflow engine 258 to divide a job into a plurality of tasks, as described below in detail with reference to FIG. 3. The job/task specification module 254 operates in conjunction with the processor 210 to generate the job description that is fed to the workflow engine 258 or stored in the local repository 240.

The job/task specification module 254 may store or retrieve and process job templates associated with a job. A job template may include (i) a declarative section, (ii) a procedure section, and (iii) a return statement. The declarative section defines elements and global or task variables associated with the job. Typically, the global variables are applicable to all tasks that make up the job whereas task variables are associated with only certain tasks. Such variables include, for example, the length of time for a task, base pay, and certification/credentials needed to take on the task. Some variables may be assigned a constant value. System variables may include how much time is left to complete all the work. A procedure section describes how a job is broken into tasks. A procedural language (e.g., JavaScript) may be used to describe, among others, sequences, conditional flow, goto or structured flow of control, and subroutines to describe the relationships between tasks and jobs. A return statement specifies the final result of the task.

In one embodiment, royalties may be offered for sharing job templates with others. The royalties may serve as an incentive to create templates of high quality usable by others. The job templates may be compiled or embedded into a protective software application to protect the job templates against unauthorized copy or use. In another embodiment, the job templates are provided without fees as an open source template for improvement by other users. After the open source templates are accepted and widely used by job owners, the templates may be approved as an "endorsed" template.

In one embodiment, an appropriate job template or wizard for a job owner may be unavailable. In such case, the job owner may manually generate the job descriptions. Alternatively, the job owner may search and customize job templates for jobs similar to what the job owner is contemplating. The customized job template may be stored and made available to other job owners. As the customized job templates accumulates in the work management server 160, a searching or matching service may be employed to allow job owners to search for task templates matching the needs of the job owners.

The workflow engine 258 operates in conjunction with the processor 210 to perform various operations associated with the management of jobs and tasks. The functions performed by the workflow engine 258 may include, among others, translating of jobs into tasks (as specified by the job descriptions), distributing the tasks to qualified workers, monitoring performance and completion of tasks, updating and managing reputation scores of workers and job owners. The job description generated by the job/task specification module 254 is received at the workflow engine 258.

The workflow engine 258 receives a job description from the job/task specification module 254 and then generates one or more task descriptions based on the job description. In one embodiment, the workflow engine 258 reads the job template associated with the job description, and generates one or more task descriptions according to the procedure as described in the procedure section of the job template. In another embodiment, the job description includes information (e.g., tags) needed for generating one or more task descriptions. The workflow engine 258 parses through the job description and generates the task descriptions according to the information included in the job description, The workflow engine 258 publishes the job descriptions. The workflow engine 258 in conjunction with the worker module 270 allows users to filter and view published job descriptions. After tasks are assigned, the workflow engine 258 generates assignment information that can be viewed by workers or job owners via the worker module 270 or the job owner module 250. The workflow engine 258 also receives inputs associated with the job from the user (e.g., worker and job owner) via the job owner module 250 and the worker module 270. The specific functions of the workflow engine 258 are described below in detail with reference to FIG. 4A.

The workflow engine 258 may also perform various support operations associated with tracking and/or management of jobs or tasks. The workflow engine 258 accesses data associated with jobs or tasks and presents status update to the job owners via the job owner module 250. Various well-known methods of tracking jobs or tasks may be employed by the workflow engine 258 for this purpose.

The payment system 266 facilitates monetary transactions between the job owners and the workers. The payment system 266 receives commands to make payments from the workflow engine 258. In one embodiment, the payment system 266 includes various tools for auditing and/or accounting. In one embodiment, the payment system 226 may arrange to receive a deposit in an escrow to be paid out to workers upon the completion of the task. In this way, the workers may reduce the risk of not receiving compensation for the task. The payment system 266 may be coupled with servers or computing devices of financial institutions to accomplish transmittal of payments.

The worker module 270 interacts with workers to perform various operations associated with jobs or tasks. The worker module 270 performs, among other functions, the following functions: authenticating workers, retrieving data associated with the workers, processing the data into a format convenient for the workers to access, receiving instructions from the workers (e.g., apply for a task and submit results of a task to the job owner), and storing processed data in the local repository 240. Further, the worker module 270 operates in conjunction with various other code modules to perform various functions that require presentation of data to workers and/or receiving of inputs from the workers.

The trust management module 274 is responsible for verifying the trustworthiness of the job owners and the workers. The trust management module 274 may access various sources of information including, government database, past history of tasks performed, and third-party generated information (e.g., credit report) to assign different trust quotients to the job owners and the workers. The trust management module 274 generates trust quotients that are stored in the local repository or made available to users (e.g., workers and job owners) of the work management system 110 via the job owner module 250 or the worker module 270. The trust quotient may be provided to the workflow engine 258 to determine eligibility of a user for a job or task. The trust management module 274 is described in detail below with reference to FIG. 7.

The dispute resolution system 278 is responsible for facilitating the resolution of disputes between users of the work management system 110. There may be a variety of disputes between the users. Workers may, for example, complain about the following: (i) non-payment, (ii) job owner's refusal to approve the result of tasks, (iii) poor definition of tasks, (iv) requiring significantly more time than estimated in task descriptions, and (v) non-timely approval of the results of the task. Job owners may, for example, complain about the following: (i) whether the work was properly executed, (ii) non-execution of the task assigned to the worker, (iii) non-timely execution of the task assigned to the worker, (iv) worker's request for unusual amount of clarification on the task, and (iv) unsatisfactory qualify of the results of the task. Job owners and workers may submit a complaint after a task is completed or during a task. Before filing a dispute, job owners or workers may be notified that a pattern of disputes will affect their reputation scores. In one embodiment, the dispute resolution system 278 may present each of these types of complaints in a drop-down menu along with a comments box for further details. Workers or job owners may be given the option of cancelling the task after filing a complaint. The dispute resolution system 278 may alert a dispute resolution entity (e.g., an arbitrator) when a job owner or a worker initiates the dispute resolution process. The dispute resolution entity may contact both parties, conduct independent investigation, and notify both parties of the result of the investigation, and recommend settlement between the parties. The result of the dispute resolution may be tracked by the dispute resolution system 278 and be fed to a reputation score manager (described below with reference to FIG. 12A) to update the reputation score of the job owner or the worker. Alternatively, the dispute resolution system 278 may store the result of the dispute resolution in the local repository 240.

The training and testing module 280 facilitates workers to learn new skills and prove their qualifications to qualify for certain tasks. In one embodiment, the training and testing module 280 allows a proctor to observe a worker taking a test through a low bandwidth (possibly delayed video conference) to ensure that the worker is not cheating or receiving assistance while taking the exam. The training and testing module 280 may communicate with the intermediator support module 286 to create training or testing programs. After the training or testing programs are created, the worker module 270 may operate in conjunction with the training and testing module 280 to train or test workers. The training and testing module 280 may be coupled to the job owner module 250 or the intermediator support module 286 to receive user inputs for creating training or testing programs. The training and testing module 280 is also coupled to the local repository 240 to store created programs. Further, the training and testing module 280 is coupled to the worker module 270 to present training and testing materials to workers.

In one embodiment, the number of workers prepared to take on certain tasks may be increased by training the workers before the tasks become available in a large number. The training and testing module 280 may also present puzzles for various reasons including, among others, the following: (i) to evaluate and reward workers (as a filtering tool to weed out incapable workers), (ii) to help the workers improve the skill-sets of workers and (iii) to be given an opportunity to interview for a desirable job if there are excessive numbers of applicant workers for the task. The training and testing module 280 may also provide a distant leaning function. The training and testing module 280 may be used by the job owners or intermediators to teach specialized knowledge needed to perform certain specialized tasks.

The system interface module 282 allows job owners or workers to create discrete, portable web programs that enable subsets of functionality provided by the work management server 160 to be exported and used on other systems. In one embodiment, workers may export a subset of their profile information to other websites such as Craig's List and MySpace so that the workers may build their "Personal Brand" leveraging the reputation system implemented by the work management system 110. The system interface module 282 may also couple the work management system 110 with other work management system used by different users.

The intermediator support 286 is responsible for supporting intermediators, as described below in detail with reference to FIG. 14A. The intermediators receives tasks from job owners, subdivides the tasks into subtasks, assigns the tasks to workers (using either the work management system 110 or other methods), collects the results from the workers and submits the results of the tasks to the job owners. The intermediator support 286 may be coupled to the workflow engine 258 to send task descriptions to the workflow engine 258. The workflow engine 258 may generate subtask descriptions based on the task description, assign subtasks to the workers, and send assignment information (indicating assignment of tasks to workers) to the intermediator support 286. The intermediator support 286 may also be coupled to training and testing module 280 to create and manage programs for teaching or testing workers.

The survey generator 288 is responsible for generating survey questions. The survey generator 288 is coupled to the job owner module 250 or the worker module 270 to allows job owners or workers to generate survey questions to ask answers to each other or to obtain answers to questions as part of the task. The survey generator 288 facilitates the process of generating surveys and collecting answers for the surveys. The survey generator 288 is also coupled to the local repository 240 to store the generated survey questions.

The job owner module 250, the worker module 270 or the intermediator support module 286 may receive the assignment information (indicating assignment of tasks to workers) from the workflow engine 258 and forward the assignment information to one or more user terminals 130, 140 for display. The assignment information may be generated by the workflow engine 258 to indicate how the job, task or subtasks are assigned.

The reputation score manager 290 retrieves various types of information from the local repository 240 and other sources to generate and update reputation scores, as described below in detail with reference to FIG. 12A. The reputation score as generated or updated by the reputation score manager 290 may be stored in the local repository 240.

The risk assessment engine 292 is coupled to the local repository 240 and various other sources to receive various types of information associated with risk. The risk assessment engine 292 generate risk data and stores it in the local repository 240, as described below in detail with reference to FIG. 16A.

The local repository 240 stores various types information associated with the work management server 160. The local repository 240 is coupled to other modules (e.g., the job owner module 250, the worker module 270, the workflow engine 258, the survey generator 288, the trust management module 274, the dispute resolution system 278, the training and testing module 280, the intermediator support 286, the reputation score manager 290 and the risk assessment engine 292) to provide data for processing at these modules and store data generated by these modules. The information stored in the local repository 240 includes, among others, user profiles, job templates, trust quotients, training or testing programs, job descriptions, task descriptions, payment information, user authentication data, survey questions, reputation scores, and risk data.

Various modifications may be made to the embodiment of FIG. 2. For example, one or more modules of FIG. 2 may be ported or transferred to the user terminals 130, 140. Further, instead of implementing the modules of the work management server 160 on a single server, the modules may be distributed across two or more servers.

Division of Jobs into Tasks

A job (or project) may be too expensive or impracticable for accomplishment by a single worker. Breaking up such job into a plurality of smaller tasks may be required to make the job more flexible and cost-effective. Taking the example of painting a wall, the process of painting the wall can be divided into smaller tasks such as removing the old paint, sanding the wall, painting primer on the wall, and then covering the primer with a layer of acrylic paint. Each of these tasks may be performed by different workers. By breaking up the job into smaller tasks, more workers may also become qualified for the tasks. For example, the workers that remove the old paint need not be skilled in painting the primer or the acrylic paint. Therefore, more workers will be qualified for the task of removing the old paint compared to workers who are qualified to perform all the processes associated with the painting. In one embodiment, the workflow engine 258 divides a job into tasks and distributes the tasks to a plurality of workers.

Figure 3:
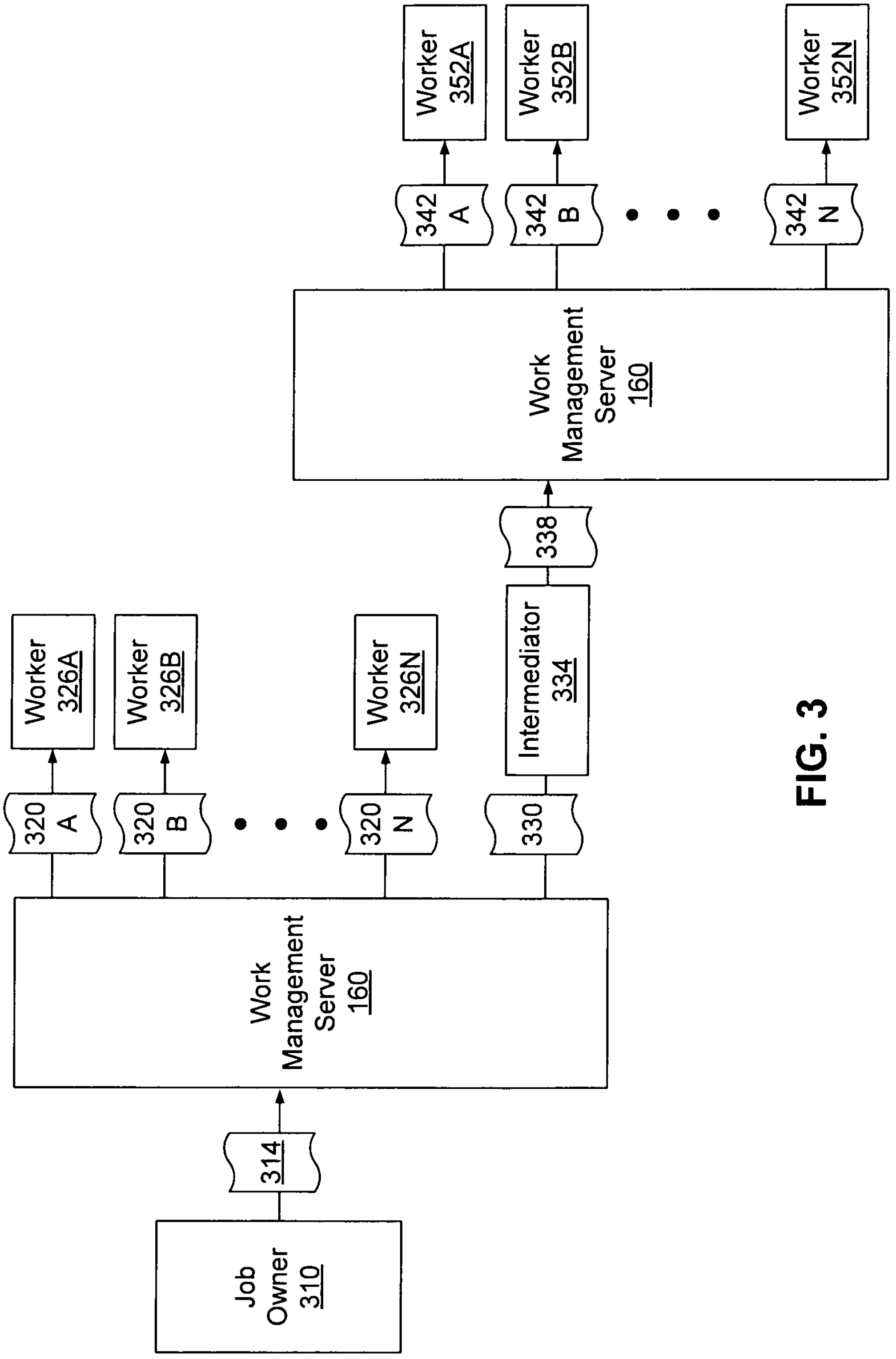
FIG. 3 is a conceptual diagram illustrating dividing of a job into a plurality of tasks and subtasks, according to one embodiment.

FIG. 3 is a conceptual diagram illustrating dividing of a job into tasks, according to one embodiment. A job owner 310 prepares a job description 314 using, for example, the job/task specification module 254 of FIG. 2. The job description 314 defines the job and smaller tasks that constitute the job. The work management server 160 (specifically, the workflow engine 258) divides the job into multiple tasks, each defined by a task description 320A through 320N. Tasks as defined by the task descriptions 320A through 320N are then distributed to a plurality of workers 326A through 326N.

Some tasks (for example, task associated with task description 330) are provided to an intermediator 334. The tasks given to the intermediator 334 may be a task that is too big for a single worker or a task that requires the supervision or expertise of the intermediator 334 to successfully accomplish the task. The intermediator 334 may prepare a task description 338 (similar to job description 314) defining the subtasks that constitute the task 330. The task description 338 may also be provided to the work management server 160 to subdivide the task 330 into smaller subtasks, each subtask defined by a subtask description 342A through 342N. Subtasks as defined by the subtask descriptions 342A through 342N are then distributed to workers 352A through 352N. The intermediator's task of coordinating the subtasks is supported by the intermediator support module 286, described below in detail with reference to FIG. 14A.

The process of collecting the results of the job is performed in a sequence reverse to the assigning of tasks or subtask. That is, the subtasks are submitted by the workers 352A through 352N, collected by the intermediator 334 and approved by the intermediator 334. The intermediator 334 then submits the results of the task associated with the task description 330 to the job owner 310. The job owner 310 collects the results of the tasks associated with the task descriptions 320A through 320N from the workers 326A through 326N and the results of the task associated with the task description 330 from the intermediator 334. The job owner 310 reviews the results of the tasks submitted by the workers 326A through 326N and the intermediator 334, and concludes the job. The job owner 310 and the intermediator 334 may assign tasks or subtask using the same workflow engine or separate workflow engines.

When a job or a task is divided into tasks or subtasks and distributed to multiple workers or intermediators, it may be time consuming to teach or convey necessary information to all the workers or intermediators. Therefore, the training and testing module 280 may be used advantageously to teach or convey necessary information to the workers or intermediators. The training and testing module 280 may also be used to progress the workers to a next level of skill or expertise that is likely to qualify the worker for higher paying tasks.

Figure 4A:
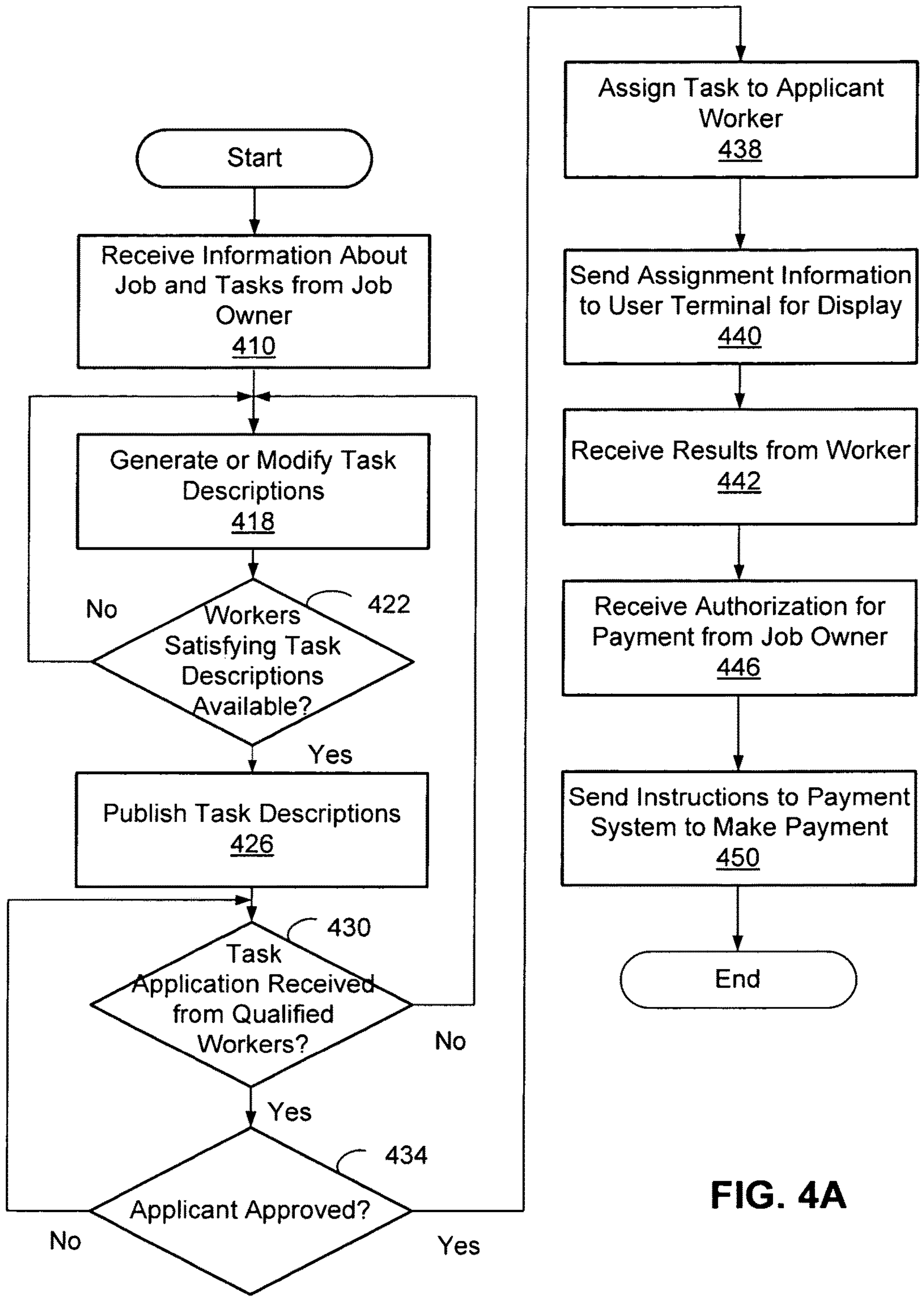
FIG. 4A is a flowchart illustrating a process of dividing a job into a plurality of tasks, according to one embodiment.

FIG. 4A is a flowchart illustrating the process of dividing a job into tasks, according to one embodiment. First, the job/task specification module 254 in conjunction with the job owner module receives 410 information about jobs and tasks from a job owner. Based on the job description, task descriptions are generated 418 by the work management server 160. Then it is determined 422 whether there are a sufficient number of workers satisfying the requirements for the tasks (as defined by the task descriptions).

If there is no worker or the number of workers satisfying the requirements is below a threshold, the process returns to modify 418 the task descriptions. The modification of the task description may be prompted, for example, by displaying the number of qualified workers to the job owner. The job owner then lowers the level of requirements for the task. Alternatively, an intermediator may be notified of such event. The intermediator may use his expertise to generate a proposal of modified task descriptions, as described in detail below with reference to FIG. 14C.

If there are a sufficient number of workers, the process proceeds to publish 426 the task descriptions. The published task descriptions are viewed by workers. Workers interested in the task then apply for the task. It is then determined 430 if applications for the task are received from qualified workers. If no application is received from a qualified applicant, the process may return to modifying 418 the task descriptions, as describe below in detail with reference to FIG. 15A. If there are one or more applications for the task, the process proceeds to determine 434 if the job owner approves the worker. If the worker is not approved, the process returns to determine 430 if applications are received from other qualified workers. On the other hand, if the worker is approved, the process proceeds to assign 438 the task to the applicant worker. Assignment information indicating which worker is assigned to which tasks are generated by the workflow engine 258. The assignment information is then sent 440 to the user terminal 130 or 140 for display.

The approved worker performs the assigned task and produces results. The results are then received 442 from the worker at the work management system 110. The job owner may review the results, and if all is in order, the job owner authorizes payment to the worker (the work management system 110 receives 446 authorizations from the job owner to make the payment). In response, instructions are sent to the payment system 266 to make 450 payments to the worker.

Figure 4B:
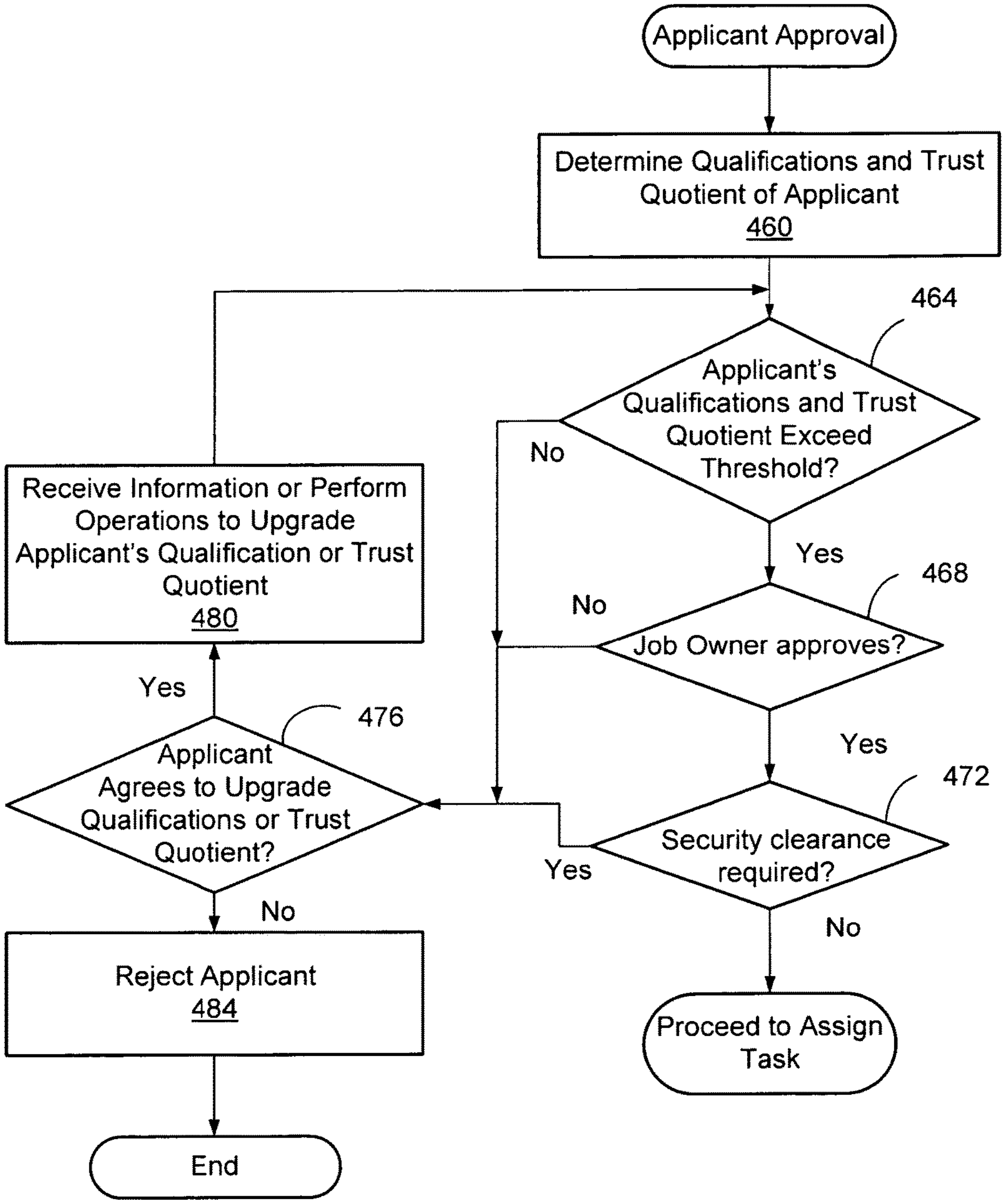
FIG. 4B is a flowchart illustrating a process of approving a worker for a task, according to one embodiment.

FIG. 4B is a flowchart illustrating the process of obtaining approval for an applicant worker, according to one embodiment. First, the qualification and the trust quotient of an applicant worker are determined 460 by the work management server 160. Then it is determined 464 whether the applicant worker's qualification and the trust quotient exceed a threshold set by the job owner. If the qualification and the trust quotient do not satisfy the threshold set by the job owner, the process proceeds to determine 476 if the applicant worker agrees to upgrade the qualification or the trust level (represented by trust quotient described below with reference to FIG. 7). To qualify for certain tasks, the worker may need to provide additional data (e.g., biometric data or government issued ID card) to raise the trust quotient. If the applicant worker agrees to upgrade the trust quotient, information to upgrade the trust quotient is received 480 or operations (e.g., training or testing) to upgrade the applicant worker's qualification or trust quotient are performed 480. Then the process returns to determine 464 if the applicant's qualification and trust quotient exceed the threshold and repeats the process. If it is determined 476 that the applicant worker does not want to upgrade the qualification or the trust quotient, then the applicant worker 484 is rejected, and the process ends.

If it is determined 464 that the applicant's qualifications and trust quotient exceeds a threshold, then the process proceeds to determine 468 if the job owner approves the applicant worker. If the job owner does not approve the applicant worker, the process may proceed to determine 476 if the applicant worker agrees to upgrade the qualifications or the trust quotient. If the job owner approves, then it is determined 472 if a security clearance is required to assign the task to the worker. The trust quotient represents the trustworthiness of the worker, and be based on various factors not all of which are associated with security clearance. Therefore, in addition to filtering workers based on the trust quotient, a separate security clearance may be performed on the worker to avoid security issues. In one embodiment, the security clearance is performed based on the trust quotient, and a separate security clearance is not performed. If the security clearance is required, the process may proceed to determine if the applicant agrees to upgrade qualifications or trust quotient to pass the security clearance, and proceeds to receive information or perform 480 operations to upgrade application's qualifications or the trust quotient if the worker agrees. If no security clearance is needed, the applicant worker is assigned to the task.

FIG. 5A is a graph representation of a user interface 500 displayed to receive a job registration from a job owner, according to one embodiment. The job owner may define a job and related tasks using a job template. In a menu 502 provided in the user interface 500, a plurality of job templates are displayed for the job owner's selection. The job owner may define a job and its related tasks by conveniently choosing a job template and filling necessary fields or modifying default entries. The templates may be hierarchically organized to facilitate job owners to identify and select desired templates by various criteria (e.g., types of job, skill required and similarity of jobs). In one embodiment, the templates is designed by a third party (e.g., intermediator) and made available to job owners with the payment of fees.

Figure 5C:
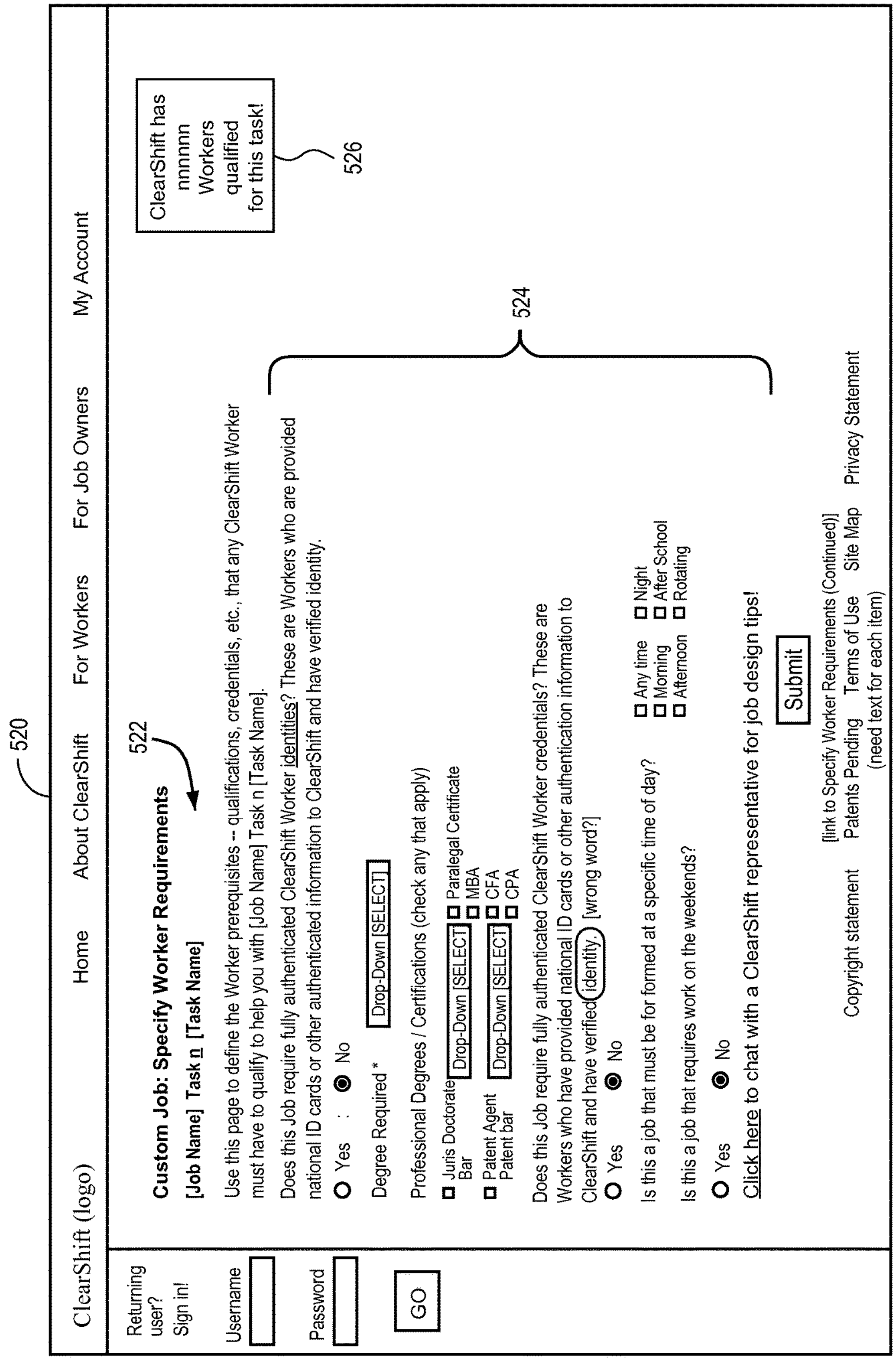
FIG. 5C is a graphic representation of a user interface for receiving the descriptions of worker requirements for a task, according to one embodiment.

FIG. 5B is a user interface 510 displayed for receiving the descriptions of tasks associated with a job, according to one embodiment. A job owner may decide to define a job as including a single task or more than one task by clicking one of the two radio buttons indicated by an arrow 516. If the job owner indicates that more than one task is associated with a job, a table 512 is presented to the job owner. The job owner fills in the table 512 to set the number of tasks and the name of the tasks. After filling the table 512, the job owner may be presented with user interfaces, for example, illustrated in FIGS. 5C through 5F to specify the tasks and the worker requirements for the tasks. By filling the table 512, a job description defining a job with multiple tasks may be generated.

FIG. 5C is a graphic representation of a user interface 520 displayed for receiving the descriptions of worker requirements for a task, according to one embodiment. The name of the job and task associated with the setting are displayed in an area indicated by an arrow 522. The job owner may populate various fields 524 to set the requirements or qualifications of workers for the task. The configurable fields may include, among others, availability of authentication information (e.g., government issued ID card), degree requirements, professional degrees, and time the task must be performed. Based on the populated fields, the number of qualified workers may be displayed in a box 526 to inform the job owner whether the qualifications or requirements are too restrictive. In one embodiment, a wage profile (e.g., median, average, highest and lowest) of the workers satisfying the requirements or qualifications are presented to the job owner.

Figure 5D:
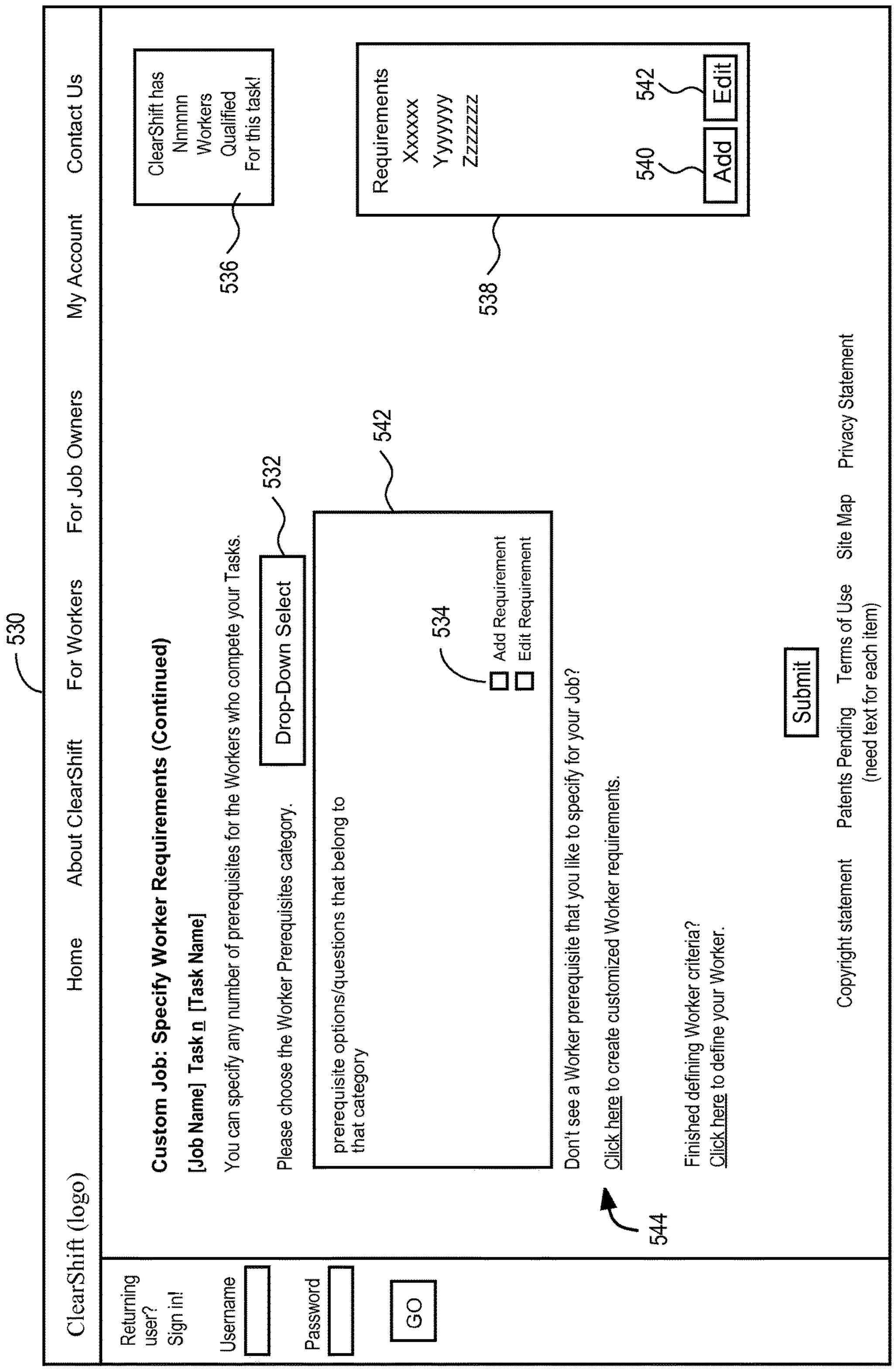
FIG. 5D is a graphic representation of a user interface for receiving additional descriptions for worker requirements for a task, according to one embodiment.

FIG. 5D is a graphic representation of a user interface 530 for receiving additional descriptions for worker requirements for a task, according to one embodiment. Using the user interface 530, the job owner can set advanced requirements or qualifications for workers. By clicking a drop-down menu 532, the job owner may select detailed requirements such as authentication, demographics, education, professional designations, employment information, interests, language skills and locations. After a selection is made from the drop-down menu 532, a scroll box 542 may appear with a series of prerequisite options or questions. The job owner selects one of the questions/requirements from the scroll box 542 and then specifies the acceptable values that become the prerequisites for a worker to perform the task. The field types for designating the acceptable values vary based on the type of requirement (e.g., selecting "Age" in the scroll box gives two textboxes by which an age range could be specified, and selecting "Education" in the scroll box 542 gives a series of education credentials with checkboxes next to each credential for the job owner to choose).

After adding the requirement and designating the acceptable values, "Add Requirement" button 534 is clicked to add this requirement. The number of qualified workers may be updated in a box 536 as new requirements are added. The added requirements are displayed in a list 538. An "Add" button 540 and an "Edit" button 542 enables the requirement to be added or edited, respectively. After a requirement is added, the drop-down menu 532 is reset and the scroll box 542 disappears such that the drop down menu 532 is readied for the job owner to add another requirement.

In one embodiment, qualification templates are stored in the work management server 110 and retrieved for use by the job owner. The qualification templates may cover frequently used worker requirements. Using the qualification template, the work management server 110 may present the job owner with a series of questions. Suitable qualifications or requirements are then automatically generated based on the answers provided by the job owner. In this way, the job owner may conveniently set the requirements or qualifications of workers for a task with fewer inputs.

In one embodiment, the number of workers meeting a qualification or requirement criterion may be displayed in the user interface 530 to indicate how the qualification or requirement reduces the number of eligible workers.

The job owner may click a link 544 to invoke a template generator. When the link 544 is clicked, a popup window is launched that allows the job owner to create a new custom question. The template generator may be a part of job/task specification module 254. In one embodiment, the template generator allows only one question to be created at a time to become part of the worker qualifications. The template generator may also display directions explaining how to use the template generator. Further, the template generator popup enables the job owner to not only create a question and specify the answers but also specify which answers are required. Clicking "Submit" from the template generator window closes the popup window and reloads the main page and adds the new question to the list of worker requirements. A "Pending approval" mark may appear next to the new question. The new question may then be analyzed by an administrator of the work management server 160 to (i) confirm that the question is not already included in the database of worker requirements, (ii) classify the new requirement in a proper category, (iii) approve the question, and (iv) enter the estimated time required for the workers to satisfy the new requirement.

FIG. 5E is a graphic representation of a user interface 550 displayed to define a task, according to one embodiment. The job owner may define a task and provide directions to workers. The directions for the task may be entered in fields 552 as texts or uploaded in the form of files.

FIG. 5F is a graphic representation of a user interface 560 displayed to receive information with respect to compensation from a job owner, according to one embodiment. For each task, the user interface 560 displays the summary of information associated with expense including, for example, the number of qualified workers, the targeted number of tasks to be completed, requested compensation range of workers, the total estimated compensation, and total time estimate. The job owner may define the compensation to be paid out to workers per task in box 564. The job owner may also specify the time that the job or task is to be published and made available to workers by filling in entries in fields 566.

FIG. 6A is a diagram illustrating data structures for storing job descriptions and task descriptions, according to one embodiment. After the job owner defines a job and related tasks, a job table and one or more task tables are generated by the workflow engine 258 and stored in the local repository 240. A job table 612 may include, among other fields, Job/Task ID (a unique number identifying a job, task or a subtask), Nick Name (indicating name of the job), type of job, User ID Source (indicating where the identity of the job owner may be obtained), PID (Personal Identity) source contact (indicating where the contact information of the job owner may be obtained), user ID provider (indicating where the identity of the job owner was generated), PID provider contact (indicating who provided the contact information about the job owner), ProjectDataFolder (indicating where data associated with the job may be obtained), comments (description about the job), status (indicating whether the job is pending or terminated), Sec Clear (indicating whether security clearance is needed), Geography (indicating any geographical limitation associated with the job) and Subprojects (indicating one or more tasks associated with the job.

A task table 614 includes similar fields for tasks linked to the job table 612. The subprojects fields in the task table 614 indicates subtasks that constitute the task described in the task table 614. A subtask table 616 also includes similar fields except that typically Subprojects field is NULL. That is, the embodiment illustrated in FIG. 6 supports three levels of hierarchy (job, task and subtasks) in organizing and structuring a job. Organizing and structuring a job into three levels are merely illustrative, and additional levels of structure may be implemented by allowing the Subtask tables or its child tables (i.e., sub-subtask tables) to describe a non-Null value in Subprojects field.

Examples of job templates provided to job owners may include the following:

Auditing:

Auditing includes tasks in which a job owner pays a worker to audit a function in the "real world." The worker receives detailed directions from the job owner, executes the audit, and reports back to the job owner via the work management server 160. For example, a fast-food franchise as a job owner may create an auditing procedure for checking cleanliness and service levels at a set of its franchise restaurants. The worker receives a list of the franchise locations, an audit procedure, and a reporting form. The worker is paid by the franchise to audit the locations and submit the report via the work management server 160.

Media Services:

Media Services includes tasks which involve receiving a media file such as a document, audio file, or video file, performing a function related to the file, and providing the results via the work management server 160. Often, providing the results includes providing an updated version of the file. Examples of Media Services include transcription, translation, proofreading, resume review, and cover letter review. Some Media Services may require splitting of a media file into multiple snippets, as described below in detail with reference to FIG. 6B.

Advisory Services:

Advisory Services include structured tasks performed by a credentialed professional services provider such as lawyer, accountant, or bookkeeper. These tasks are executed when a job owner (e.g., a legal client) provides contextual information and/or documents to a worker (e.g., lawyer). The tasks may be facilitated by a job template that asks common questions necessary to obtain necessary information for certain types of Advisory Services. The work management server 160 facilitates the collection of necessary information for the Advisory Service, matching to a qualified service provider that meets the job owner's detailed requirements.

Figure 6B:
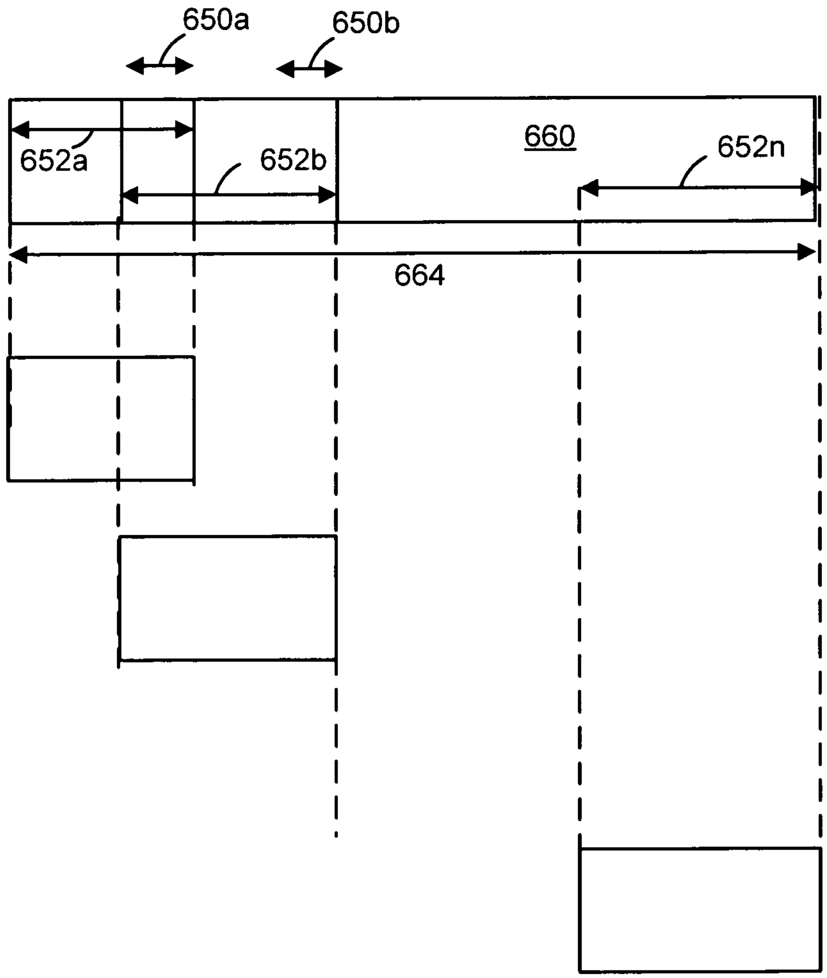
FIG. 6B is a diagram illustrating decomposition of a video over a time line, according to one embodiment.

A job may be associated with a long video. For example, the job may involve translating, reviewing, editing a long video. In such case, a long video may be split into multiple sections and assigned to different workers to perform tasks on smaller snippets of video. FIG. 6B is a diagram illustrating decomposition of a video over a time line, according to one embodiment. The main video stream 664 is decomposed into snippets 652*a-n*, each with an overlap zone 650*a-n*. By allowing large enough overlap zones, differences among workers' biases may be calibrated or compared against one another to receive a contiguous reviewing file such as a graph 2340 described below with reference to FIG. 23B. Also, if specific instructions have been given to reviewers, the specific instructions may be added.

In one embodiment, videos may be decomposed to maximize the security of video portions. That is, by decomposing the videos into snippets, no single individual viewing a snippet can put together overall meaning. Techniques for maximizing the security include, among others, making small time slices, minimizing slices given to an individual, spreading out the slices across the overall time of the original video (some from the beginning, some from the end) or vice versa, etc. Multiple copies of time slices may be distributed to different individuals to increase redundancy. In other cases, while a viewer watches a main video, a second video may be displayed to provide instructions in real time about the status. The second video may be a tutorial material or provide instructions on how to enter evaluations on the main video. Additionally, a user may view a video and type comments in real time into a text box on the same display with a time stamp to link the comments to the correct segment of the video.

Further, after results become available, the results may be plotted on a timeline next to a video with a running graph having peaks and valleys synchronized with the video. For example, if a video has numerous positive reactions at a given time point, then that point would be seen with a rising graph leading up to that point, displayed right next to the video. In some cases where the video has natural time segments such as innings in a baseball game, the results can be grouped according to the natural time segmentation. In this way, all evaluations between two times are associated with the natural time segment. In another cases of displaying a video on a timeline, a media player could display a video along with an integrated timeline, for purposes such as evaluating or translating a piece of media or comparing evaluations. Characteristics (e.g., whether the video is boring or interesting at that point in time) can be plotted along the timeline. In addition, a method of converting video evaluation data to a paper report may be displayed s alongside a graph of data about the video, with time codes by the screen shot, along with other graphs and indications of the meaningful evaluations at that point in time.

In some cases, to easily combine multiple types of video evaluation, a system using "mashups" can be enabled such that video can be displayed alongside other independently created software objects. These software objects can gather data on the video and synchronize with the initial video (e.g., a web camera that records facial expressions during the watching of a video).

In one embodiment, tasks may also have advertisement purposes. Such tasks include what is referred to as "adverployment" that combines characteristics of advertisement and a task. For example, eating and grading a new snack food would introduce a worker to a new type of health food he may otherwise never try, and lets the job owner have thousands of people quickly taste a new food and talk about the food to friends.

In one embodiment, the workflow engine 258 divides jobs into non-identical series of tasks that must be performed over time in sequence. Such series of tasks include, for example, taking a screenplay and rewriting it for a given need (such as time), and then proofreading for general quality from a more finalized script. The sequential nature of the job decomposition makes it different from other jobs that can be decomposed and recomposed without any time dependency.

In one embodiment, the workflow engine 258 may normalize work to a common framework (i.e., to have as many common elements in jobs as possible). Suggestions can be made to take a list of steps to standardize the tasks by selecting from a list of defined steps or to use an existing template of known steps.

In one embodiment, the workflow engine 258 creates tasks repetitively by regularly posting tasks. For example, the regular task may involve preparing weekly reports on the same subject matter. In such cases, it is preferable to assign the task to the same worker. The workflow engine 258 attempts to arrange the services of the same workers for such tasks but settle for other available workers if the workers assigned to previous tasks are unavailable.

In one embodiment, the workflow engine 258 may break up jobs into tasks to be performed in different time zone or parts of country to expedite the accomplishment of a job. For example, the work management server spreads tasks associated with a job along all time zones to have as many workers as possible working on the job across different hours.

Trust Management

Reliability and trustworthiness of users often plays a critical role in success of job management in a virtual environment. When online work management systems are used, job owners and workers interact virtually exclusively by electronic communication without face-to-face interactions between the parties. Because of such limited interactions, the trustworthiness of a user may be difficult to determine. Further, extensive time and resources may be needed to verify the trustworthiness of job owners or workers. While some workers or job owners may be willing to invest more time and resources to gain access to more tasks or to workers, others may opt against investing additional time and resources to verify his or her trustworthiness. Therefore, the work management system 110 accommodates a diverse range of demands for different workers and job owners by providing varying levels of verification. The trustworthiness of a user may represent one, a combination of or all of the following (but not limited to the following): a reliability of user's identity, the likelihood that the user will complete the task, typical on-time performance and the likelihood that the user will pay for the task preformed by a worker.

Figure 7:
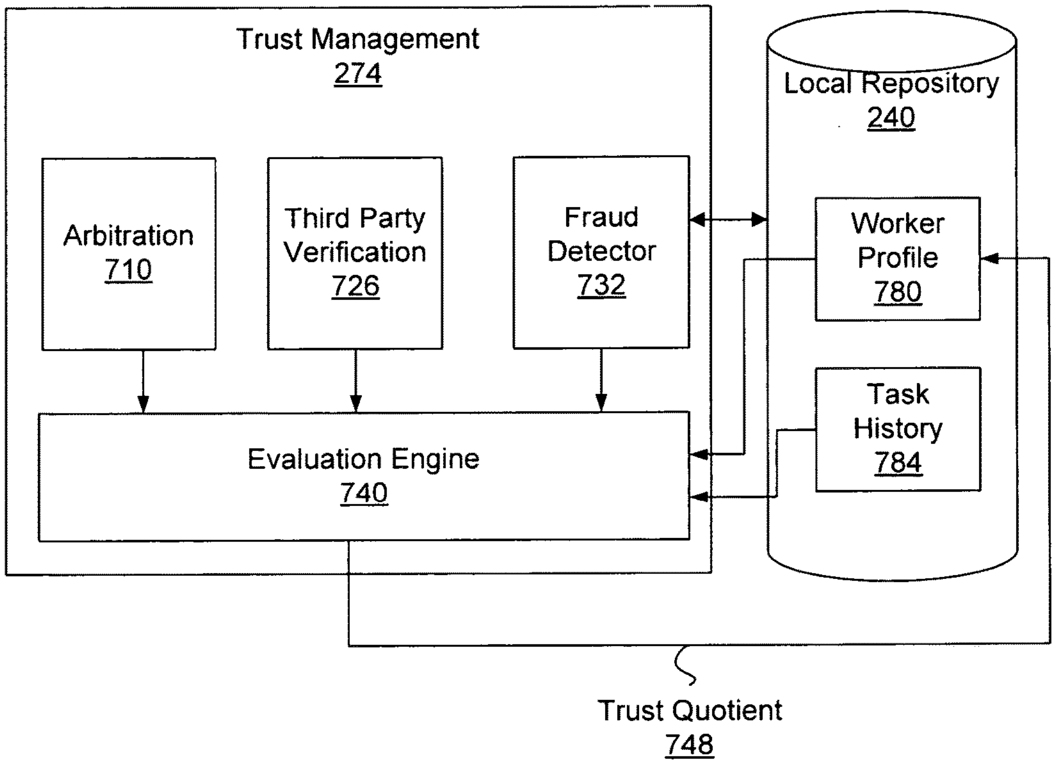
FIG. 7 is a block diagram illustrating a trust management module interacting with a local repository, according to one embodiment.

FIG. 7 is a block diagram illustrating a trust management module 274 interacting with a local repository 240, according to one embodiment. The trust management 274 performs various operations to assess the trust level of workers. In one embodiment, the trust management module 274 may include, among other components, an arbitration module 710, a third party verification module 726, a fraud detector module 732, and an evaluation engine 740. One or more of these components may be implemented on a single code module. Alternatively, each of the components may be divided up into two or more code modules. Although the operation of the trust management module 274 is described hereinafter with reference to workers, the trust management module 274 may also analyze and generate trust quotients for job owners or intermediators.

The arbitration module 710 collects and analyzes the requests for arbitration and the results of the arbitration. The arbitration module 710 is coupled to the dispute resolution system 278 to collect information about disputes where the worker is a party. The increased number of arbitration requests and unfavorable results of the arbitrations for a worker will tend to show that the worker is producing unsatisfactory work and raises suspicion as to whether the worker actually possesses the skill or qualification indicated in his or her work profile 780. The arbitration module 710 sends the collected information related to the requests for arbitration and the results of the arbitration to the evaluation engine 740.

The third party verification module 726 is coupled to third party sources to collect and verify worker's information in the worker profile 780. The third party sources include various types of government databases, private sources (e.g., credit information agency database, utility company databases, and insurance agency databases), and information provided by field investigators. The information in the worker profile 780 and other sources are cross-checked to find any discrepancies. If any discrepancies are found, the third party verification module 726 generates a discrepancy alert signal flagging the worker's identity as being possibly fraudulent. The discrepancy alert is sent to the evaluation engine 740. The flagged worker may be subject to further investigation to verify the worker's true identity. As additional information becomes available, additional verification may be performed by the third party verification module 726. Verification information is then provided to the evaluation engine 740.

The fraud detection module 732 analyzes various data available from the local repository 240 and the remote data repositories 148 to detect any patterns of fraudulent activity. The fraud detection module 732 analyzes not only the worker's profile but other information such as patterns of transaction between job owners and workers, duplicative working hour entries for the same worker in different tasks, and suspicious grouping of workers in similar tasks. After suspicious patterns are uncovered, the fraud detector 732 may flag the related workers as being candidate for further investigation or lower the trust quotients of the workers. The worker profile of the related workers stored in the local repository 240 may then be updated to show that the worker may be fraudulent. An administrator or investigated by administrators of the work management system 110 may then conduct further investigation. The fraud detection module 732 may generate a fraud alert signal that is fed to the evaluation engine 740. The fraud alert signal indicates that the worker may be engaged in fraudulent activities.

The worker profile 780 stores various information associated with the worker such as the worker's trust quotient, worker's personal information, information about the worker verified from third party sources, worker's authentication information (log-in name and password), scores on tests performed using the work management server 160 or other test administering agencies, and preferences of workers. The worker profile 780 may be accessed by the workflow engine 258 to search for workers qualifying for certain tasks. A task history database 784 stores the workers previous history of tasks and any feedback or reviews of the workers provided by job owners.

The evaluation engine 740 is coupled to the arbitration module 710, the third party verification module 726, the fraud detector module 732, the worker profile 780 and the task history 784 to receive data for determining the trust quotient 748 of the workers. The trust quotient represents the reliability of the worker's identity. The trust quotients are updated as additional information about the workers' identity and work performance information become available. The trust quotient 748 as generated or updated by the evaluation engine 740 is stored in the worker profile 780 for access by the workflow engine 258 and the job/task specification module 254. The workflow engine 258 may access the trust quotients to filter qualified workers for tasks. The job/task specification module 254 may access the trust quotients to estimate the number of qualified numbers as the job owners sets the requirements or qualifications of the workers eligible to work on the tasks.

In one embodiment, the evaluation engine assigns different trust quotient values based on the information available in the worker profile 780. Workers providing more information may be given a higher trust quotient. As more reliable information is received from the worker or verified from other sources, the trust quotients may be raised. For example, if the worker provides biometric data or government issued ID card, the worker's identity is deemed more reliable and the information may be raised. Also, a letter may be sent to the physical address of the worker including a number. The worker may enter the number after receiving the letter so that the worker's address is verified. Higher trust quotients may be given to bonded, insured workers and lower trust quotients may be given to workers providing only email address verification.

In one embodiment, a user may have different ID which may be assigned different trust quotients. Also, one or more users may be assigned the same ID which is assigned with a trust quotient separate from the trust quotients of the member users of the same ID.

In one embodiment, messages (e.g., instant messages or emails) to a sender may be held in communication escrow if the sender or the receiver has trust quotients below a threshold. The messages may be forwarded to the sender when the trust quotients of both the sender and the receiver exceed a threshold. Further, a double-secure email system may be provided in which both sides are maintained anonymous and only known to the work management server 160.

Searching Tasks for Workers

Figure 8:
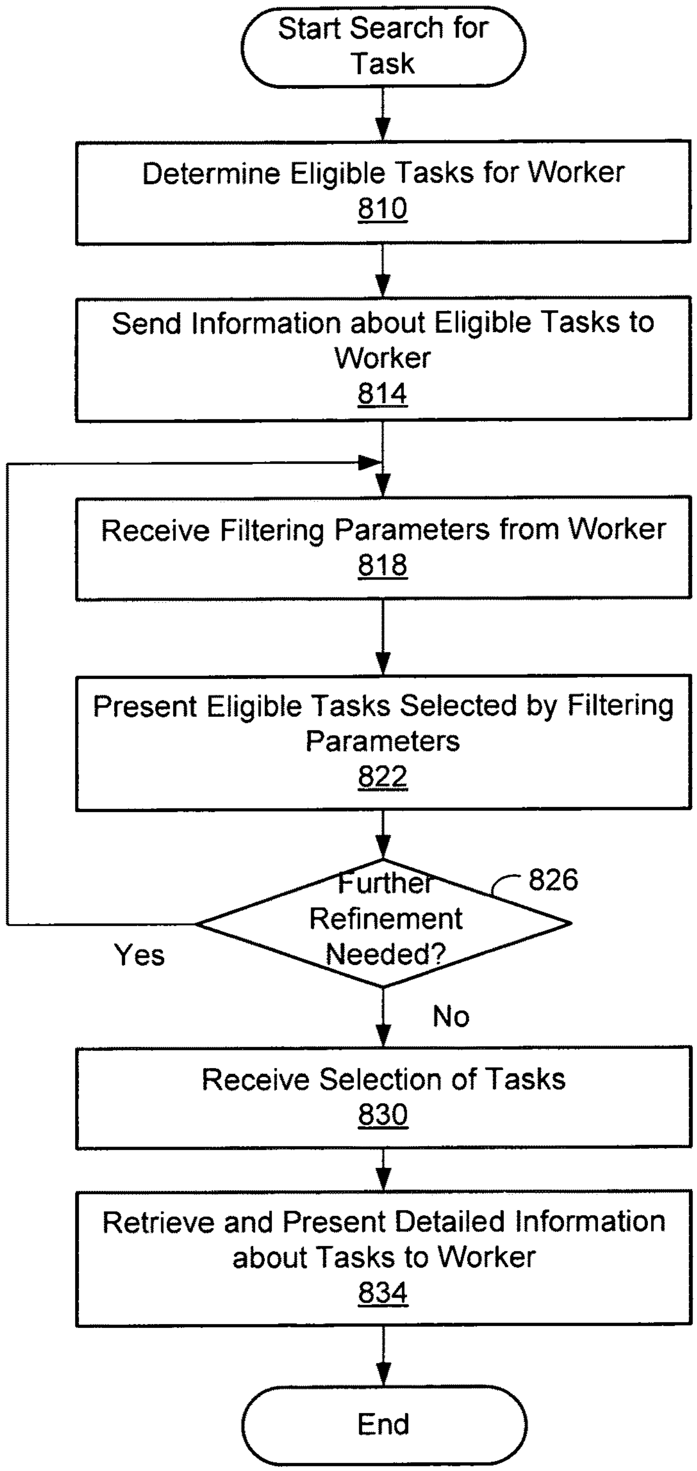
FIG. 8 is a flowchart illustrating a process of searching tasks for a worker, according to one embodiment.

FIG. 8 is a flowchart illustrating the process of searching for tasks by a worker, according to one embodiment. After a worker logs into the work management server 160, tasks available and to the worker are determined 810. The worker module 270 of the work management server 160 sends 814 information about tasks eligible to the worker via the network 100 to the worker's user terminal 130 or 140. The worker may want to narrow down the tasks by one or more filtering parameters (e.g., wages higher than certain amount). The parameters for filtering the eligible tasks are received 818 from the worker. The work management server 160 filters the eligible tasks according to the filtering parameters and presents 822 the filtered tasks to the workers.

It is then determined 826 if further refinements on filtering parameters are needed. If further refinements are needed, the process returns to receiving 818 modified filtering parameters from the worker and repeats the process. If further refinements to the filters are not needed, the process proceeds to receive 830 selection of a task by the worker. Detailed information about the selected task is retrieved and then presented 834 to the worker. One or more of these processes may be preformed in parallel to each other or reversed in sequence.

The selection of the task by the worker may also be accompanied by other processes such as requesting further information from the job owner or signing up for the task. Alternatively, a worker may continue to look for other work by selecting other tasks or further refining the filters.

In one embodiment, the searching of tasks by the worker may be accompanied by interaction with job owners. For example, the worker may conduct interviews with job owners over various communication tools (e.g., messenger or webcam) to inquire and obtain information about other tasks that the job owners are offering.

Figure 9:
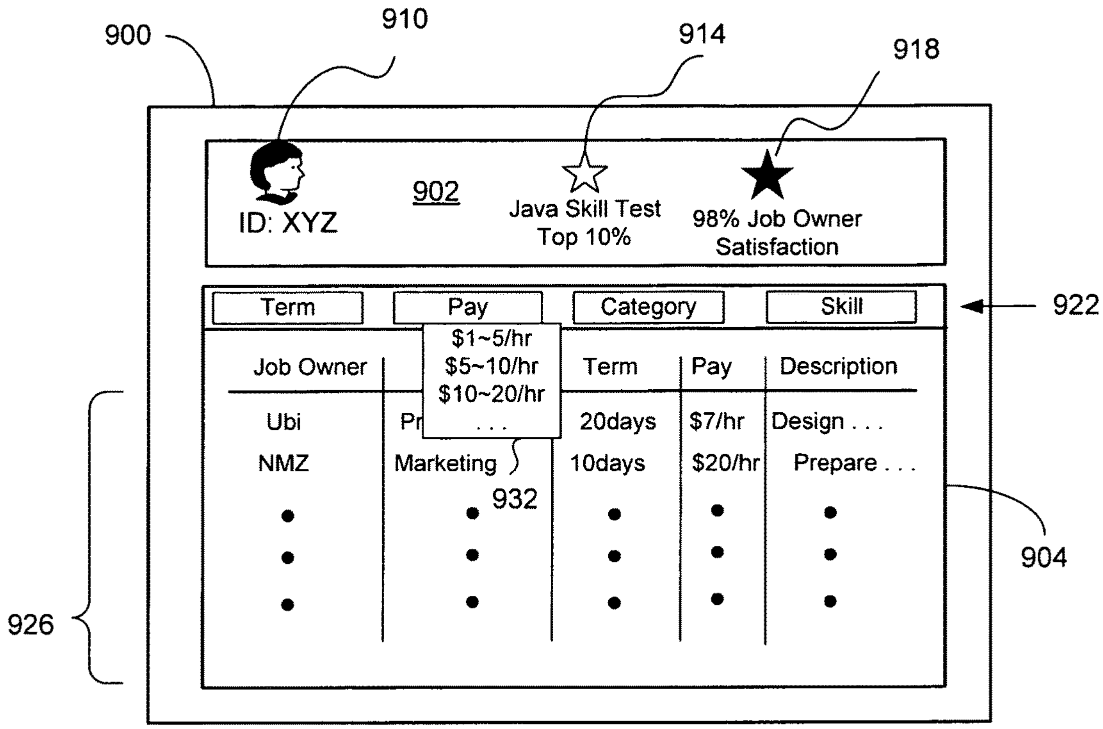
FIG. 9 is a graphic representation of a user interface displayed to a worker for searching tasks, according to one embodiment.

FIG. 9 is a graphic representation of a user interface 900 displayed to a worker for searching tasks, according to one embodiment. The worker's avatar or identity 910 is shown in a header section 902 on the top of the user interface 900. The header section 902 also includes badges 914, 918 of accomplishments or achievements by the worker. A window 904 is displayed below the header section 902 to present a list of tasks 926 available to the user. The worker may use drop-down menus 922 on the top of the window 904 to set filters for the list of tasks. FIG. 9 illustrates the "pay" filter being selected where drop-down menu 932 is displayed to allow the worker to filter the available tasks based on base pay. As a filter is selected by the worker, the list of works matching a filter condition is updated in the window 904. By using such filters, the worker can conveniently search for tasks satisfying various conditions such as immediately available tasks, best-paying tasks, most suitable tasks, tasks most helpful for career advancement, etc. The filter function may be implemented, for example, in the worker module 270 or the workflow engine 258. The updating of the list of work based on the filtering conditions may be performed using various techniques that are well known in the art, such as DHTML (Dynamic HyperText Markup Language), flash, and flex.

In one embodiment, the worker module 270 operates with the user terminal 130 or 140 to present two separate windows on the worker's user interface. The first window displays tasks for which the worker is already qualified. The second window displays tasks for which the worker may qualify by providing incremental qualifying information and/or accomplishing incremental certifications.

In the first window, the display of tasks and allocation of tasks to workers are prioritized based on the highest-paying job for which the worker is qualified. The most common reason a worker to choose a lower-paying job is because the worker does not have the time available to complete the higher-paying job. Therefore, the worker may be allowed to filter tasks based on time available to the worker. The worker may refine the filtered list of tasks by selecting, for example, work hours available from right now, work hours available for the next 24 hours, work hours available for the next three days, and work hours available for the next week. Workers may also control the tasks displayed in the first window via an advanced search feature that allows users to prioritize tasks based on criteria including: employer, time required, total compensation, compensation/hour, reputation requirements, deadline, geographical requirements, educational requirements, experience requirements, credential requirements, and other characteristics of the job. The advanced search feature may be accessible by a button on the user interface that triggers a popup window.

The second window displays tasks for which the worker is not precluded based on information already provided by the worker, but for which the worker has not provided necessary information or credentials to qualify. The display of tasks in the second window may be prioritized to increase the worker's pay relative to highest paying tasks for which the worker is currently qualified for or estimated time required by the worker to qualify for this task. The tasks displayed in the second window may be filtered in the same manner as the tasks in the first window.

Similar user interfaces may be presented to job owners to locate appropriate workers. Alternatively, various other user interfaces may be displayed to allow workers or job owners to select from a large number of options.

In one embodiment, the work management server 160 presents tasks similar to those selected, preferred or previously performed by the worker. Furthermore, the work management server 160 allows a worker to create a filter. The filter may be created, for example, by modifying an exemplary filter. The work management server 160 may store such exemplary filters with predefined settings that may be modified by the worker. Also, the work management server 160 may display a smaller pool of jobs and progressively increase the pool of available tasks as the worker establishes good reputation, receive good evaluation from job owners or the number of finished tasks increases. The detailed information about the task may include what requirements need to be met in order to qualify for immediate payment from job owners.

The work management server 160 may provide other supporting features to workers such as (i) optimizing the worker's time available for task, (ii) setting configuration of user interfaces to filter the task, (iii) informing workers how to become eligible for more tasks, earn more per task or access better tasks by evaluating barriers to higher earning (e.g., enroll in a training program, focus on certain types of tasks, obtain an academic degree, (iv) reserving tasks from job owners, (v) notifying workers when tasks may become available in high quantity, (vi) matching jobs or tasks preferences of workers, (vii) providing notification services for jobs preferred by a worker, (viii) allowing bidding of time, fee or other criteria to receive a commitment from a job owner to give a large quantity of job, and (viii) automatically scheduling time for the workers based on task.

In one embodiment, the work management system 160 may identify workers with valuable skills such as speedy translation or expertise in military tactics using the testing (provided by the training and testing module 280) and make recommendations to job owners.

In one embodiment, a task or tasks may become available only after the number of workers willing to work of the task or tasks exceeds a threshold. Reservations from the workers for the task or tasks are received and tracked by the work management server. After the number of the workers exceeds the threshold, the work management server notifies the workers who made the reservation and allows the workers to perform the task or tasks.

In one embodiment, the work management server provides preferential access to tasks based on previous work. A worker may be required to perform a certain number of tasks before obtaining access to highly sought-after tasks.

In one embodiment, information regarding whether certain workers satisfy special prerequisites for accomplish a task (e.g., owning season tickets to games of a team) is stored. The information may be accessed to select a worker that could reduce the cost associated with the task.

Expansion of Services Using Partner Services

Figure 10:
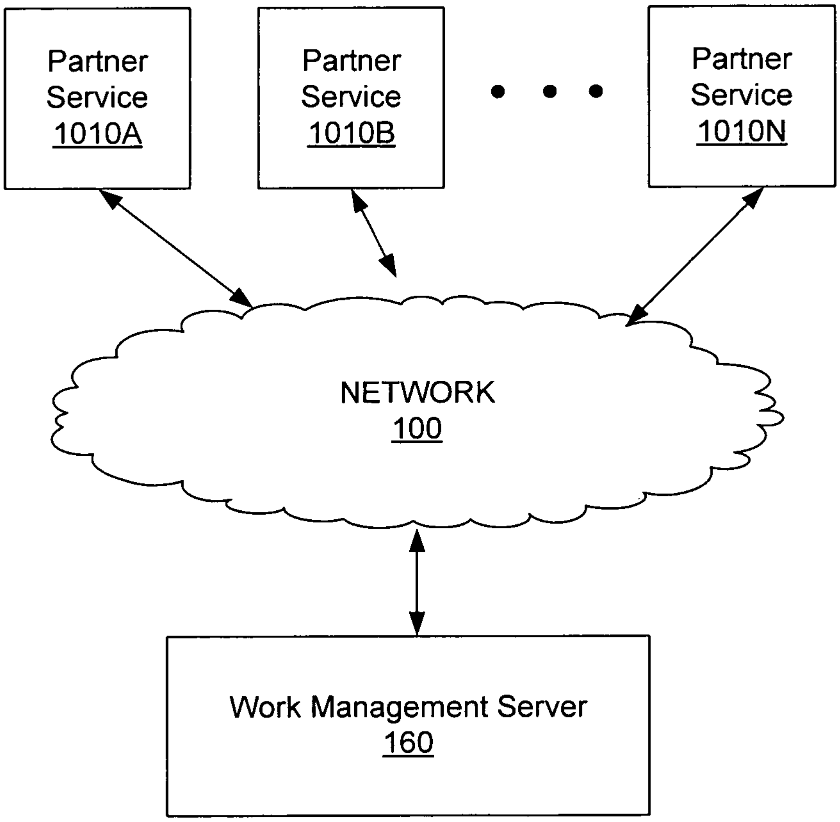
FIG. 10 is a block diagram illustrating a work management system interacting with partner services, according to one embodiment.

FIG. 10 is a diagram illustrating the work management system 160 interacting with partner services 1010A through 1010N, according to one embodiment. The partners systems 1010A through 1010N (hereinafter collectively referred to as "the partner services 1010") may include online partner sites such as Linden Labs' Second Life, World of Witchcraft, Facebook, Cragslist, MySpace, Twitter, Linked-In, and other social networking or on-line commerce sites. The partner services 1010 coupled via the network 100 to the work management server 160. Each partner service stores data such as user profiles, user avatars, environments, etc. The user profiles in the partner services may include data associated with an avatar, job skills, job preferences, etc.

In one embodiment, the work management server 160 allows users (both job owners and workers) to connect to avatars or similar on-line personas used with the partner services 1010. A user may, for example, combine work and play using such linked avatars or other on-line personas.

A "space travel" type approach may be used to shift the same avatars or other online personas between different partner services and the work management server. Further, the work management server 160 may accommodate port holes, allowing users to seamlessly move between the partner services 1010 and the work management server 160. The reputation of a person represented by an avatar or online persona may be displayed on the user terminals 130, 140.

For example, an avatar or an online persona may wear badges described above in detail with reference to FIG. 9.

The work management server 160 may also employ a method for a classification system for online personas and avatars. For example, elite avatars with special features may be created for elite workers to allow the workers to reap benefits such as preferred job access.

Figure 11:
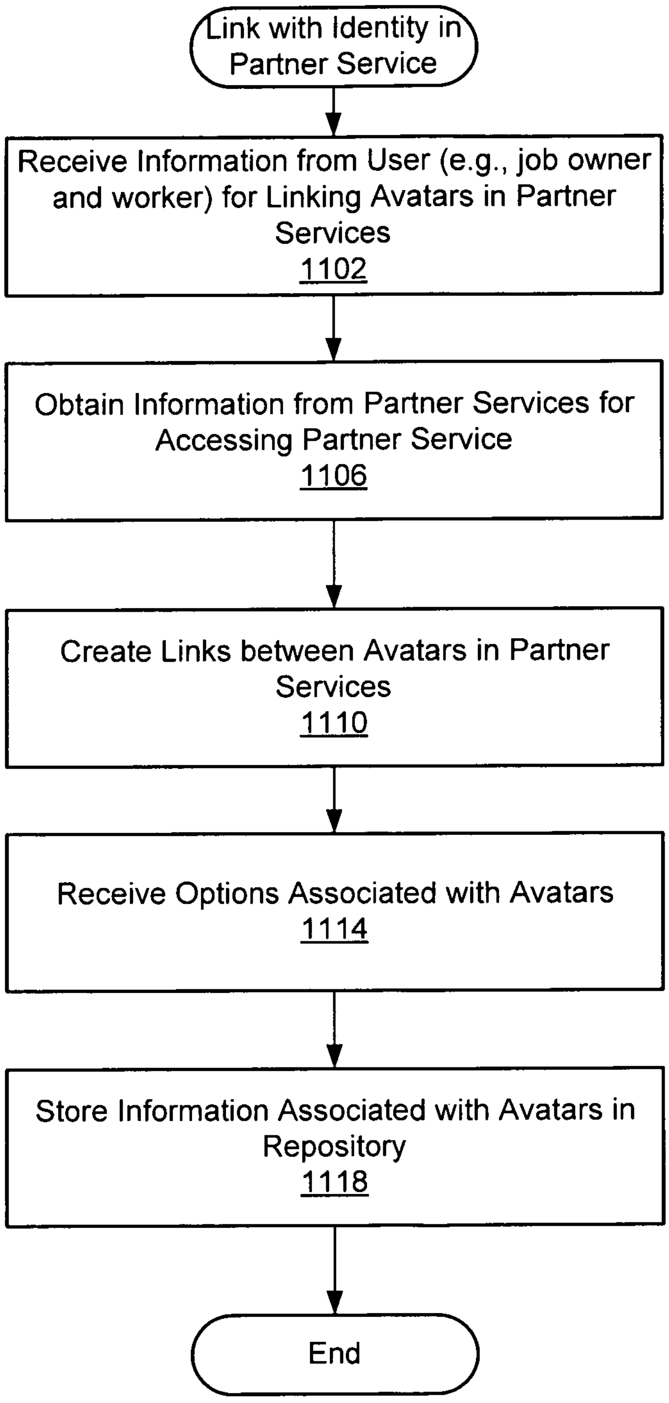
FIG. 11 is a flowchart illustrating a process of linking an identity of a user in partner services with the identity in a work management server, according to one embodiment.

FIG. 11 is a flowchart illustrating the process of linking an identity of a user in partner services with the identity of a work management server, according to one embodiment. Users enter information associated with avatars or online persona into the work management server 160. The information is received 1102 at the work management server 160. Information for accessing the partner services 1010 (e.g., a login ID and a password) is obtained 1106 from the partner services 1010. When the user logs in, links are created 1110 between the two avatar identities. The account data of the received partner services may be stored in the local repository 240 for future use. Various options associated with the avatars may also be received 1114 from the user. The available options include, for example, selecting a leisure suit for his avatar for certain recreation applications and a business suit for his avatar for business applications. The user's selections are then stored 1118 in the local repository 240 (and possibly in databases of the partner services).

Managing Reputation Scores

Figure 12A:
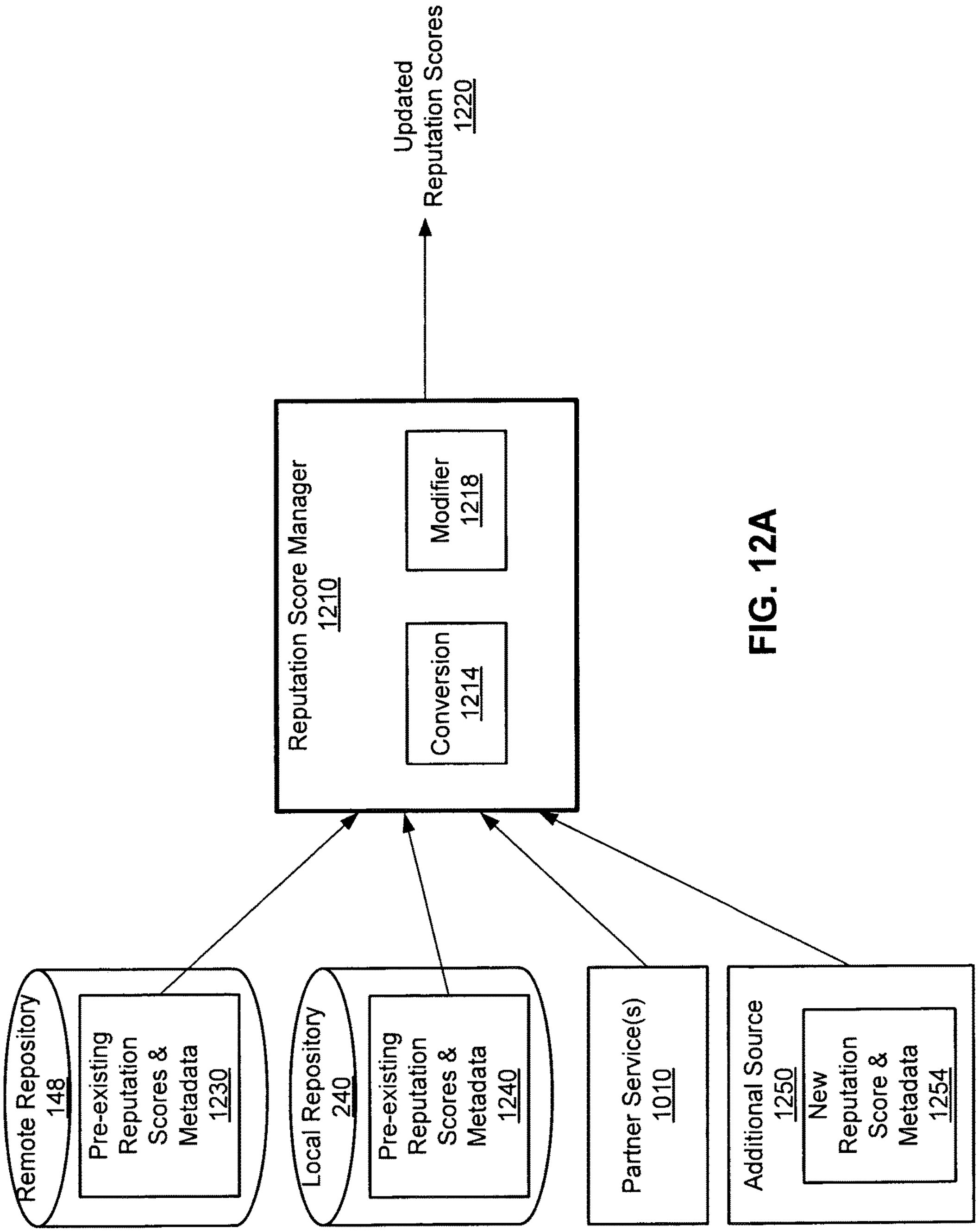
FIG. 12A is a block diagram illustrating a reputation score manager in a work management system, according to one embodiment.

FIG. 12A is a block diagram illustrating a reputation score manager 290 in a work management system 160, according to one embodiment. The reputation score manager 290 is responsible for gathering data from various sources and computing a reputation score for each user (e.g., a worker or a job owner). In the embodiment of FIG. 12A, the reputation score manager 290 collects information from the remote repositories 148, the local repository 240, the partner services 1010 and other additional sources 1250. The reputation score manager 290 processes information received from these sources and generates updated reputation scores 1220. The reputation score manager 290 may be coupled with the trust management module 274 to provide information needed for processing the trust quotients.

In one embodiment, the reputation score manager 290 receive pre-existing reputation scores and metadata 1230 from the remote repository 148, pre-existing reputation scores and metadata 1240 from the local repository 240, reputation scores from the partner services 1010 and new reputation scores and metadata 1254 from the additional source 1250.

In one embodiment, the reputation score manager 290 provides reputation scores on multiple categories. For example, in addition to an overall reputation score, each worker may be associated with reputation scores specific to: (i) completion of task, (ii) quality of task results, (iii) timeliness, and (iv) independence of execution. Similarly, each job owner, in addition to an overall reputation score, may be associated with reputation scores specific to: (i) clarity of job definition, (ii) accuracy of estimated time required, (iii) approval of work, and (iv) timeliness of approval.

In one embodiment, regression and machine learning techniques may be used to determine which methods are more accurate in predicting performance relative to the above reputation scores and how each factor should be weighted in the prediction. The reputation score manager 290 delivers the above eight reputation scores in addition to overall reputation scores.

In one embodiment, the reputation score manager 290 has a regression engine that automatically identifies the key independent variables for a worker or job owner: (i) across tasks, (ii) for a category of tasks, and (iii) for a given task. Thus, a worker and job owner's reputations are not only universal to all jobs, but are provided relative to the eight reputation scores for a specific task or category of tasks. For example, the reputation score may indicate that a worker completes 96% of all jobs he takes on, 100% of the audio transcription jobs he takes on, but only 88% of the franchise auditing jobs he accepts.

The math of regression engines is well-known to those skilled in the art. The quality of the predictions can be improved by Boosting algorithms, a machine learning technique that assists in the selection of independent variables and in the determination of the optimal weighting in the regression (boosting of the regression estimators).

To feed the regressions, the reputation score manager 290 collects detailed data as each job is executed on the characteristics of the worker and job owner and on the results. The reputation score manager 290 assembles a historical data set by which the task results (dependent variables) can be compared to (i) the characteristics of the workers who delivered them and (ii) the characteristics of the job owners that defined the Jobs and approved them (independent variables). The data set feeds the regression estimates.

The regression formulas for a given task or a category of tasks may need to be recalculated as new data is collected. The triggers for recalculation can be either periodic (if computing resources are not a factor) or they can be determined mathematically when analysis of the data set indicates that recalculation of the regression estimators may yield a statistically significant change. Example triggers may be that the relevant data set has increased substantially in size or that the averages or the median of an independent variable has shifted significantly.

Recalculation of the regression formulas should be distinguished from recalculation of the eight reputation scores for a worker or job owner. Ranking based on the eight reputations scores may be recalculated according to the regression formulas every time new data is collected on the worker or job owner, or every time a new task is defined.

In one embodiment, the reputation scores are displayed in the profiles of workers and job owners such that they can be examined by their counterparties to a transaction.

The reputation score may be used by job owners to prepare job descriptions and by workers in choosing which jobs they want to execute. The reputation scores may be (i) "algorithmic" metrics that may be captured automatically by the reputation score manager 290, (ii) "subjective" metrics based on subjective judgments or entries by the counterparty to a task, (iii) "redundancy-generated" metrics based on a third party arbiter of accuracy or quality in a "contest" in which two outputs are compared having been generated from the same inputs/directions, (iv) "3rd Party Data" metrics provided by sources such as First Data, Axciom, or ChoicePoint, (v) "credential" metrics include credentials such as academic degrees and professional, widely-recognized credentials (ex. CPA, CFA) (these may be verified or unverified by the work management system 110), (vi) "certification" metrics including badges, designations, and other certifications created by job owners or work management server 160, and (vii) "audit" which is a unique class of certifications in which the worker pays to be audited randomly and without knowing that a particular task is actually an audit. The auditor is a highly-trained and screened professional. The "audit" is designed for tasks with high subjectivity in which expert judgment is required to measure performance. An example of "audit" may be a legal procedure (e.g., incorporation) in which an attorney as a worker may pay for a "TopNotch" audit. By paying, the attorney (worker) gets the opportunity to be ranked by an expert posing as a job owner needing an incorporation procedure. The job owner may be ranked on a variety of criteria by the expert such as questions asked to inform the procedure, handling of a dispute, coverage of business issues, etc. Scripts may be created for such audits to automate the process.

In one embodiment, a job owner's reputation score on work approval rates may be based on (i) first-time approval rates that are measured as the percentage of tasks of a certain type that the job owner has approved or (ii) an overall job approval rates measured as the percentage of tasks a certain type that the job owner has approved. Both reputation metrics are algorithmic.

In one embodiment a job owner's reputation score on the time accuracy (i.e., accuracy of time estimate specified in a task description) is computed by as an average of ((required time as reported by worker—estimated time in task description)/estimated time in the task description). This percentage may be converted into a numerical ranking on a Likert scale wherein a 1 is bad and indicates that the calculation yields a large positive percentage, and 5 indicates a large negative percentage and indicates that the job owner significantly overestimated the time required for the task. The percentage can also be applied to the hourly pay specified by the job owner in the job description to obtain a predicted hourly pay (predicted by the work management server 160) that is adjusted by the amount to which the job owner is usually off in the estimate of time required. The reputational scores on the time accuracy may also be measured algorithmically by computing the following: (Required Time as measured by time usage of Media Player and other tools/Estimated Time in Task Description).

In one embodiment, job owners' reputation scores on the clarity of task are determined algorithmically by measuring the rate of questions from workers on the task description. Specifically, this reputation metric is measured based on the percentage of tasks in which the workers requested clarification on instructions, inputs and outputs of the task. The rate for instructions, inputs and outputs of the tasks may be measured independently. Messages between the workers and job owners through the work management server 160 may be tracked to count the number of requests on clarification. When drafting the messages, the worker may be required to provide the nature of the correspondence, for example, from a drop-down menu indicating that the correspondence is concerning clarifications of instructions, inputs or outputs of the task.

In one embodiment, a job owner's reputation score on timeliness approval is determined algorithmically by averaging the time between the worker's submission of the results of a task for approval and the time that the task is approved or rejected by the job owner. For tasks that the job owner rejects, the process may be reiterated and the average approval time may be obtained for multiple submissions and approval/rejection.

In one embodiment, a job owner's reputation score on responsiveness is determined algorithmically by tracking an average time elapsed between a worker's submission of a question and the job owner's response thereto.

In one embodiment, a worker's reputation score on task completion rate is determined by computing the percentage of tasks that are assigned to the worker and the tasks that is completed and approved.

In one embodiment, a worker's reputation score on on-time performance rates is determined algorithmically by calculating the percentage of tasks that are completed by the worker within the deadline specified by a job owner. The percentage may be adjusted if the delay is due to waiting for the job owner's answers in responding to worker's questions In one embodiment, a worker's reputation score on independence (i.e., the rate of questions on task descriptions) is determined algorithmically by computing the percentage of tasks in which the worker has requested clarification on instructions, inputs and outputs of the tasks. The rates may be measured independently for each of instructions, inputs, and outputs.

In one embodiment, a worker's reputation score on the quality of the work is determined algorithmically by at least one of (i) work approval rates, (ii) overall satisfaction rating from a job owner, (iii) matchup ratings and (iv) audits. The worker approval rates may be determined as first-time approval rates (measured as the percentage of tasks that job owners approved without subsequent iterations) and overall job approval rates (measured as the percentage of tasks that the job owners approved after requesting iterations). The overall satisfaction ratings are used on tasks that have subjective elements in the task. Inputs from the job owners may be 10-Likert point scale asked of job owners for any job wherein performance is subjective. Job owners' average satisfaction ratings may be normalized relative to ratings of other job owners. Job owner's characteristics such as (i) propensity for harsh or glowing satisfaction ratings, (ii) rating of the job owner, (iii) the amount of data available on the job owner, and (iv) the scope and history of engagements between the job owner and the work management system 110 may be considered. Ratings from job owners that have extensive history with the work management system 110 may be given more weight in determining the reputation scores of the workers. The matchup ratings is the percentage of match-ups that the worker wins in contests when a third party arbiter of accuracy or quality compares two results generated by different workers based on the same inputs and instructions. The work management system 110 may conduct audits for various types of jobs and adjust the reputation scores of the workers, accordingly.

In one embodiment, reputation reports may be generated and presented to workers and job owners after a job is completed and feedback has been provided. In the reputation reports, workers and job owners receive feedback on their performance against all of the above reputation scores for the particular task, and see how their overall reputation scores were modified.

In one embodiment, the reputation score manager 290 includes, among other components, a conversion module 1214 and a modifier 1218. The conversion module 1214 is responsible for translating different reputation scores collected from various sources into a normalized uniform score distribution for processing. For example, the partner services may use a scoring system different from the work management server 160 to assess the reputation of the users. The conversion module 1214 converts reputation scores from such sources into a score that is used by the work management server 160.

The modifier 1218 adjusts the scores provided by different users using statistic tools. The modifier 1218 normalizes the reputation score based on other users' typical rating ranges. For example, if, on a scale of 1 to 10, a user doles out only 7 s, 8 s, 9 s and 10 s, the user's ratings should be normalized so that 7 s are equivalent to a 1 or 2 in a normal distribution curve. The modifier 1218 analyzes the patterns of feedback given by the users and modifies reputation scores according to the history of previous feedbacks.

In one embodiment, metadata associated with the reputation scores are received with the pre-existing reputation scores available from different sources. The metadata may indicate the permissible range and the technique that were received for generating the pre-existing reputation scores. The metadata may associated with the reputation scores may be stored in the local repository 240.

Figure 12B:
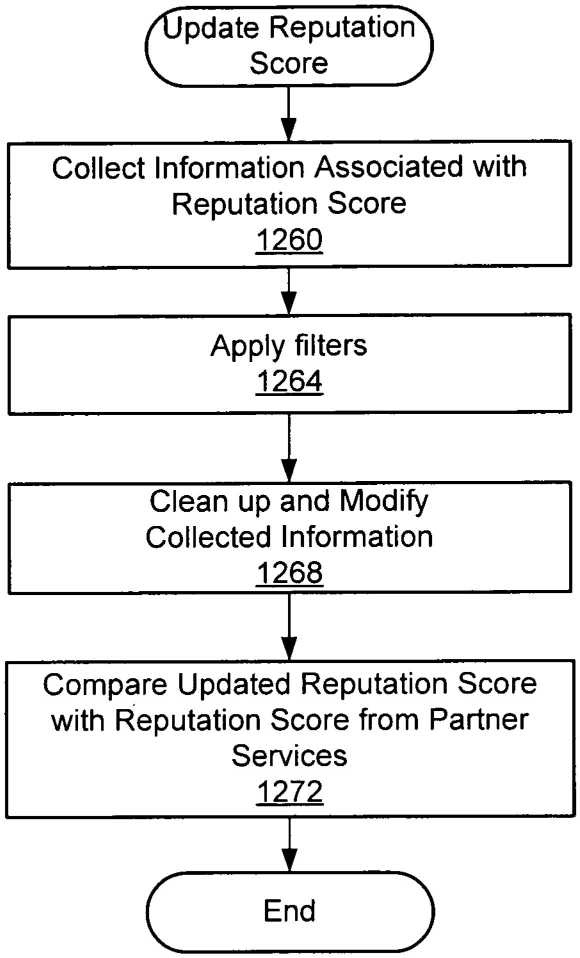
FIG. 12B is a flowchart illustrating a process of updating a reputation score, according to one embodiment.

FIG. 12B is a flowchart illustrating the process of updating a reputation score, according to one embodiment. First, the reputation score manager 290 collects 1260 information associated with computing the reputation scores from various sources. The reputation score manager (specifically, the conversion module 1214) applies 1264 filters to the collected information according to predefined rules. The modifier 1218 modifies 1268 scores based on previous history of feedbacks from an evaluating user, and then cleans up 1268 the information. As described above, the modifier 1218 normalizes collected data associated with different evaluating users. The clean-up eliminates or flags outliers (atypical data). The outliers may be subject to follow-up inquiries. In one embodiment, the reputation score manager 290 compares 1272 the updated reputation scores with ratings of the user in other systems to correlate data and verify its accuracy.

Based on the updated reputation score, a user (e.g., worker or job owner) may become qualified for award or introduced to new peer groups by the work management server 160. In one embodiment, a management module (not shown) in the work management server 160 performs various management functions including, among others, assigning users to one or more peer groups and tracking the awards given to the workers. The management module receives information from reputation score manager 290, the training and testing module 280 and/or the local repository 240 to update and manage user profiles in the local repository 240 associated with award or peer group.

In one embodiment, the reputation score manager 290 uses different variables to ensure consistency between reputation methodology calculations such as standard deviation and average. Variables can also be combined so that a constant mean value may be found. Then all values are scaled to fit a given range. Other variations pertain to the nature of the reputation score, which can be a simple number or a letter or icon representing reputation relative to others.

In one embodiment, the reputation score manager 290 logs in as the user and download ratings from the partner services 1010 to update the reputation score. In another embodiment, an account may be established to allow the reputation score manager 290 to access the partner services 1010. The partner services may be accessed to inspect rating information associated with the users from a public profile in the partner's services. The approach of collecting information from the public profile is less thorough and reliable than logging in as the user because the true identity of the user cannot be verified. In one embodiment, the reputation score manager 290 uses messaging mechanism provided by the partner services 1010 to verify whether the user is indeed the holder of the account in the partner services 1010.

Figure 12C:
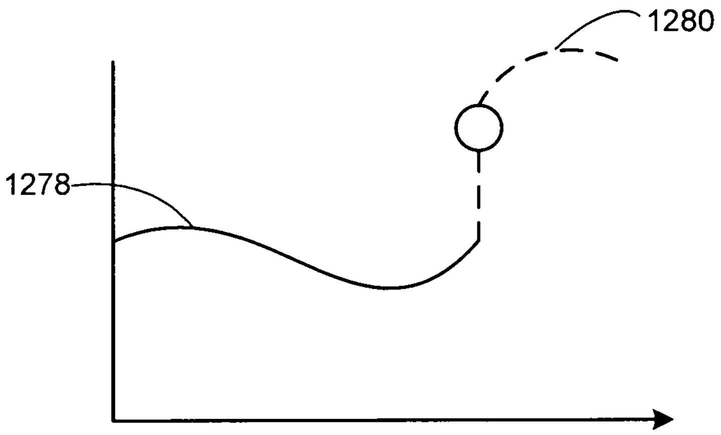
FIGS. 12C and 12D are graphs illustrating converting the value of a transferred reputation score, according to one embodiment.
Figure 12D:
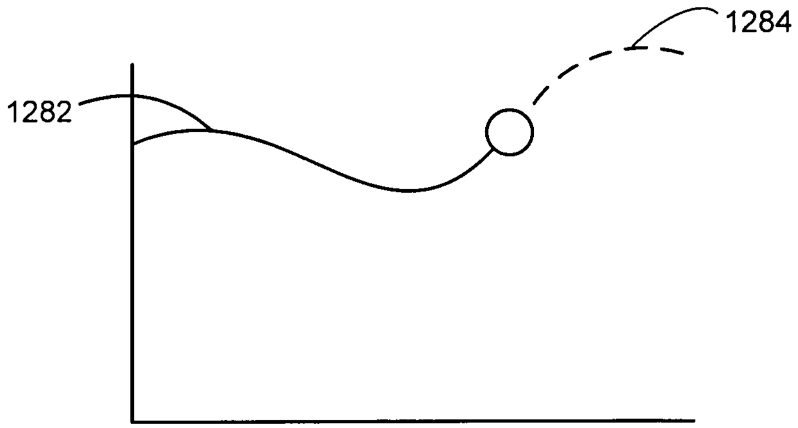

FIGS. 12C and 12D are graphs illustrating adapting the value of a transferred reputation score, according to one embodiment. A line 1278 represents a first reputation score according to one rating mechanism and a line 1280 represents a second reputation score using another rating mechanism. The data represented by the lines 1278 and 1280 may be retrieved from various sources such as the local repository 240 and other systems that a reputation score. Because the first and second reputation scores were generated using different rating mechanisms, the reputation scores need to be normalized. Using techniques such as comparative extrapolation, the reputation score manager 1210 may normalize the first or the second reputation scores. A line 1282 in FIG. 12D represents a rating in one system, and a line 1280 represents the line 1278 normalized to match the line 1284. The reputation score manager 1210 then stores the normalized reputation score in the local repository 240 and/or makes the normalized reputation score available for other external systems.

Location-Based Task Assignment

Figure 13A:
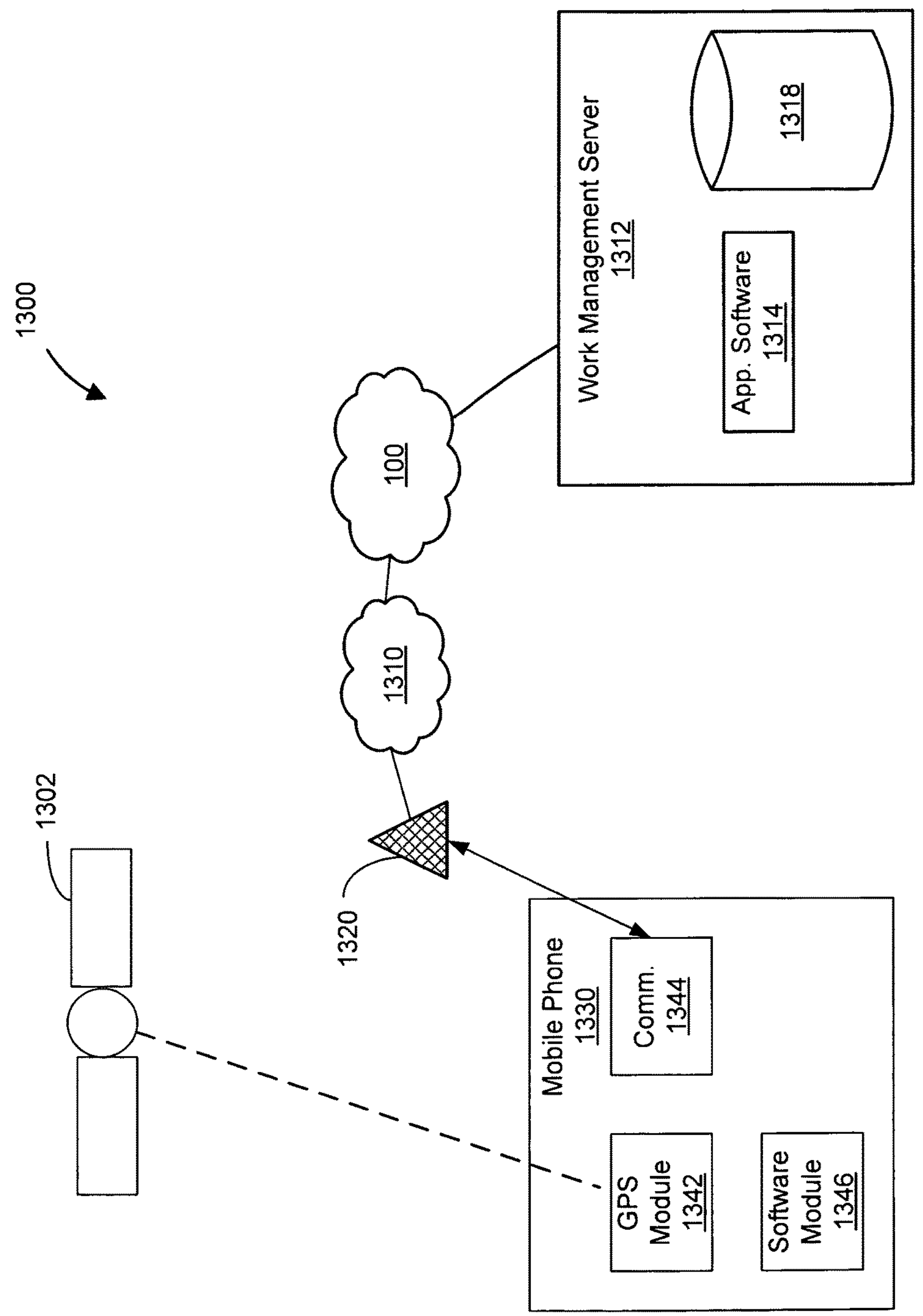
FIG. 13A is a block diagram illustrating components of a location-based work management system, according to one embodiment.

FIG. 13A is a diagram illustrating the components of a location-based work management system 1300, according to one embodiment. The work management server 1312 hosts application software 1314 and a data repository 1318. The work management server 1312 is coupled via the network 100 to a wireless network 1310. The wireless network 1310 allows the work management server 1312 to couple wirelessly via a tower 1320 to a mobile phone 1330.

The mobile phone 1330 includes a communication module 1344 that allows the mobile phone 1330 to communicate with the work management server 1312. The mobile phone 1330 is, for example, a GPS (Global Positioning System) enhanced smartphone. GPS module 1342 communicates with GPS satellite(s) 1302 to obtain the location data of the mobile phone 1330. Other well known positioning techniques including but not limited to radio triangulation, inertial navigation, magnetic navigation, may also be used. The mobile phone 1330 includes a software module 1346 for running software such as a browser, a phone operating system, plug-ins, and applications downloaded from the work management server 1312. The mobile phone 1330 is merely an example and various other types of portable devices such as a laptop with cell phone card and triangulation function may be used.

Figure 13B:
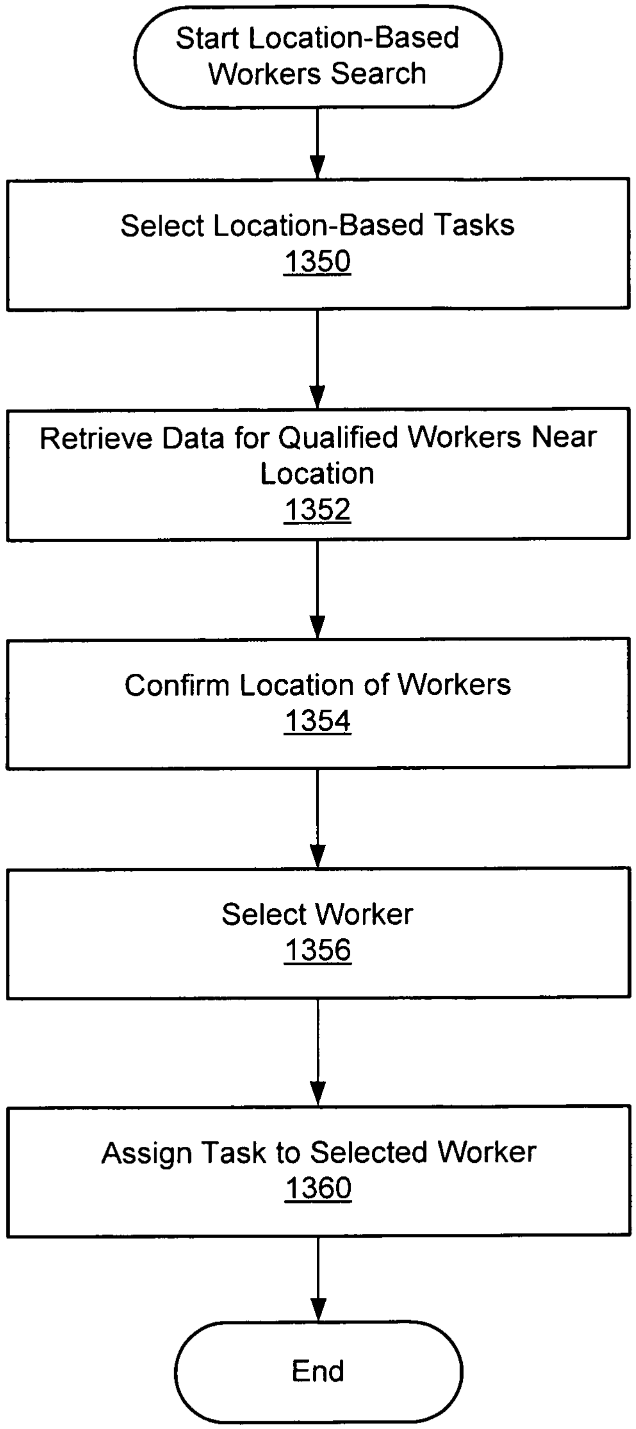
FIG. 13B is a flowchart illustrating a process of searching workers based on location, according to one embodiment.

FIG. 13B is a flowchart illustrating the process of searching workers based on locations, according to one embodiment. First, the work management server 1312 selects 1350 a task. This task selection may be performed continuously or repeated by a software daemon to look for unassigned tasks. The work management server 1312 retrieves 1352 data from data repository 1318 about qualified workers whose location matches the location associated with the selected task.

The work management server 1312 confirms 1354 the location of the worker. The distance to the worker from the location associated with the selected task may also be computed. The workers are then filtered and selected 1356 based on the location of the worker. When filtering and selecting the workers, various factors may be considered. Such factors include, for example, the time and cost of travel, and tickets or fees that may be necessary to access the location (e.g., a ball park or a toll road). By using such filtering criteria, the cost associated with the task may be reduced. If a task is associated with a ball park or a toll road, only workers already in the ball park or driving on the toll road may be selected. These workers need not pay for entrance fee to the park or toll fee, and therefore, the cost associated with the task may be reduced.

After the worker is selected, the task is assigned 1360 to the selected worker. In one embodiment, messages may be sent to the worker so that the worker may perform the location-based task. The messages may contain a URL (Universal Resource Locator) or attached with software to allow the worker to conveniently perform the tasks.

Figure 13C:
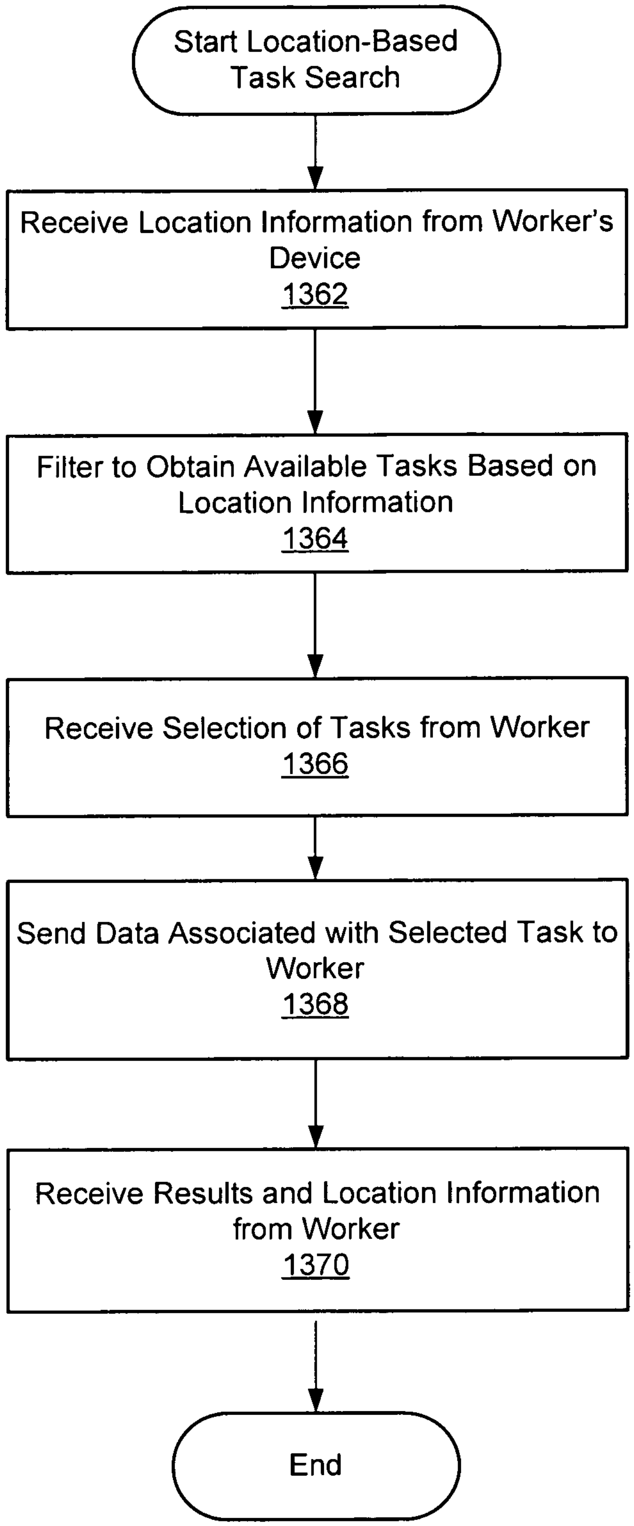
FIG. 13C is a flowchart illustrating a process of searching tasks based on locations, according to one embodiment.

FIG. 13C is a flowchart illustrating the process of searching tasks based on locations, according to one embodiment. First, the work management server 1312 receives 1362 the worker's location from the mobile phone 1330. Based on the worker's location, the work management server 1312 filters 1364 the tasks within a certain radius or in an area to obtain available tasks. The worker may set the radius or area (e.g., within a ball park, a toll road, inside an international terminal) to filter the available tasks. The worker's selection of the tasks is received 1366 at the work management server 1312. The data associated with the selected task is then sent 1368 to the worker. The results of the tasks are received 1370 from the worker. In one embodiment, the location information is also received 1370 from the worker to confirm that the task was performed within the required location.

In one embodiment, the work management server 1312 may deliver data and/or software needed for the work as a package to the mobile phone 1330 to facilitate the worker to perform the task. The mobile phone 1330 may be adapted to process the special package of software and data for performing the task.

In one embodiment, the work management server 1312 records the location of workers both prior to performing the task and after performing the task. The worker's current and planned locations may also be stored. Further, the work management server 1312 may allow the worker to narrow down the locality where the worker is searching for work. For example, if the task is designated to be performed in the San Francisco Bay Area, the work management server 1312 may offer task location information with finer-granularity (e.g., task to be performed in San Jose, Berkeley, San Francisco, etc.).

In one embodiment, the work management server 1312 packages data, software and communication tools, for jobs into a single binary object (package) including a message and the information necessary to start the task immediately.

In one embodiment, the work management server 1312 creates geographically-oriented advertisement tasks. The tasks may ask users in a certain region, for example, to visit a place or to purchase certain items and test them. Narrow targeted users may be reached based on geographic location by finely tuning geographic location where the users are residing to maximize the effect of advertisement.

Intermediator Support

An intermediator is an entity that receives one or more tasks from a job owner, divides the tasks into subtasks and then distributes some or all of the subtasks to workers. The intermediator includes general contractors who perform at least part of the task themselves. The intermediator may also have skills, specialized knowledge or experiences in reorganizing or restructuring tasks so that the tasks may be performed by more workers. Using such skills, knowledge or experiences, the intermediator may prepare a reorganization scheme for jobs or tasks and send the reorganization scheme for a fee to an interested party (e.g., job owner). The intermediators assist job owners to take full advantage of the work management system 110 by allowing the job owners to assign tasks to workers that would otherwise remain without any eligible or capable workers to take on the tasks.

Figure 14A:
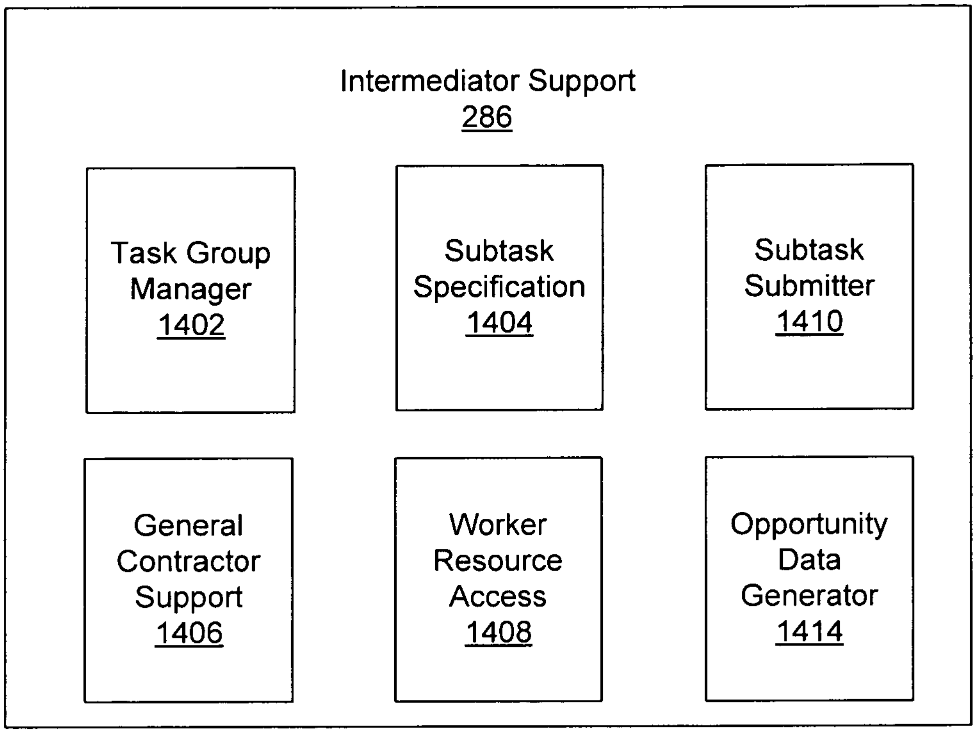
FIG. 14A is a block diagram illustrating an intermediator support module, according to one embodiment.

FIG. 14A is a block diagram illustrating the intermediator support module 286, according to one embodiment. The intermediator support module 286 may include, among other components, a task group manager 1402, a subtask specification module 1404, a general contractor support module 1406, a worker resource access module 1408, a subtask submitter 1410, and an opportunity data generator 1414. One or more of these components may be combined into a single code module or be split into one or more components. Further, one or more of these components may be implemented on other modules of the work management server 160.

The task group manager 1402 allows two or more job owners, workers or intermediators to form entities. In one embodiment, the task group manager 1402 is software or routines executed by a processor. The entities may be organized into a hierarchy reflective of a real enterprise or organization (e.g., established company) or have a hierarchy in the form of an ad hoc group formed for the work management system 110. The enterprise or organization can range from a small business enterprise including a couple of members to a large business enterprise with thousands of members. Each entity in an enterprise or organization may perform certain specialized functions (e.g., accounting and human resources management). Workers or intermediators may be assigned to two or more entities and managed by the task group manager 1402. The task group manager 1402 generates information related to identity of entities, members included in the entities, and the relationship between the entities. Such information may be stored in the local repository 240 or in the task group manager 1402.

In one embodiment, an entity in an organization or an enterprise may distribute jobs or tasks to other entities in the enterprise using the work management system 110. If the jobs or tasks are not taken by other entities within the same enterprise or organization, the jobs or tasks may be made available to entities or workers outside the enterprise or organization. Entity publishing the jobs or tasks may be made anonymous by an anonymizer module 1806, as described below in detail with reference to FIG. 18A. Managing the jobs or tasks in such manner establishes a mechanism that allows groups in the same enterprise or organization to compete with each other and entities outside the organization or enterprise. In this way, more efficient distribution of tasks may be carried out.

The subtask specification module 1404 allows an intermediator to generate task descriptions. The intermediator analyzes assigned tasks, and generates task descriptions in a manner similar to generating a job description using the subtask specification module 1404. The subtask submitter 1410 receives the task description generated by the subtask specification module 1404, and forwards the task-subtask description to the workflow engine 258.

The general contractor support module 1406 is responsible for supporting various operations by general contractors. The general contractor support module 1406 may assist the general contractors to divide the task assigned into subtasks for other workers, track the process of work by the workers, and plan expenses associated with each subtask.

The worker resource access module 1408 allows the intermediators to find a pool of workers not participating in the work management system 110. The worker resource access module 1408 may communicate with one or more systems that store information about available workers. Such systems include, for example, databases of state employment offices. The intermediators may access such external systems via the worker resource access module 1408 and search for workers who may work on subtasks under the supervision of the intermediators.

Figure 14B:
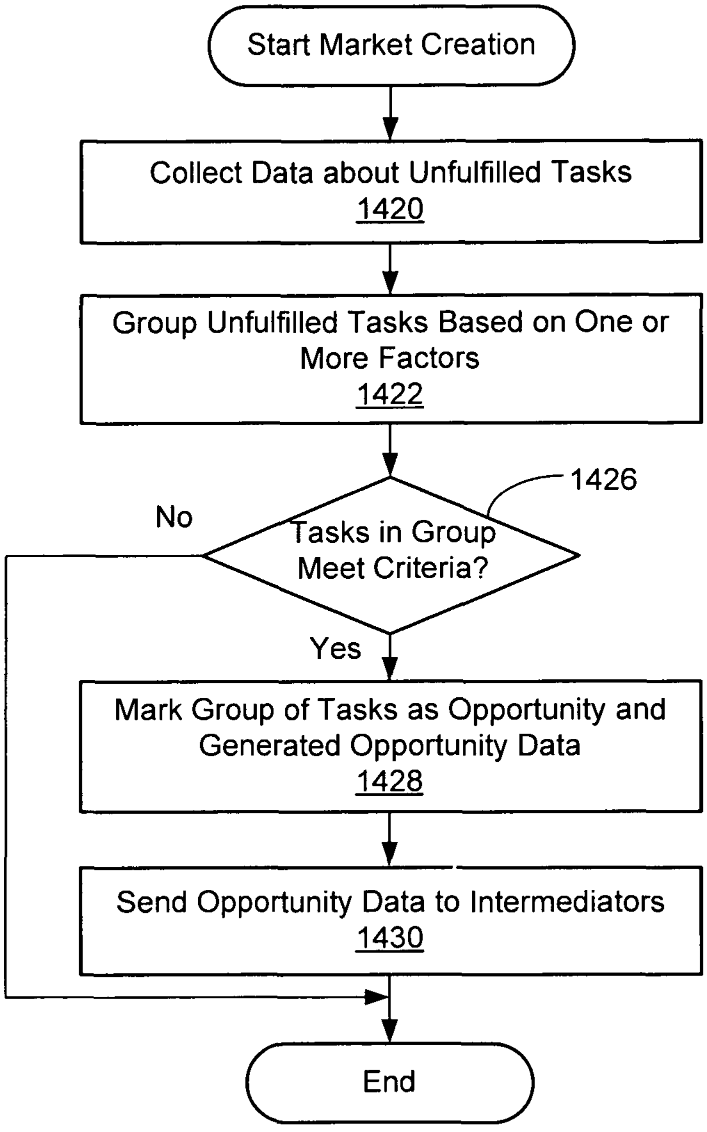
FIG. 14B is a flowchart for illustrating a process of creating a market for a category of tasks, according to one embodiment.

The opportunity data generator 1414 is responsible for generating and sending opportunity data to the intermediators. The opportunity data indicates type of jobs or tasks that are not being successfully fulfilled using the work management system 110. The reason that the job or task is not being fulfilled may be due to various reasons including, among others, high qualification or requirements for tasks, unreasonably high expectations of job owners which lead to majority of worker's results being rejected by the job owners, and poorly defined jobs and tasks. The opportunity data generator 1414 may retrieve and analyze job postings from the local repository 240 and/or the remote data repositories 148 to detect possible opportunity for the intermediator to participate. The opportunity data generator 1414 may grade work requests by volume to see if there are enough requests to create a new market by modifying the job description or by providing training. The opportunity data generator 1414 may consider various parameters including but not limited to the number of unfulfilled tasks of similar characteristics, the number of hours and compensation associated with task, and the total value of the job or task. The opportunity data generator 1414 then determines which job postings are worth analysis, and send the information in the opportunity data to intermediators FIG. 14B is a flowchart for illustrating the process of creating a market for a category of jobs by using the opportunity data generator 1414, according to one embodiment. First, the opportunity data generator 1414 collects 1420 information about unfulfilled tasks from the local repository 240 and/or the remote data repositories 148. Unfulfilled tasks are then grouped 1422 based on one or more factors such as worker qualifications, job descriptions and salary. The opportunity data generator 1414 then determines 1426 whether the grouped tasks satisfy criteria for creating a market. If the group of tasks does not meet the criteria, then the process ends. If the group of tasks meets the criteria, then the tasks are marked 1428 as opportunity and the opportunity data associated with the group of tasks are generated. The opportunity data is then sent 1430 to intermediators who have registered for certain types of opportunities. The notification to the intermediators may be send via a variety of communication means, including but not limited to emails, SMS (Short Message Service), and instant messages. Then the process terminates.

In one embodiment, the opportunity data generator 1414 runs periodically, for example, every hour, every week or every day to generate the opportunity data. The opportunity data generator 1414 may look for several types of opportunities at the same time, and may send out notifications to different groups of intermediators depending on what types of opportunities the intermediators have registered for.

Figure 14C:
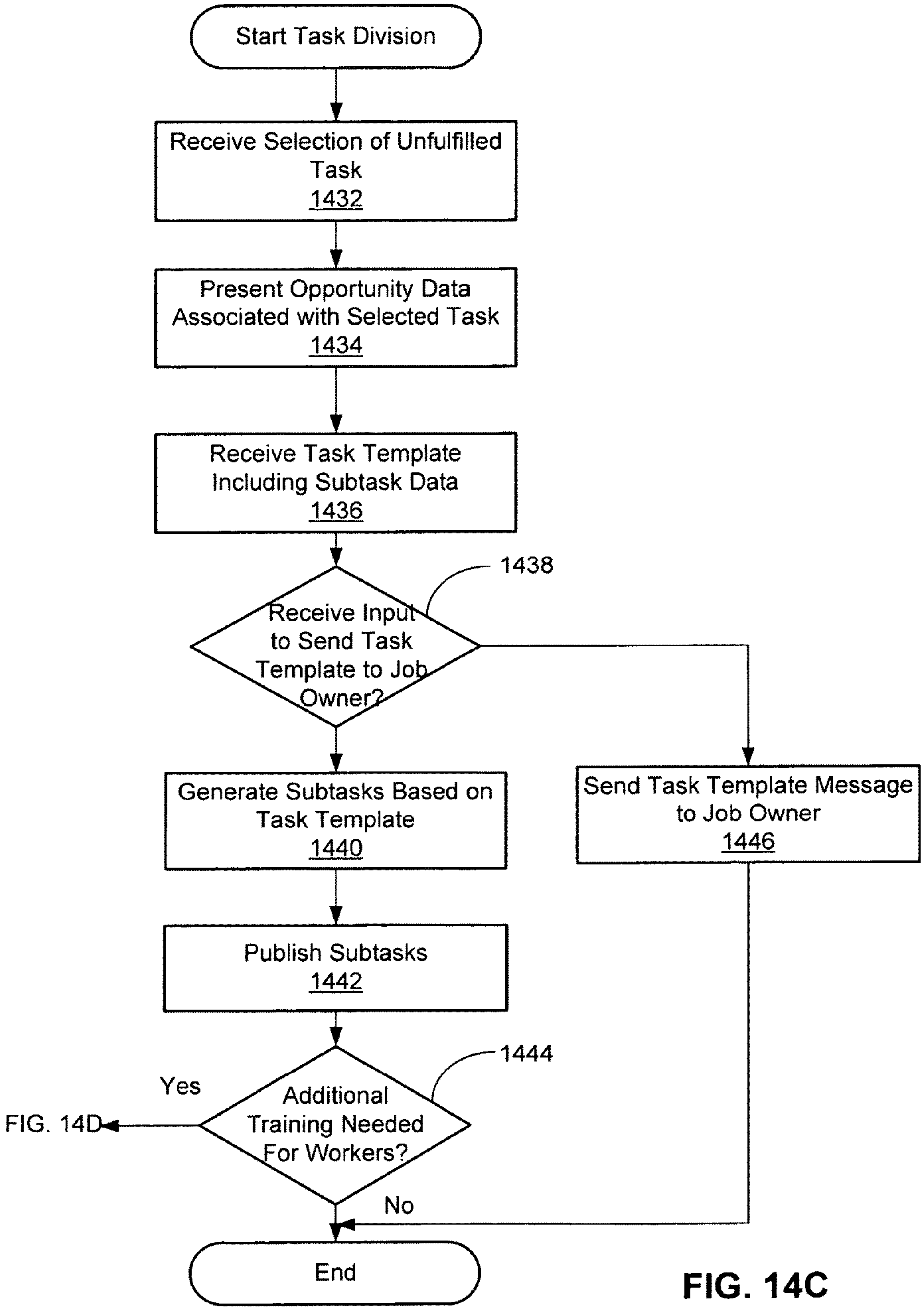
FIG. 14C is a flowchart for illustrating a process of dividing tasks into subtasks by an intermediator, according to one embodiment.

FIG. 14C is a flowchart for illustrating the process of dividing tasks into subtasks by an intermediator, according to one embodiment. The opportunity data generator 1414 receives 1432 selection of unfulfilled tasks by the intermediator. The opportunity data generator 1414 retrieves the opportunity data from the local repository 240 and/or the remote data repositories 148 and presents 1434 the opportunity data to the intermediator. The intermediator then creates subtasks for the selected task based on the intermediator's expertise.

Specifically, the intermediator arbitrates between the demands of the job owner and the capabilities of the available workers to design task template organizing the task into subtasks. By dividing the tasks in different ways, workers who might not be qualified to take on a larger task may be qualified to take on one or more smaller subtasks. The intermediator generates a task template including subtask data representing how the task should be divided and organized into subtasks. The task template is then received 1436 at the opportunity data generator 1414. It is then determined 1438 whether an input is received to send the task template to the job owner. After generating the task template, the intermediator can decide whether to offer the task template to the job owner (sell the know-how of how to divide the task) or to take on a role as an intermediator and assign the tasks to other workers. If the intermediator decides to offer the task template to the job owner, a message including the task template may be sent 1446 to the job owner possibly in return for payment of fees by the job owner.

If the intermediator decides not to offer the task template to the job owner and instead decides to serve as an intermediator, the intermediator may generate 1440 subtasks based on the task template. The intermediator then publishes 1442 the subtasks as generated by the task template. Then it is determined 1444 whether additional training is needed for the workers applying for the task. If no additional training is needed, the process ends. If additional training is needed, the process continues with training the workers, as described below with reference to FIG. 14D.

Figure 14D:
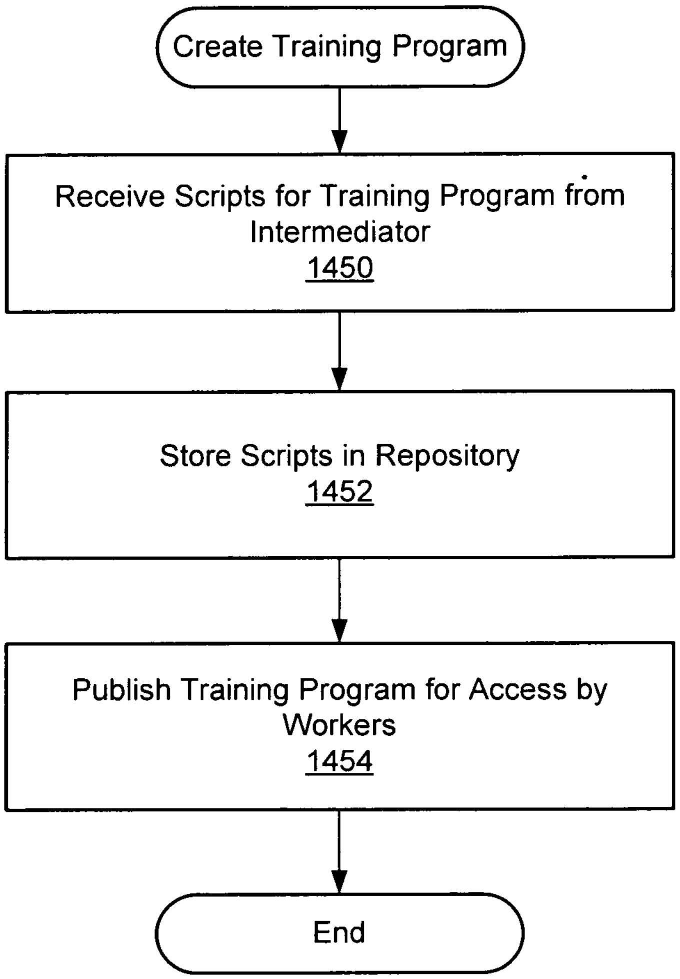
FIG. 14D is a flowchart for illustrating a process of creating a training program by an intermediator, according to one embodiment.

FIG. 14D is a flowchart for illustrating the process of creating a training program using a training and testing module 280, according to one embodiment. First, the training and testing module 280 receives 1450 the scripts for running a training program from a designer of the training program (e.g., the intermediator). The scripts are stored 1452 in the local repository 240 and/or the remote data repositories 148. The training program is then published 1454 and made available to the workers (and/or other interested parties) by the training and testing module 280. In one embodiment, only candidate workers passing a test administered after the training are allowed to sign up for the subtask. The training may also be interactive, where the candidate worker is required to participate proactively. Throughout the training, skilled individuals may participate in training of the candidate workers and provide feedbacks to the candidate workers. Training may be performed using a variety of devices such as an MP3 player or an iPhone, for example. By training, the worker may become eligible to take on the subtasks as designed by the intermediator.

In one embodiment, the training and testing module 280 evaluates the effectiveness of the training. After training is accomplished, the work management server may determine if the training was effective by comparing pre-training and post-training results, and comparing workers who completed the training and workers who did not complete the training. Also included could be a method of employer rating, allowing individuals to provide input to ratings of employers, and using impartial information to give employers reputations. For example, an employer who fills out task instructions minimally and gets poor results from workers may be seen as worse than ones that provide fully described tasks.

Task Modification

Figure 15A:
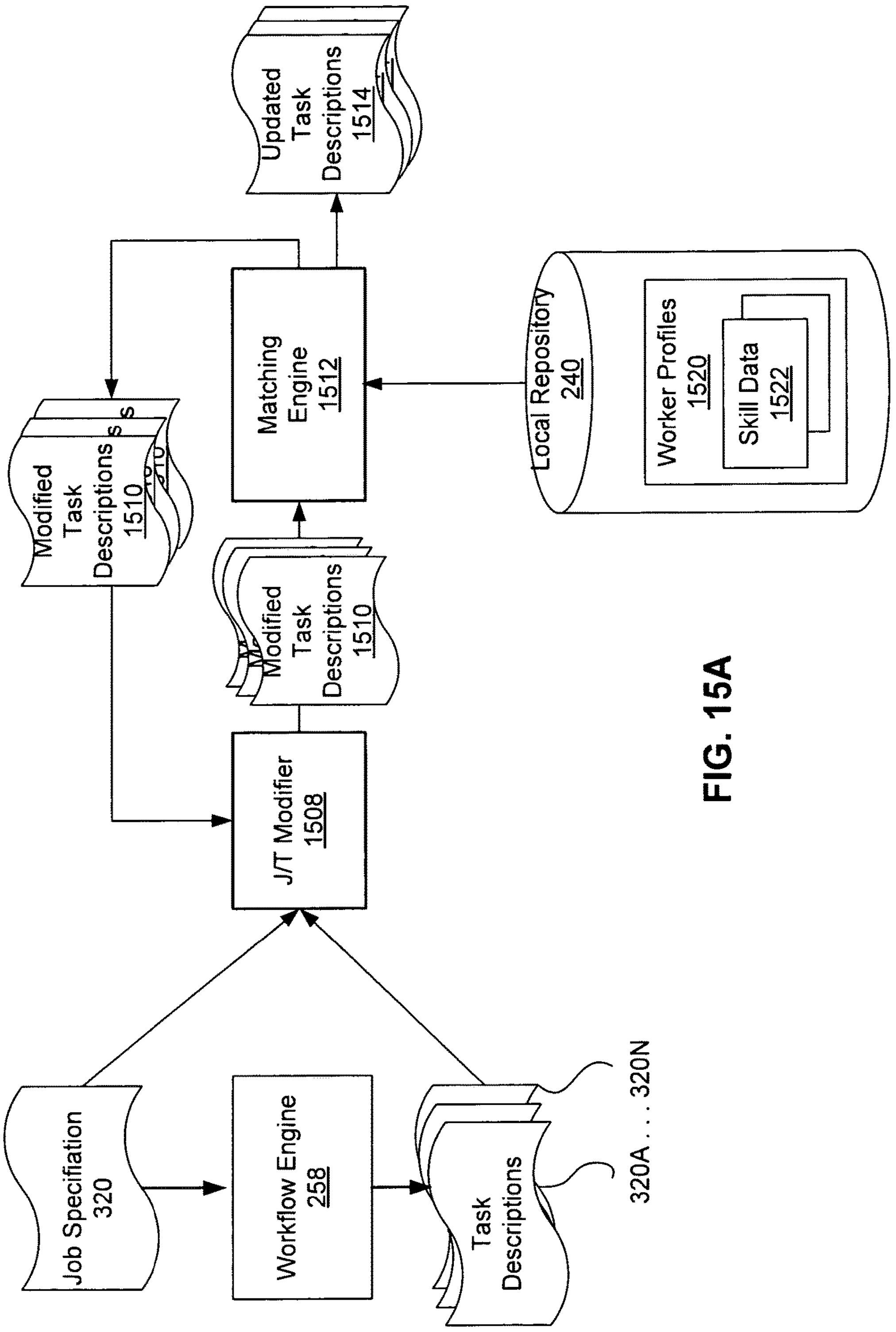
FIG. 15A is a block diagram illustrating components associated with modifying tasks, according to one embodiment.

FIG. 15A is a diagram illustrating components associated with modifying tasks to find a sufficient pool of candidate workers, according to one embodiment. After the job description 314 is generated by the job/task specification module 254, the job description 314 is fed to the workflow engine 258. The workflow engine 258 reads the job description 314 and generates task descriptions 320A through 320N. Each task description 320 is associated with one task to be assigned to a worker.

The task descriptions 1504 generated by the workflow engine 258 may need modification for one or more reasons. For example, the restrictions or qualification as required by the task descriptions 320 may be too restrictive and result in an excessively small pool of eligible workers. Alternatively, the task descriptions may leave some fields remain unfilled to be filled automatically by an algorithm. For example, the job owner may set a ceiling for the total expense associated with a job, and may want to design tasks to obtain optimal results within the capped total expense. In such case, the fields associated with the budget for each task may remain unfilled in the task descriptions and optimized using an algorithm implementing an optimization process.

The J/T (Job/Task) modifier 1508 receives the job description 314 and the task descriptions 320. The J/T modifier 1508 then generates modified task descriptions 1510 by modifying one or more fields of the task descriptions 320. The modified task descriptions 1510 are then fed to a matching engine 1512 to determine if the modified task descriptions 1510 satisfy one or more criteria. If the criteria are not satisfied, the modified task descriptions 1510 are again fed to the J/T modifier 1508 to further modify the task descriptions. The process of modifying the task descriptions and evaluating by the matching engine 1512 may be performed recursively until the criteria are met. If the modified task descriptions satisfy the criteria, the modified task descriptions are output as updated task descriptions 1514. The updated task descriptions 1514, with the job owner's approval, may be posted for workers' application for the tasks.

In one embodiment, the criteria evaluated at the matching engine 1512 include the number of eligible workers. The requirements or qualifications of the workers are gradually lowered by the J/T modifier 1508 until the pool of eligible workers reach a predetermined value. The data associated with the operation of the matching engine 1512 may be stored in the local data repository 240.

Additional tasks may also be created by the J/T modifier 1508. The J/T modifier 1508 may find skills (stored in the local repository 240) relevant to additional tasks by using ontology, a search engine, or other well known schemes of finding items in a set.

In one embodiment, the number of available workers based on skills or requirements (e.g., location and timeliness). The work management server 160 may offer sliders in job creation forms so that the job owner can simply move the sliders until a sufficiently large pool of potentially available workers is generated.

In one embodiment, tasks issued from the matching engine 1512 are stored in the local repository 240 as a set of issued tasks. The completed tasks may be reviewed to detect any discrepancies or problems in the issued tasks. The detected discrepancies or problems may be used next time tasks are generated to avoid the same discrepancies or problems.

Figure 15B:
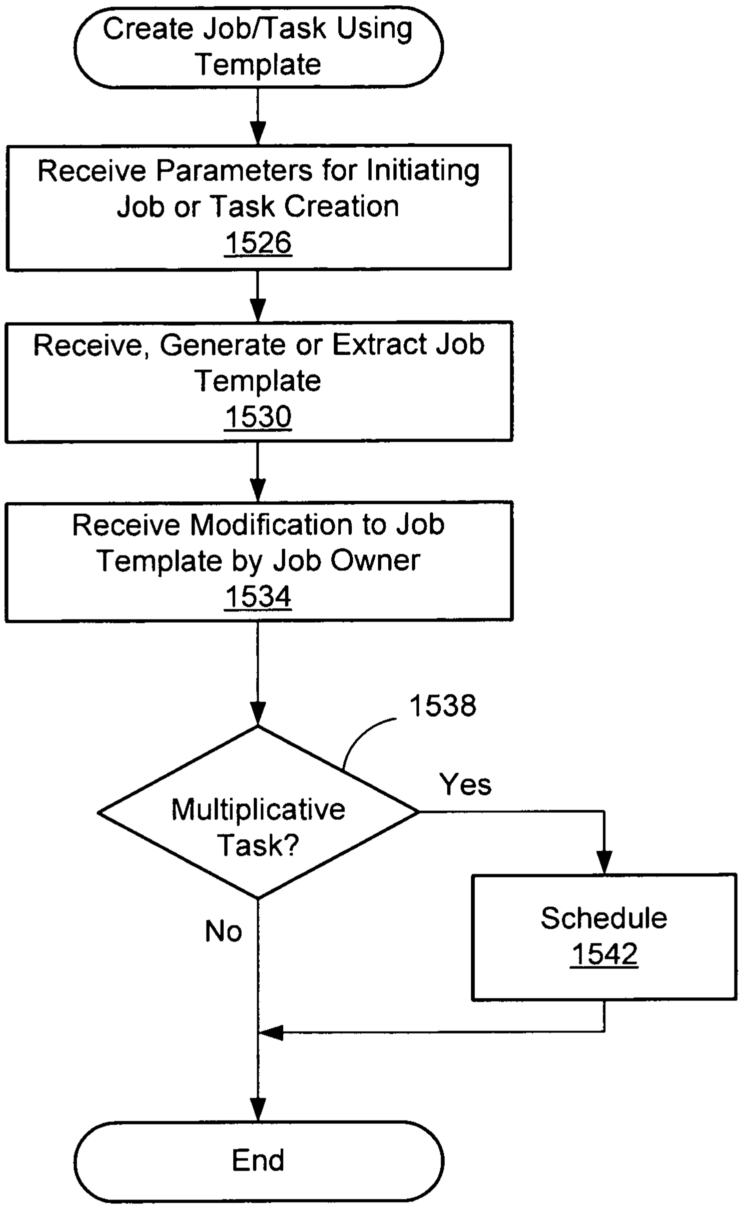
FIG. 15B is a flowchart illustrating a process of creating jobs or tasks using a template, according to one embodiment.

FIG. 15B is a flowchart illustrating the process of creating jobs or tasks using a template, according to one embodiment. The work management server 160 receives 1526 parameters (e.g., the identity of the job owner) for initiating job or task creation. All or part of the parameters may be retrieved or updated from the local repository 240 into the relevant data structures. A job template is received, or generated, or extracted 1530. The job owner then modifies 1534 the job template considering, among other things, available skills stored in data repository 1303. Additional items such as scheduling, time of day, or time required to complete the job or task may be modified by using scheduling data stored in the local repository 240 or by calculating from available data. Geography data, job experience, skills and other job considerations for the tasks may also be modified.

The work management server 160 then asks the job owner if this task is a multiplicative job. Multiplicative tasks are of two kinds: (i) repetitive tasks that occur at a certain frequency (e.g., checking a bathroom for cleanliness at a fast food restaurant on a daily, hourly or weekly basis) and (ii) parallel tasks where multiple people are assigned the same task and can be performed in parallel (e.g., 100 people assigned to the task of reviewing a movie). The repetitive task typically can be performed by the same person, and in some cases, even desirable for consistency. In contrast, parallel tasks cannot be performed by the same person. In some cases, a task may be both repetitive and parallel (e.g., a task to be performed by 100 people once within a week or by fewer people twice within a week). If it is determined 1538 that the task is not multiplicative, the process terminates. If it is determined 1538 that the task is multiplicative, the required number of tasks is scheduled 1542 and then the process ends.

Risk Management

Figure 16A:
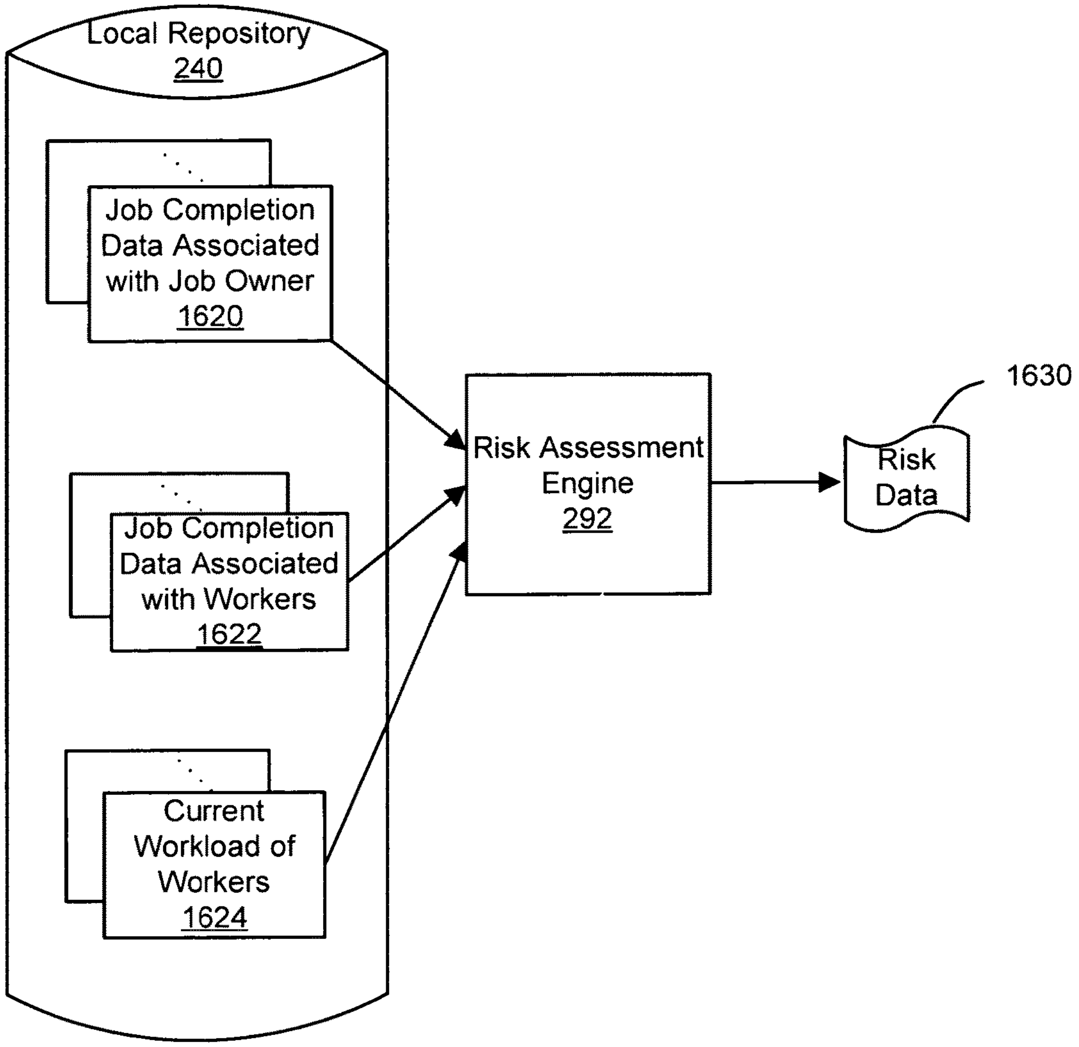
FIG. 16A is a block diagram illustrating components for assessing risks associated with a job or task, according to one embodiment.

FIG. 16A is a diagram illustrating the components for assessing risks associated with the completion of a job or task, according to one embodiment. A risk assessment engine 292 receives multiple data sets including, among others, job completion data associated with job owner 1620, job completion data associated with workers 1622, and current workload of workers 1624 to generate risk data 1630 indicating the level of risk associated with the completion of the job. The job completion data may include the ratio of successfully completed previous jobs or tasks against the total number of previous jobs or tasks. The risk data 1630 may be used to set insurance premium for purchasing an insurance policy that covers losses due to unsuccessful or incomplete termination of the job.

The unsuccessful completion of the task may be attributable to job owners or workers. For example, job owners may not give sufficient data or clear instructions, and thus, none (or a very low percentage) of their workers complete the tasks. The risk assessment engine 292 may analyze data associated with job owners, normalize the values, and compare the values with those of peer job owners. Similarly, a worker may have problems finishing work or finishing on time across multiple job owners or only when doing jobs for a certain job owner. Therefore, a detailed data set is maintained to determine what is causing the incompletion of the tasks.

In one embodiment, the risk assessment engine 292 may also consider other factors such as past payment history of job owners, reports of disputes or other legal actions, reputation data, and track record of timely completed job or tasks to calculate a risk associated with a job. Such data may be analyzed using methods well known to insurance underwriters.

In one embodiment, additional information such as whether a person has been involved, independently or as part of group, in disputes, fraud allegation, or other types of work-related adversarial or criminal legal actions may be considered in computing the risk data 1630. The risk data 1630 is stored in the local repository 240 as a separate data entry or be incorporated into the risk profile of workers. The risk data 1630 may be used, for example, to compute the premium of the insurance policy.

Figure 16B:
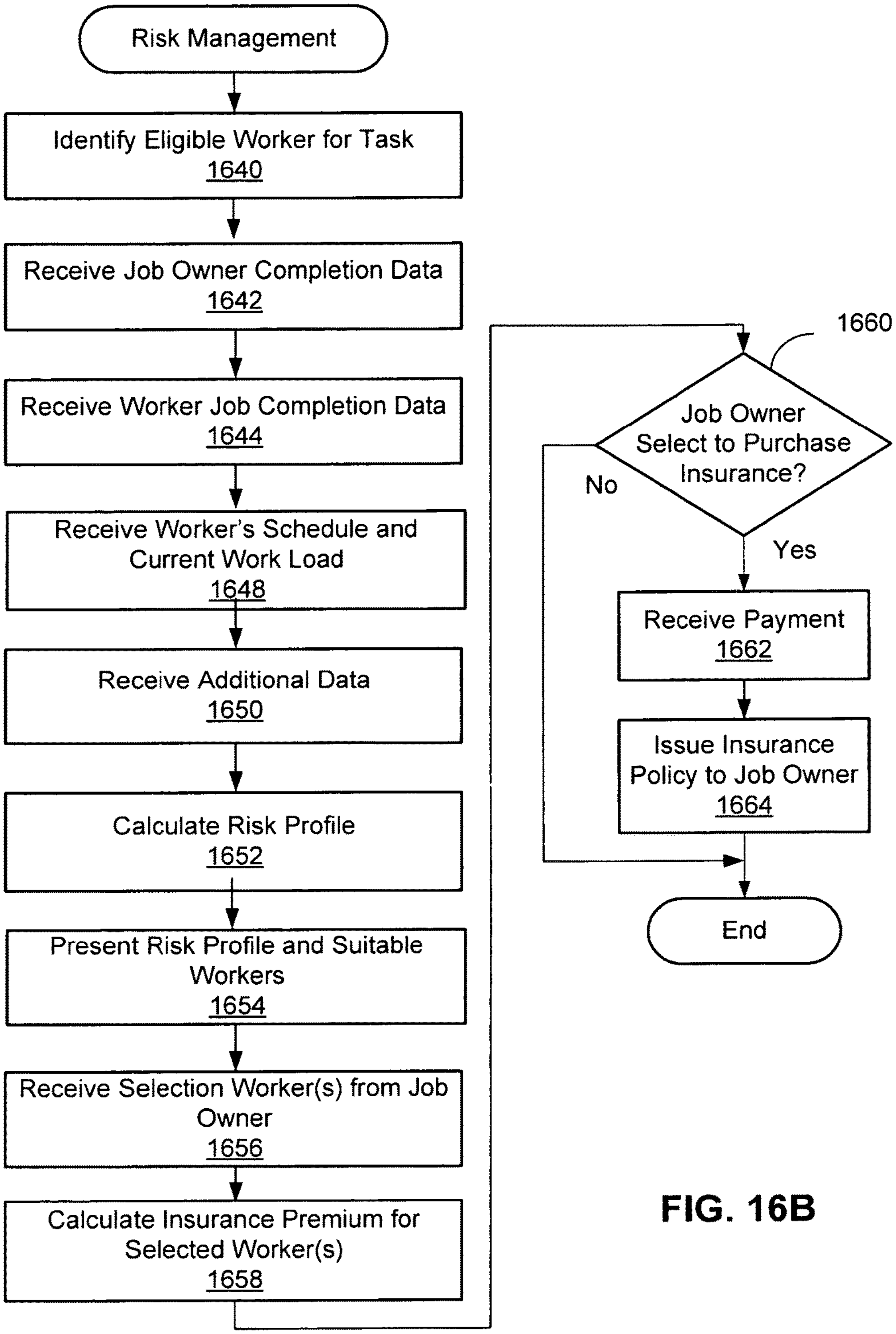
FIG. 16B is a flowchart illustrating a process of assessing risks associated with a job or task and issuing an insurance policy to a job owner, according to one embodiment.

FIG. 16B is a flowchart illustrating the process of assessing risks associated with a job or task and issuing an insurance policy to a job owner, according to one embodiment. First, the worker(s) eligible for the tasks are identified 1640 by the risk assessment engine 292. The risk assessment engine 292 receives 1642 job owner completion data 1620 from, for example, the data repository 240. The risk assessment engine 292 also receives 1644 worker job completion data 1622 from, for example, the data repository 240. The risk assessment engine 292 also receives 1648 the worker's schedule and the current workload of the worker. The workload of the worker indicates whether the worker has an unusually high volume of work for his profile, and hence, has greater odds of failing the task on time.

Additional information may also be received 1650 at the risk assessment engine 292. The additional information may include, among others, (i) data from social networking websites, (ii) entity data whether other workers closely associated with the worker or entities of which the worker is a member currently has heavy workload, and (iii) the schedule of the entities of which the worker is a member. The weight of various factors may be determined by statistical analysis.

Based on the received data, a risk profile associated with a worker or a set of workers are calculated 1652. The risk profile and workers suitable for minimizing the risk is presented 1654 to the job owner. Insurance premiums for covering losses due to various scenarios (e.g., partial completion, incompletion, and late completion) is calculated 1658. It is then determine 1660 if the job owner selects to purchase any insurance policy. If the job owner declines to purchase an insurance policy, the process terminates. If the job owner decides to purchase an insurance policy, the process proceeds to receive 1662 payment for the insurance policy from the job owner. The insurance policy is then issued 1664 to the job owner. Then the process terminates.

In one embodiment, the work management server 160 issues an insurance policy that covers counter-party risk. The counter-party risk indicates the risk associated with a third party's inability to pay for the completed job or refusal to pay for the completed job. An insurance policy associated with compensate of the workers may also be provided.

Monitoring and Management of Job

Figure 17A:
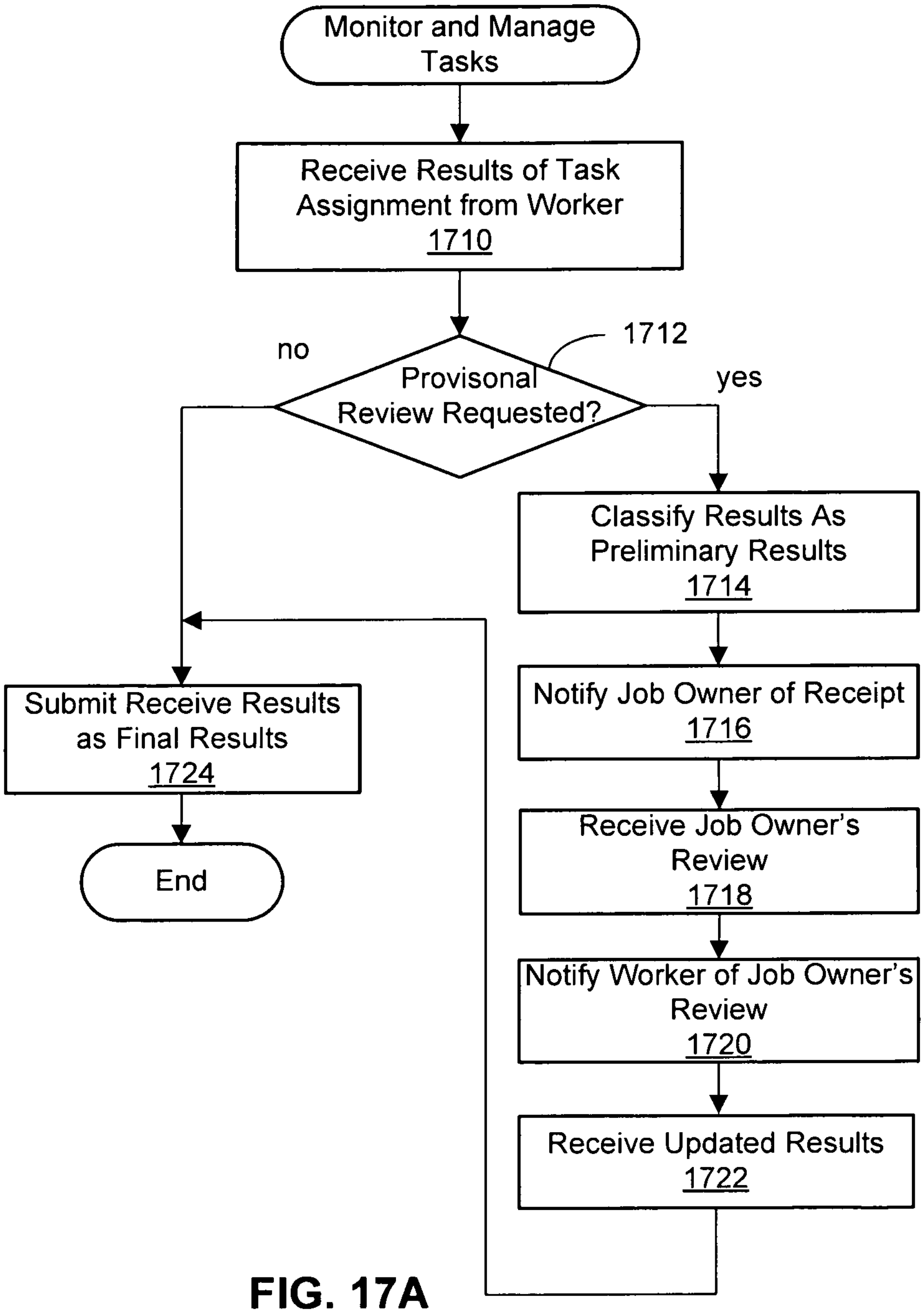
FIG. 17A is a flowchart illustrating a process of monitoring and managing tasks, according to one embodiment.

FIG. 17A is a flowchart illustrating the process of monitoring and managing tasks by a job owner, according to one embodiment. The tasks may be monitored to allow a job owner to detect any issues that may arise with respect to completion of the job. First, the work management server 160 receives 1710 results of the task from a worker. In one embodiment, the worker opens a task submission screen on the user terminal 130 or 140, and provides inputs associated with the results of the task.

In one embodiment, the work management server 160 offers the worker with the option of submitting the results of the task as provisional results for review by the job owner. In other cases, instead of submitting the provisional review, the results may be submitted in phases. If it is determined 1712 that the provisional review is requested, the received results are classified 1714 as preliminary results. The receipt of the preliminary results are then notified 1716 to the job owner.

The job owner reviews the preliminary results and provides the job owner's review of the preliminary results. In one embodiment, the review of the preliminary results is parceled out as a separate task to another worker. The work management system 160 receives 1718 the review, and notifies 1720 the worker of the job owner's review. After appropriate actions (if needed), the worker then uploads or submits the updated work or report on the status or findings to the work management server 160. The uploaded or submitted results are received 1722 at the work management server 160 and submitted 1724 as final results to the job owner.

In one embodiment, after receiving 1722 the updated results, the process may return to classifying 1714 the results as preliminary results and repeat the process until the results is approved.

In one embodiment, tasks are marked as complete or provisionally complete. Workers are then given an opportunity to submit tasks and receive feedback before the tasks are closed for reintegration into a job. In this way, workers may determine if enough time was spent on a task to provide good results while minimizing the risk of negatively affecting the job overall and their reputation by receiving interim feedback.

Figure 17B:
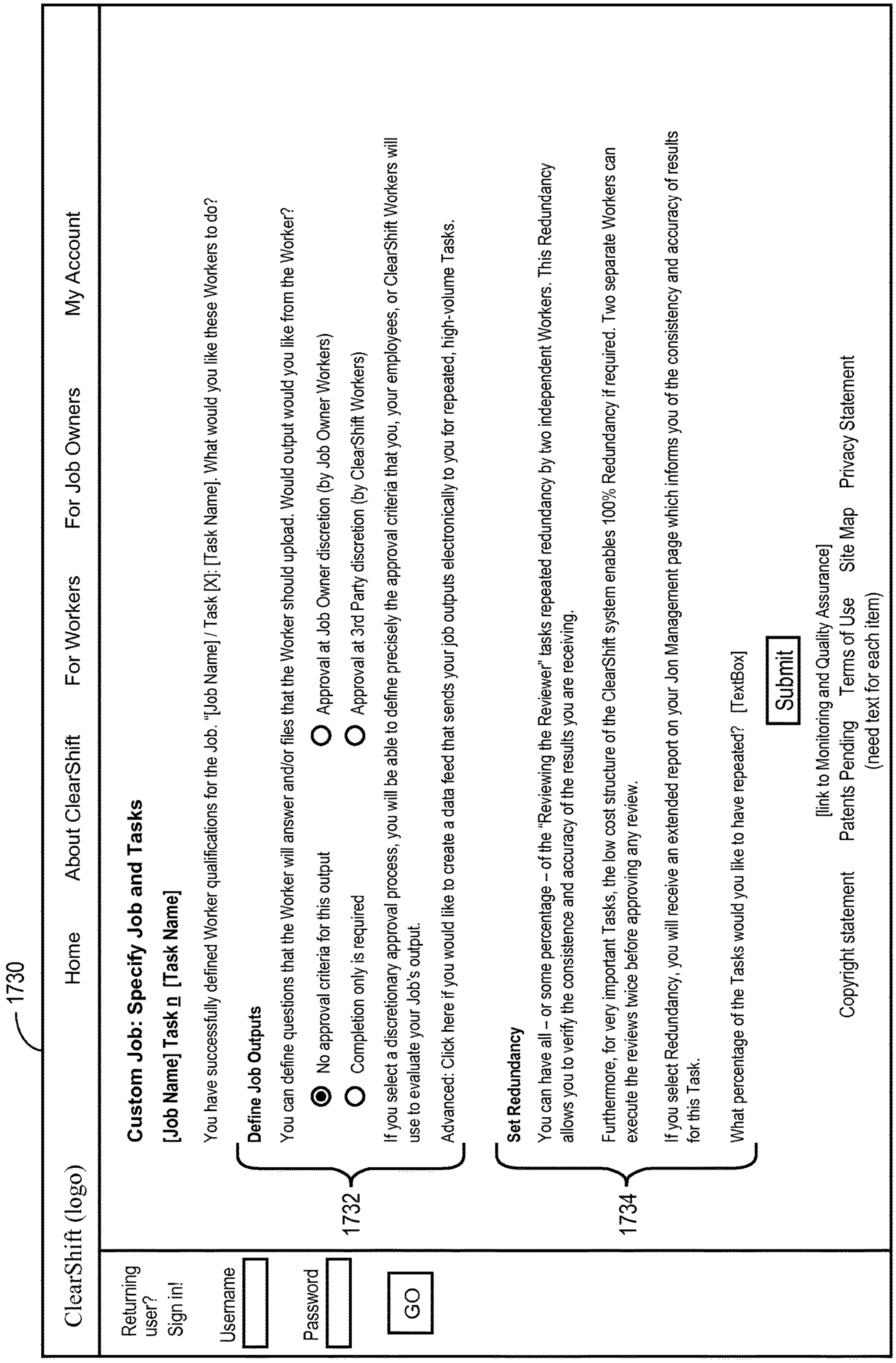
FIG. 17B is a graphic representation of a user interface displayed for setting an approval process for submitted task results and setting redundancy, according to one embodiment.

FIG. 17B is a user interface 1730 displayed for setting an approval process associated with submitting the result of a task and setting the redundancy of tasks, according to one embodiment. The user interface 1730 has an area 1732 that allows the job owner to set the criteria for completion of the task (e.g., approval). The user interface 1730 also allows the user to set redundancy in the task by setting the percentage that the tasks should be repeated by other workers.

FIG. 17C is a user interface 1740 displayed for setting up a process to monitor the progress of a job or task, according to one embodiment. The user interface 1740 may be presented after the job owner selects the requirements of approval in the user interface 1730 of FIG. 17B. The job owner may set who should review the results of the task using the user interface 1740. In one embodiment, the redundancy of tasks may be adjusted according to the progress of tasks to ensure the job is completed in time.

FIG. 17D is a user interface 1750 displayed for allowing a job owner to confirm the status of tasks, according to one embodiment. Under the name 1754 of the job owner, a text box 1752 is displayed listing the names of active jobs, the description of active jobs and the date jobs were activated. Tasks for each job are also listed in the text box 1752. In an area 1756 below the text box 1752, the following information is provided: (i) number of jobs completed, (ii) number of jobs outstanding (to be completed), (iii) total compensation per job, (iv) percentage of jobs completed, and (v) job expiration dates. A detailed report on each job results may be obtained by clicking a hyperlink 1758. Active jobs may be deactivated or deactivated jobs may be activated by clocking a toggle button 1760. For each task in the text box 1752, whether the task is dependent on other tasks is indicated. Further, for each task, the following information is displayed in the text box 1752: (i) the number of tasks completed, (ii) the number of tasks outstanding, (iii) the number of tasks completed, and (iv) specified compensation per task.

In one embodiment, the work management server 160 monitors the progress of tasks to determine the likelihood of completion of the tasks. The likelihood of completion may be assessed as decreasing as the time for completion approaches. As a job or a task is assessed as being unlikely to be successful, the efforts to evaluate the quality of the job or task may be increased or redundancy of the task may be increased (e.g., more workers assigned to the same task). Alternatively, the job or task may be abandoned if the successful completion of the job or task is unlikely.

In one embodiment, the work management server 160 automatically adds reviewers when it is determined that the projected quality of the work is below a threshold (e.g., certain fields of results are incomplete or partially filled in). The additional reviewers ensure that high quality results are delivered to the job owner in a timely manner.

In one embodiment, the work management server 160 predicts the timeliness of the response as the job or task is being performed for certain jobs, especially jobs with sequential or mutually exclusive tasks. The prediction may be based on prior results for the task and the worker. This approach could help prepare other workers ready for the next step to minimize the time needed to accomplish the job.

In one embodiment, the work management server 160 recursively determines the estimated time for the completion of a job based on a job description and past performance data for similar tasks, data of workers assigned the tasks, and past history of jobs from the same job owner.

In one embodiment, the work management server 160 distributes the tasks bidirectionally through a hub and spoke approach for places with limited infrastructure. Jobs may be delivered by agents who collect work and be compensated for the workers that the agents recruit.

In one embodiment, the work management server 160 provides in-progress feedback for work performance so that workers may find out in real-time if they are starting to make obvious mistakes and be warned or encouraged to improve the quality. If false data is used as a check, and that data trips Quality Of Service (QOS) detectors, then corrective advice can also be given. The work management server may also promote quality improvements through additional review or work, offering two options for additional work to ensure quality—expert review or redundancy addition.

In one embodiment, the likelihood of accomplishing a task is enhanced while reducing the cost of accomplishing the task by updating or modifying the task descriptions or subtask descriptions based on certain events (e.g., passing of time). For example, as the deadline for the job approaches, the payment associated with the tasks descriptions may be gradually increased by the workflow engine 258 so that more applicant workers are attracted to the tasks. As the number of applicant workers increase, the likely of completing the task also increases.

Concealing User Identity

Some job owners and workers may want to maintain their identity anonymous when using the work management server 160. The job owners may want to keep their identity anonymous, for example, to maintain security or to access a larger pool of workers outside their organizations or enterprises without revealing that the jobs or tasks are being offered outside the companies or enterprise. The workers may also want to maintain their identity hidden because, for example, the workers are "moonlighting" and do not want to be known that the workers are taking other jobs outside their primary work. The identity of workers or job owners, however, must be capable of being tracked so that the workers or the job owners can be held accountable for obligations owed to other parties using the work management server 160.

Figure 18A:
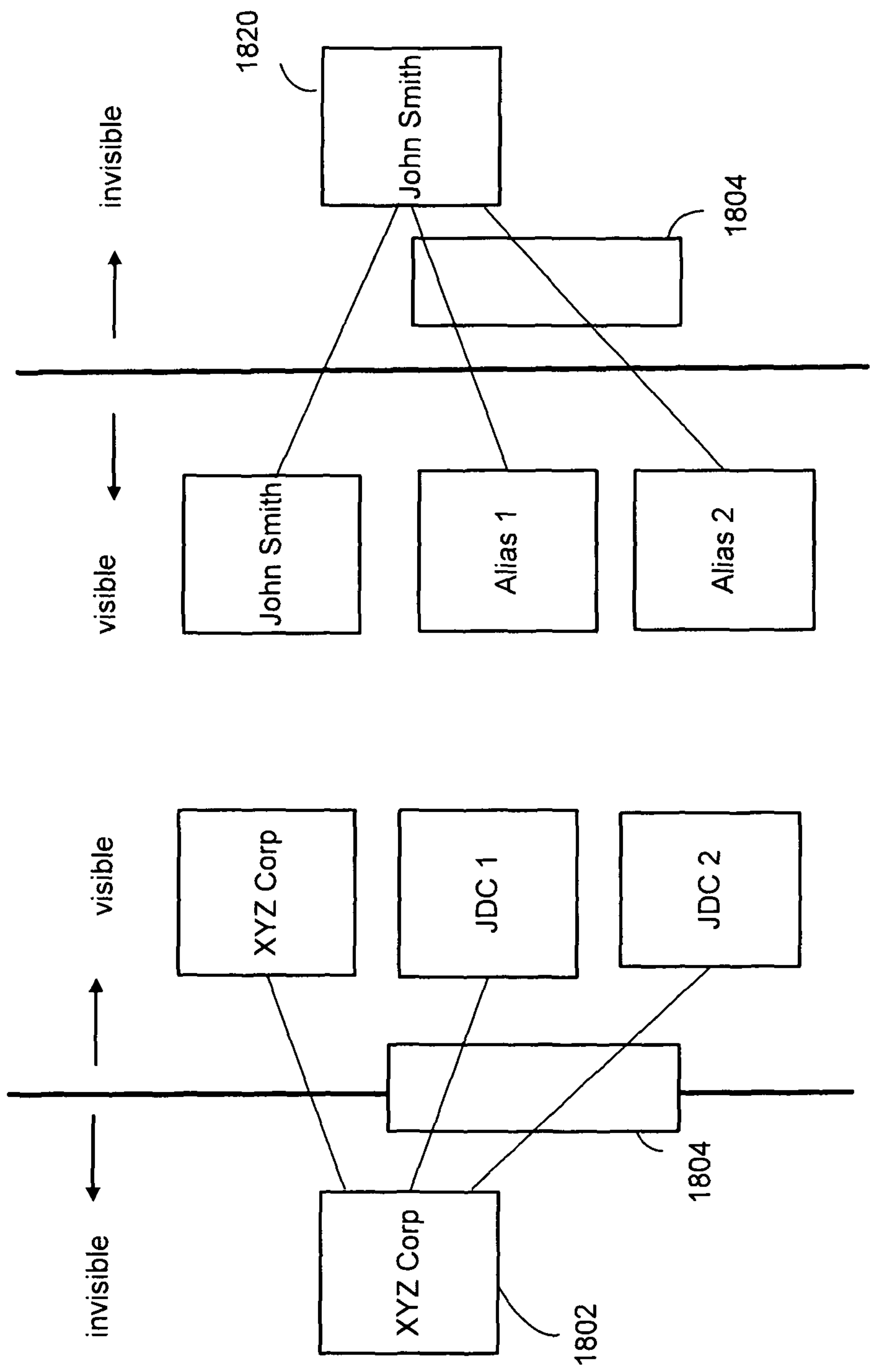
FIG. 18A is a block diagram illustrating operation of an anonymizer module in a work management system, according to one embodiment.

FIG. 18A is a diagram illustrating the operation of an anonymizer module 1804 in the work management system 110, according to one embodiment. A worker 1820 is shown on the right side of FIG. 18A, and a job owner 1802 is shown on the left side of FIG. 18A. The worker 1820 and the job owner 1802 may reveal their identity to each other ("John Smith" or "XYZ Corp"). In addition to or as a substitute to the real identity (XYZ Corp, John Smith), the worker 1820 and/or the job owner 1802 may generate aliases (Alias 1, Alias 2, JDC 1, JDC 2) via an anonymizer module 1804. When interacting through the aliases, the true identity of a party is not revealed to the other party. The security level of the job owner is transferred to all identities (real and alias) so that it may be difficult for the job owner to infer the identity of the job owner from the security level of an alias.

The alias is traceable by the worker management server 160 when needed. In this way, the true identity of the worker or the job owner may be traced to hold the worker or job owner accountable for fails to pay or failure to deliver the tasks. In one embodiment, a worker or job owner is allowed to register only a single real entity for all transactions through the work management server 160 but allowed to generate multiple aliases for different times or tasks.

Figure 18B:
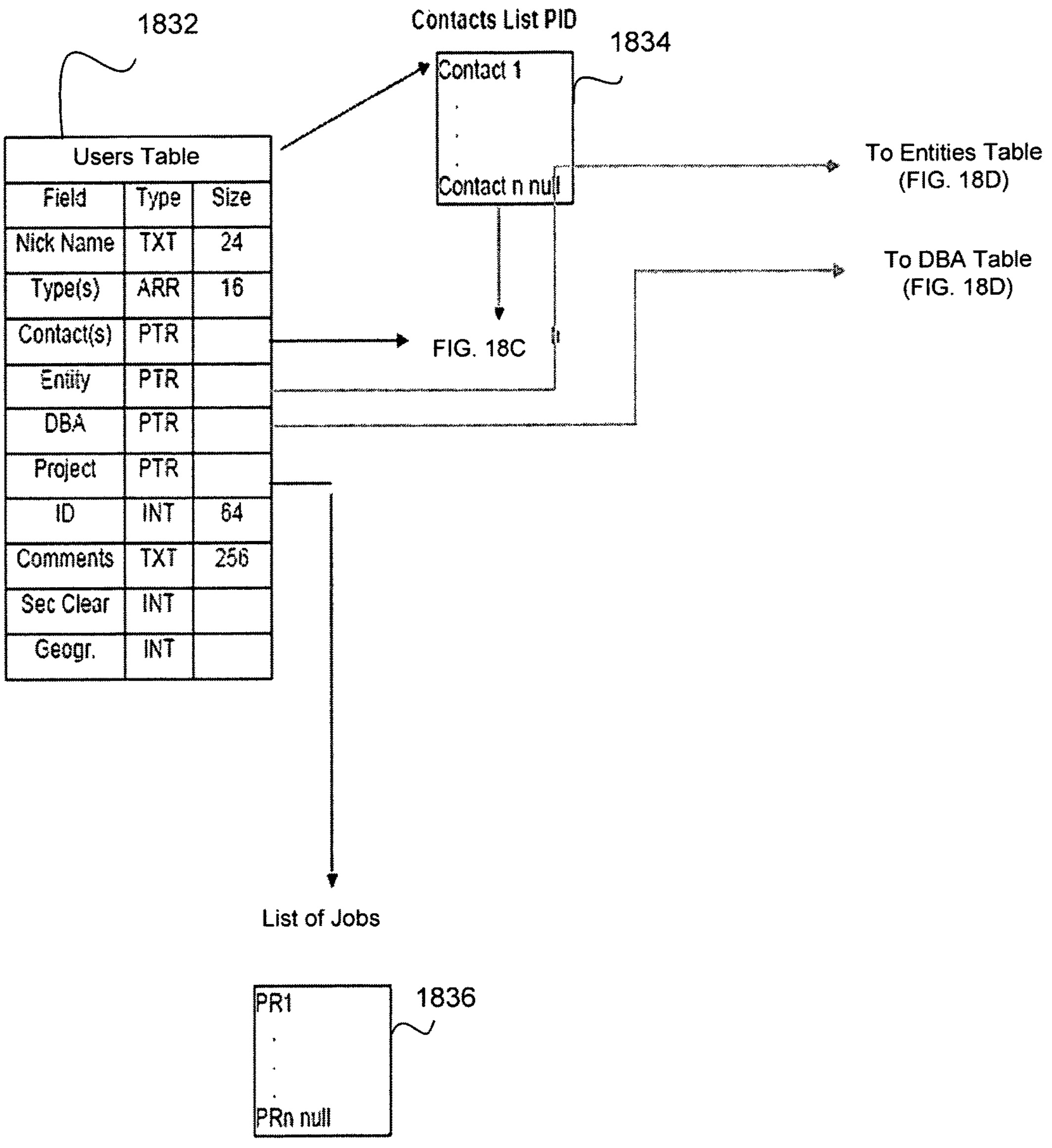
FIG. 18B is a diagram illustrating relationships between a users table and related data structures, according to one embodiment.

FIG. 18B is a diagram illustrating the relationships between a users table 1832 and related data structures, according to one embodiment. The users table 1832 includes information about the users of the work management system 110. The users includes, among others, job owners, workers, and intermediators. The user table 1832 may include, among other fields, Nick Name (indicating nick name or identity used in the work management system 110), Type of user (e.g., job owner, worker or intermediator), contact information of the user (includes a pointer to a contacts table 1840 in FIG. 18*c*), entity information including a pointer to an entity table 1850 associated with the user, Doing Business As (DBA) field (includes a pointer to a DBA table 1852 storing information about an aliases of the user), projects (jobs or tasks associated with the user), a unique ID of the user, comments about the user, security clearance field (security clearance level of the user), and geography field (indicating which field the user is associated with). The user table 182 is associated with at least one entry in the contacts list PID (Personal ID) table 1834 that provides a unique indexing key for each users table.

Figure 18C:
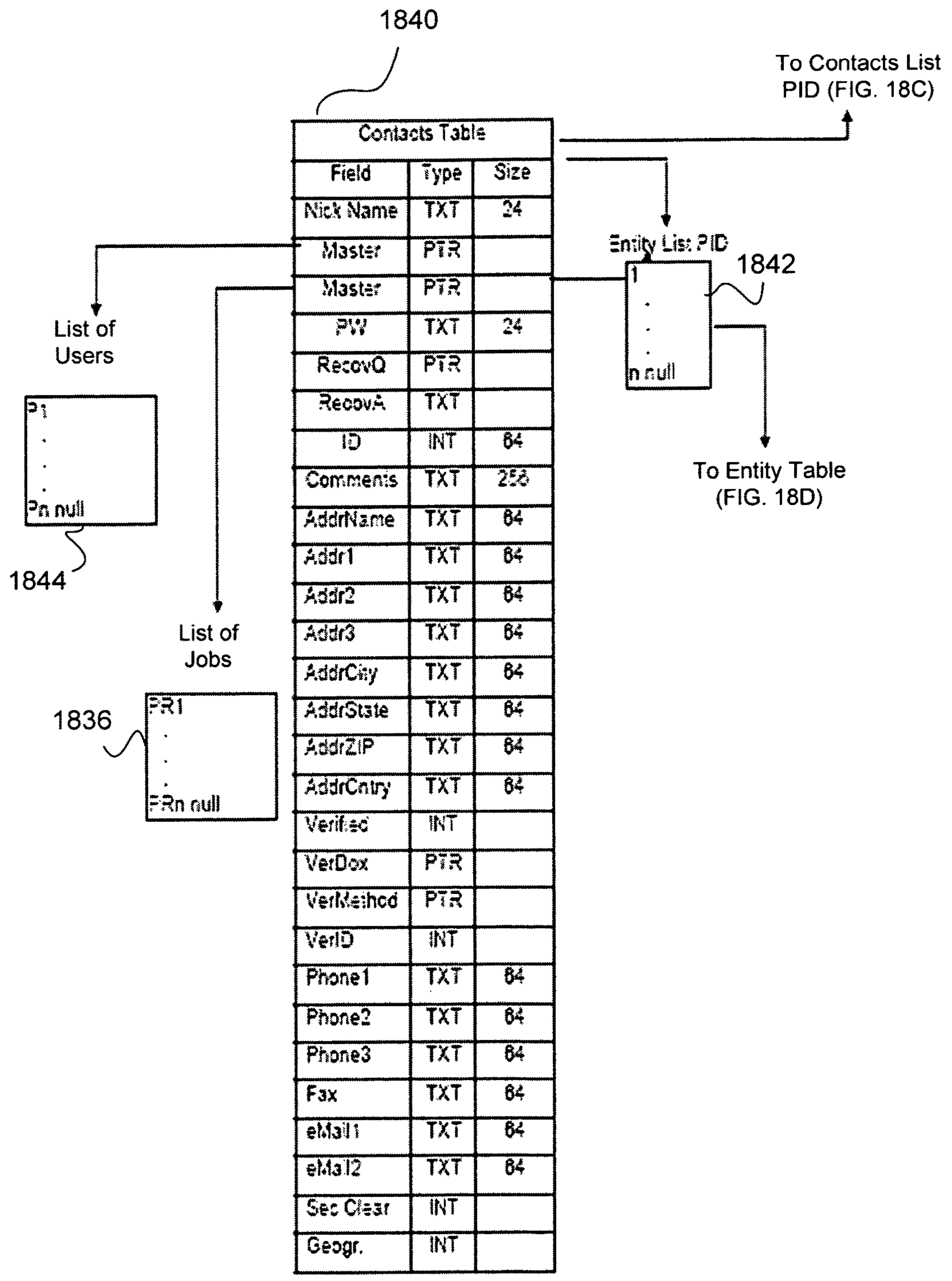
FIG. 18C is a diagram illustrating relationships between a contacts table and related data structures, according to one embodiment.

FIG. 18C is a diagram illustrating the relationships between the contacts table 1840 and related data structures, according to one embodiment. The contacts table 1840 includes various fields associated with the contact information of the user. The contact table 1840 is associated with a list 1844 of users, a list 1836 of jobs, the contacts list PID 1834, and the entity table 1850 via an entity list PID 1842. The entity list PID 1842 list a unique indexing key for each entity table 1850.

FIG. 18D is a diagram illustrating the relationships between the entity table 1850, a DBA table 1852 and related data structures, according to one embodiment. An entity includes one or more individual as members, as described above. The entity table 1850 includes information associated with entities. The entity table 1850 is associated with a DBA list PID 1854 pointing to the DBA table 1852 associated with the entity. The DBA List PID 1854 includes unique indexing keys for the DBA table 1852. The DBA table 1852 is associated with an alias of a user or an entity, and includes fields to indicate the information about the alias.

Figure 18E:
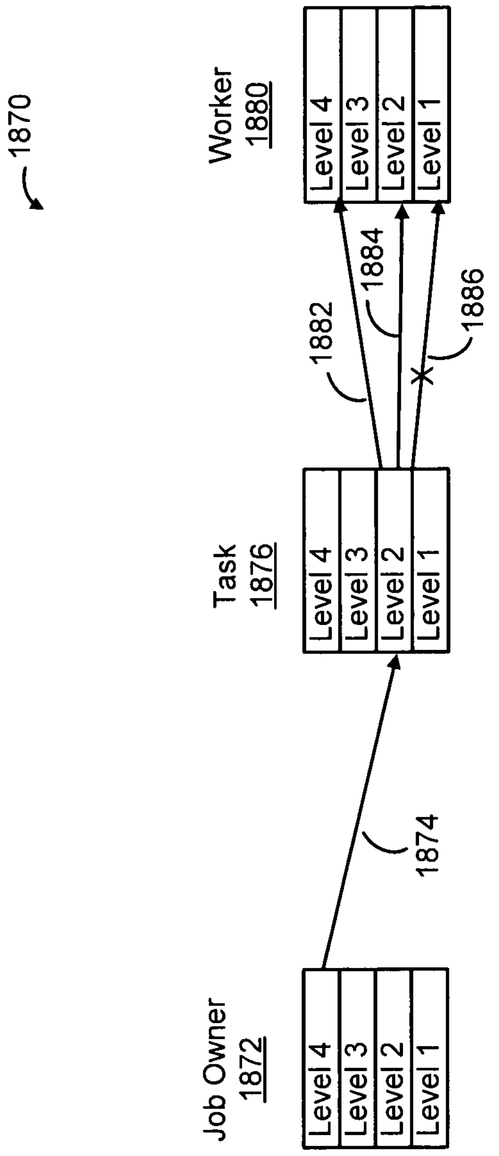
FIG. 18E is a block diagram illustrating operation of security settings in a work management system, according to one embodiment.

FIG. 18E is a diagram illustrating the operation of security settings in a work management system, according to one embodiment. In the embodiment of FIG. 18E, job owners are assigned one of four security level ratings: level 1 (lowest level) through level 4 (highest level). Tasks from the job owners are also assigned one of four security level ratings: level 1 (lowest level) through level 4 (highest level). Similarly, workers are assigned one of four security level ratings. The security setting is described, for example, in Security Clearance fields in the users table 1832, the contacts table 1840, the entity table 1850 and the DBA table 1852.

Assuming that a job owner 1872 has a level 4 rating but has listed a job 1876 with security level 2, as indicated by an arrow 1874. A worker 1880 looking at the job listing, may not see that the job owner has security level 4; rather, the worker 1880 sees only that the listed task has a security level 2. The job owner's security level may be visible or invisible to the worker. The worker 1880 is allowed to take on tasks having security level the same as or lower than the worker's security level. If the worker 1880 has any one of security levels 2 through 4, the worker 1880 may take the task 1876 (indicated by arrows 1882 and 1884). However, if the worker 1880 has security level 1, the worker 1880 may not take the task (indicated by arrow 1886).

The anonymizer module 1804 in conjunction with the task group manager 1402 may assist an organization or enterprise with multiple entities to assign works to other internal entities or outside entities. The entities in the organization or enterprise may be loosely associated to operate under a free market system. That is, entities in the same organization or enterprise may compete for similar or same tasks. The anonymizer module 1804 hides the identity of the entities from other job owners or the workers using the work management system 110 so that the entities in the same organization or enterprise may compete without knowing that the competing entities belong to the same organization or enterprise. In one embodiment, a task is made available only to other entities in the same organization or enterprise without revealing the entity posting the task. Alternatively, a task may be made available to other entities in the same organization or enterprise for a certain period of time. If no entity in the same organization or enterprise applies for the task within the set time, the task is then made available to entities or workers outside the organization or enterprise.

Security Enhancements

Figure 19:
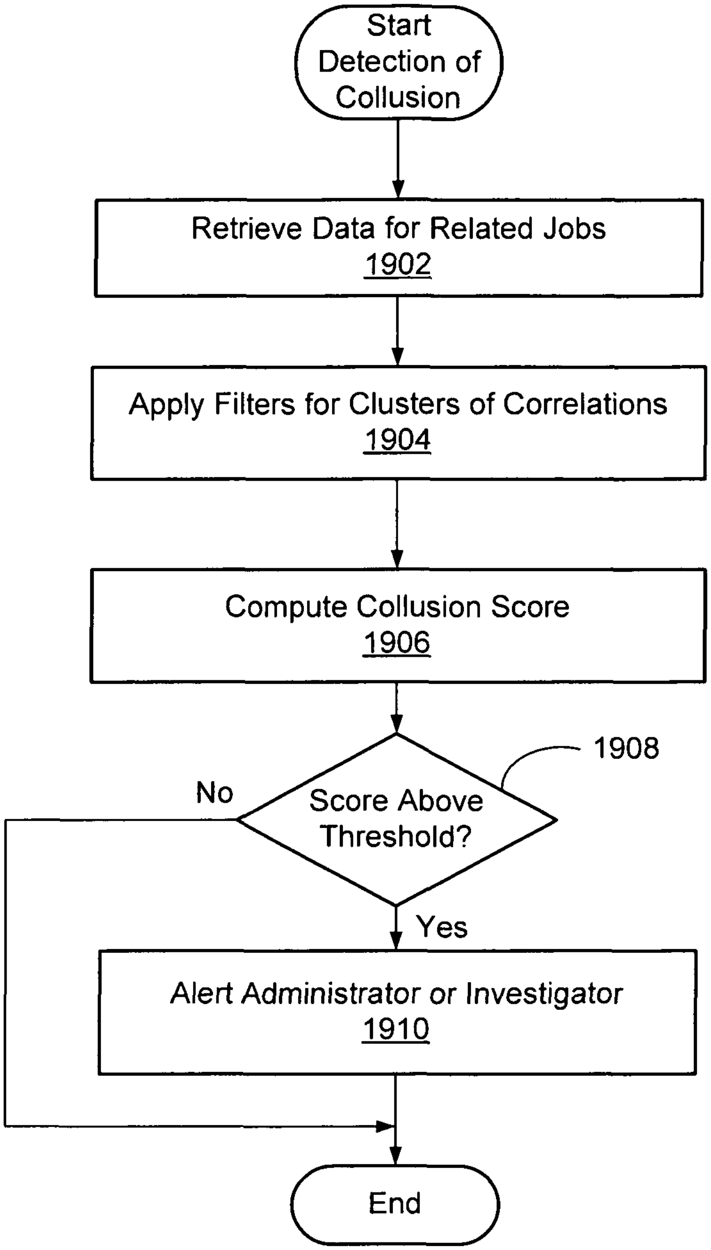
FIG. 19 is a flowchart illustrating a process of detecting collusion in a work management system, according to one embodiment.

FIG. 19 is a flowchart illustrating the process of detecting collusion in the work management system 160, according to one embodiment. Specifically, the work management system 160 identifies collusions in a worker copying results of tasks from another worker. The work management system 160 first retrieves 1902 data for related jobs. The data retrieved includes results such as movie reviews from the local data repository 240. The work management system 160 then applies 1904 filters to identify clusters of correlations in the data. A collusion score based on the clusters of correlations are generated 1906. The collusion score may be based on various factors including whether workers often work together, whether the workers report the same results, and submit the reports at approximately the same time. If it is determined 1908 that the collusion score exceeds a threshold, an administrator or an investigator is alerted 1910 of possible collusion. If the collusion score does not exceed the threshold, the process ends. The administrator or investigator may be trusted workers hired using the work management system 110.

In one embodiment, collusion among workers may be detected by a correlation search for results, based on sign-up proximity, geography or time. If results for tasks are oddly similar, and the workers providing those results signed up very close to each other in space or in time, then the results are flagged for evaluation for possible collusion.

When entities (or teams) are being created with workers of different skill sets, there is a risk of collusion workers are allowed to form the entities (or teams) instead of generating the entities (or teams) by the work management system 160). To avoid collusion, entities (or teams) may only be created anonymously by the work management server 160.

Alternatively, the work management server 160 may offer multiple IDs (identities) for job completion. Multiple IDs are used to provide anonymity for workers, job owners, and information about a job, to avoid collusion. IDs are never re-used, and are changed as frequently as is practicable—such as per session. There can be different IDs for each entity, such as each job having a different ID for each person who views it. This prevents individuals from viewing a job at the same time to sign up with the intent of collusion.

Figure 20:
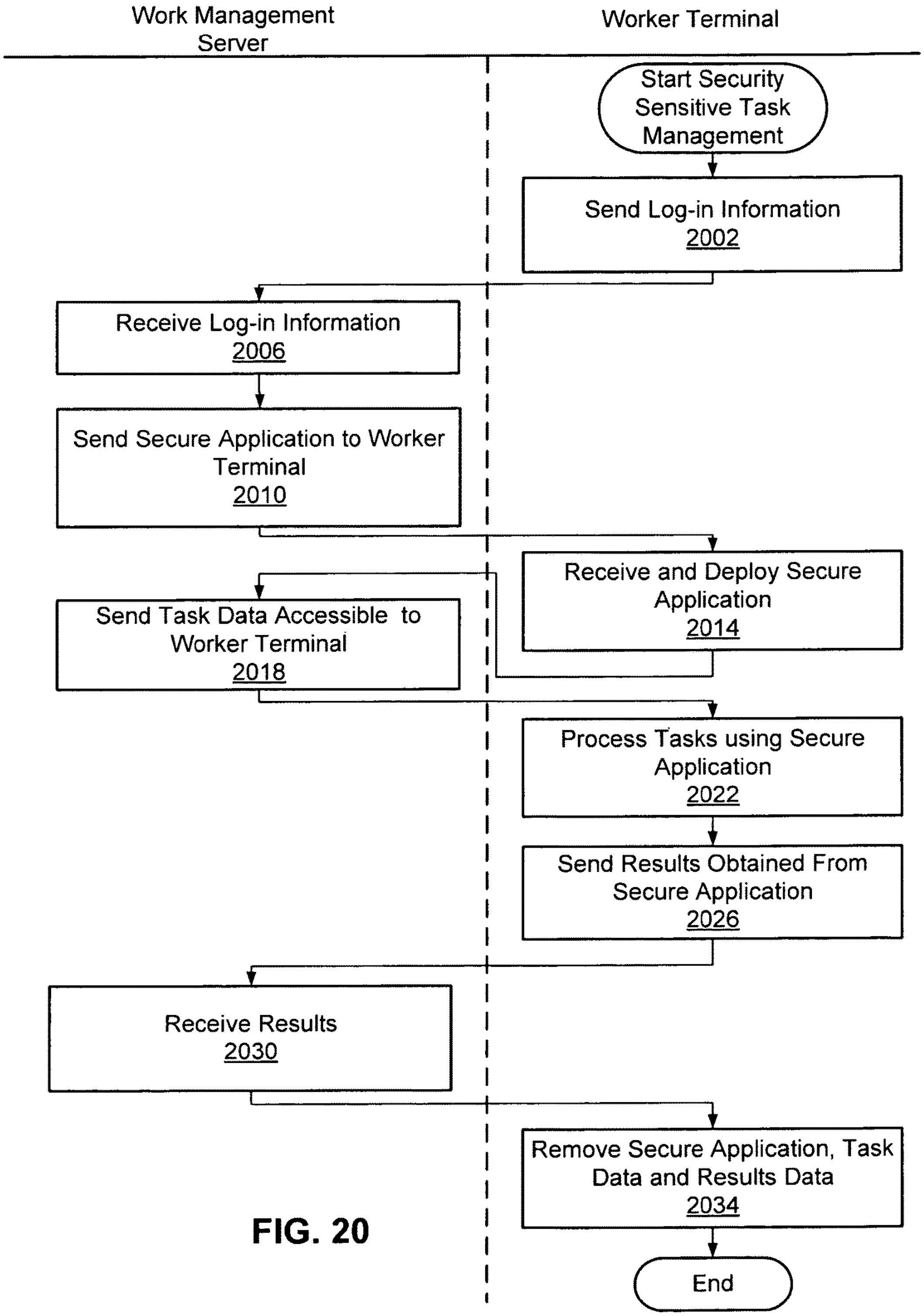
FIG. 20 is a flowchart illustrating a process of performing a security sensitive task using a work management system, according to one embodiment.

FIG. 20 is a flowchart illustrating the process of performing a security sensitive task using a work management system, according to one embodiment. First, a worker sends 2002 log-in information to the work management server 160 to access available tasks. The work management server 160 receives 2006 the log-in information in accordance with any security procedures that are required for the worker's security level (e.g., a password, a thumbprint or retinal scan). The work management server 160 then sends 2010 a secure application to the worker's terminal. The worker's terminal receives and deploys 2014 the secure application.

The work management server 160 then sends 2018 the task data to the worker terminal. The task data is accessible only through the deployed secure application. Known techniques may be used to secure the task data from being copied (for example, through encryption of task data). The worker then performs the task using the secure application and the task data. The worker terminal may process 2022 any data associated with the results of the task during this process. The results of the task are then sent 2026 to the work management server 160, and the worker's terminal is cleaned up to remove 2034 any residual data (e.g., secure application, task data and results data) associated with the task.

There is always a risk that someone may use a camera to photograph data displayed on the screen. In one embodiment, such risk is minimized by limiting the screen size and the image quality.

In one embodiment, information in the form or tables or table-like formats (e.g., spreadsheets or databases) may be made anonymous by masking the headers of the table entries, allowing data checks to be performed on data alone without the headers (e.g., confirming the sums of a column in a table without revealing what the numbers represent).

In one embodiment, text documents are processed to alter the text. First, a search algorithm is used to identify occurrences of a word or term in the text. Then the words or terms in the text are replaced by another word or term. The worker performs task using the altered text, and returns the altered task back to the original status after the task is completed. The portions of texts to be modified may include at least one capitalized letter as indicator of a flagged work. In other cases, for example, black lists may be submitted along, of words or other specific information to be rendered unrecognizable. In yet other cases, for example, such information may be underlined or otherwise highlighted, and then replaced before sending out the modified text. For example, any occurrence of a word "Iraq" may be replaced with "Funland4335" for translation, then after translation, changed back to "Iraq."

In one embodiment, processed data can be made anonymous and re-used to check future tasks with a new value—known good input and output from a task. For example, if a skilled worker replaces a word with another word in a translation task, then the translation quality of other workers may be assessed by checking wither similar changes were made by the other workers.

For security sensitive task data, the communication may be sent over a secure channel instead of a web-based network. Also, links in a template to outside websites may be allowed only in certain circumstances, to avoid spam, phishing and other security risks. Only certain fields could be linked to ad hoc content, such as movies. In other cases, only certain types of content would be allowed for linking.

Automatic Survey Generation

Users of the work management system 110 may need to prepare surveys to pose questions to other users of the work for various reasons. For example, a job owner may want to ask questions to workers before assigning tasks to the workers or ask questions that need to be answered as part of the task assigned. The survey generator 288 of the work management server 160 facilitates the process of generating the survey and collecting answers to the survey.

Figure 21:
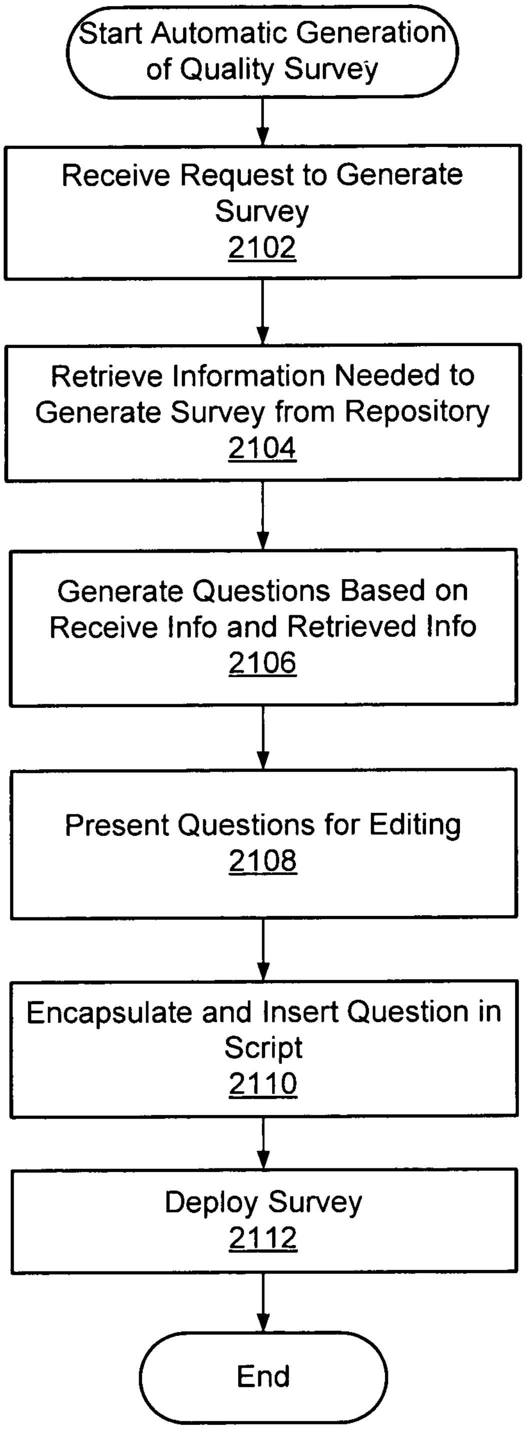
FIG. 21 is a flowchart illustrating a process of automatically generating a survey using a work management system, according to one embodiment.

FIG. 21 is a flowchart illustrating the process of automatically generating a survey on a work management system, according to one embodiment. First, a request to generate a survey is receive 2102. The work management server 160 retrieves 2104 information required for generating the survey from the user. The survey generator 288 may, for example, present questions in Appendix to receive information from a survey requestor to generate a survey.

The survey generator 288 generates 2106 questions based on the request and retrieved information. The generated questions are then presented 2108 to the person requesting the survey for editing. The resulting survey, including any response templates generated by the survey generator 288 as part of the survey is encapsulated 2110 in a code module (e.g., in a script). The survey is then deployed 2112 in the work management server 160 for presentation to users or stored in the local repository 240. In one embodiment, the computer language (e.g., script) is protected by a password or other security features according to preferences set by the survey requestor. Then the process ends.

In one embodiment, a system to evaluate a survey form may be employed to determine rating completeness. The completeness of the rating may be determined, for example, by evaluating the number of checkboxes marked on a survey form. Weights may be added and expanded to other "completion" ratios.

Reviewing User Evaluation

Figure 22:
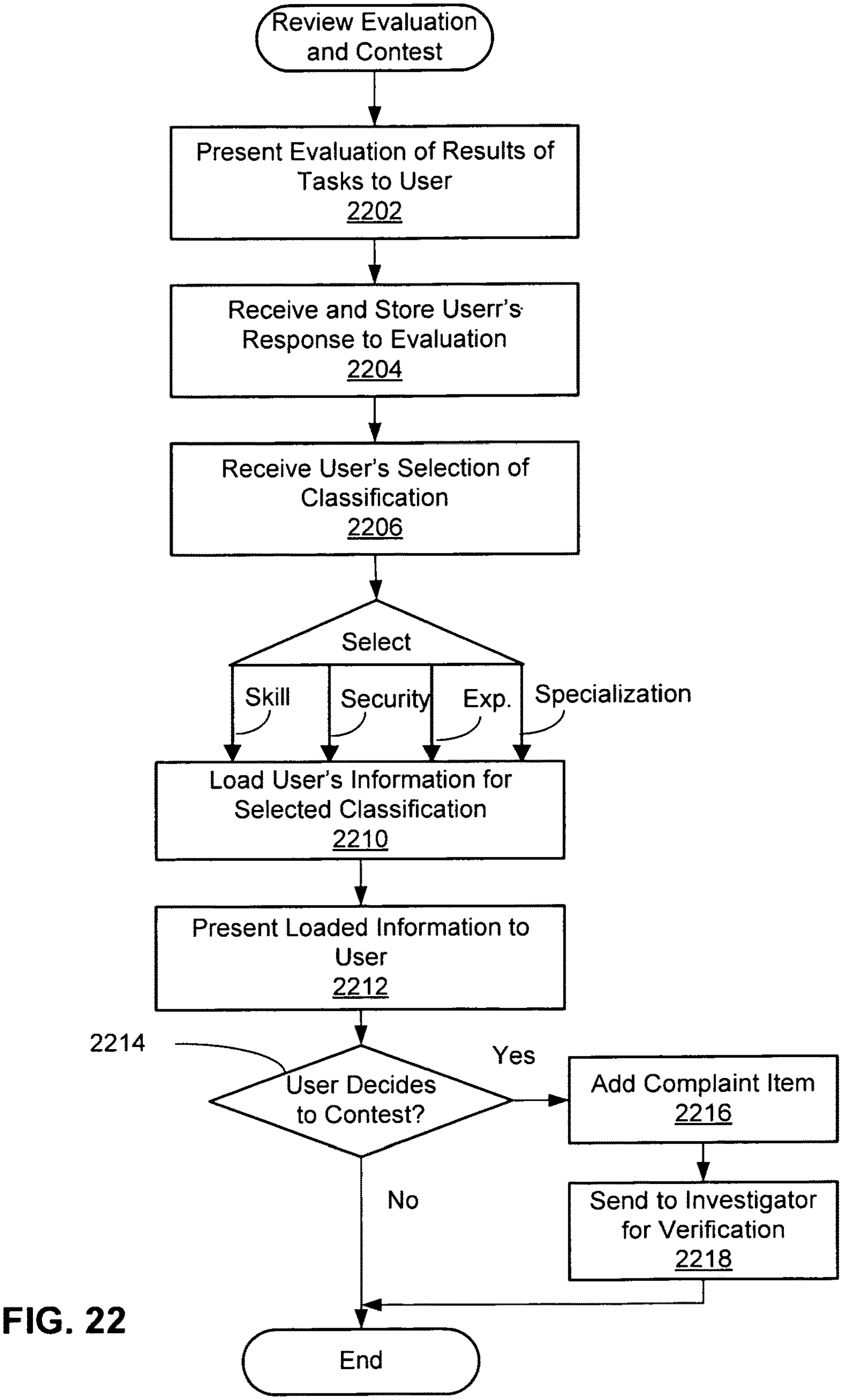
FIG. 22 is a flowchart illustrating a process of evaluating and contesting the result of a task, according to one embodiment.

FIG. 22 is a flowchart illustrating the process of evaluating and contesting the result of a task, according to one embodiment. The evaluation associated with tasks, classes or other qualification efforts the user made is presented 2202 to the user. The user's response to the evaluation is then stored 2204 in the local repository 240. The work management server 160 reviews current information about the user's classification and receives 2206 the user's classifications for review. In one embodiment, the classifications are organized into four characteristics: skill, security, experience and specialization.

The work management server 160 then loads 2210 the user's achievements and comments into the selected classification. The user is presented 2212 with information such as earned badges (for past work) or certifications (for past training). The user can also review how the user's ranking in these areas can be increased. A system of certifications may be used to measure fitness of a worker for a given task or category of tasks (e.g., language or speed requirements).

It is then determined 2214 whether the user wants to contest the content of the classifications (for example, a badge or review about the user from other users). If the user decides to contest, the user's comments/complaints are added 2216 as a complaint item. The complaint item is then sent 2218 to an investigator to verify the user's allegations. The complaint item may be sent to an arbitrator for review. The process then terminates. If the user deems the selected classifications acceptable and does not wish to contest, the procedure terminates without adding 2216 or sending 2218 the complaint item to the investigator.

In one embodiment, a reviewing user may be evaluative based on the quality of his reviews to promote providing of fair, accurate, and useful reputation information. Also, additional approaches may be employed to create a single reputation score that is comparable even when different methods are used to create the score. For example, users may be asked to compare and rate their satisfaction with different rating systems, etc. Information between parties on either side of a reputation evaluation may be shared without compromising integrity or anonymity.

In one embodiment, the work management server 160 employs any one of several methods to automatically evaluate the quality of a completed task. For example, the percentage of blank fields filled in, the speed of execution or insertion of data with known accurate results may be analyzed for the quality of the completed tasks. When appropriate, the work management server 160 categorizes jobs based on how well the jobs can be evaluated. Jobs that can be rated precisely by an automated algorithm are categorized into one group and jobs that cannot be rated precisely measured re categorized into another category. Depending on the group that the task falls under, the reputation of the task performer after performance of the task may be adjusted accordingly. That is, the tasks that could be rated precisely are given more weight in updating the reputation of the task performer.

In one embodiment, the results of a task produced by a worker may be reviewed by another worker or an administrator of the work assignment system 110 instead of the job owner.

In one embodiment, the work management server 160 determines if a worker was fairly rated after evaluation. The work management server 160 detects that quality ratings from the job owner are out of line with automated quantitative measurement. For example, a job owner might say a job was done terribly, but accuracy and built-in data checks show that the results were fully compliant, this would flag the job owner's rating as "unfair."

In one embodiment, the work management server 160 includes a method of mixing quality standard evaluations from external and internal sources that uses different quality evaluation measurements to obtain a holistic view of the actual quality of the finished work. The work management server may also include a method of normalizing ratings based on the rated item, with normalization of ratings for multiple individuals providing a rating that can be normalized based on the total set of individuals who have rated that item in the past. Thus, for example, if worker A rates 5 out of a possible 10 in system X and 7 out of a possible 10 in system Y, and worker B rates 4 out of a possible 10 in system X and 5.5 out of a possible 10 in system Y, there would be a consistent conversion factor or rate of about 1.4 from system X to system Y. Additionally, the system could include a method of normalizing rating work. Ratings for different workers may be normalized based on track records. Rather than using a numeric conversion, the ranking of a person or item may be used to evaluate the worker. If worker A was $5^{th}$ percentile in an external system, presumably he should be in a similar percentile in the internal system. Accordingly, for comparable systems, the ranking should be comparable and can be used by itself or as a modulator in a numerical conversion, allowing for a relative rating to a worker's peers.

In one embodiment, the work management server 160 determines why certain work outputs are consistently rejected by job owners. By understanding why certain outputs are rejected, jobs likely to be rejected may be modified or improved to be more acceptable to the job owners. For example, for a task that requires production of a document, the document can be reviewed or scanned for readability, length or other characteristics that leads to the rejection. The work management server 160 may also provide a method of predicting the evaluation that the worker is likely to receive.

In one embodiment, if a task was completed within required descriptions, a limited range of evaluation scores are accepted. The range may be computed appropriately and uniquely for each combination of job, task, evaluator and worker. Whether the completed tasks satisfy the description may be evaluated by other workers or experts.

Example User Interfaces

Figure 23A:
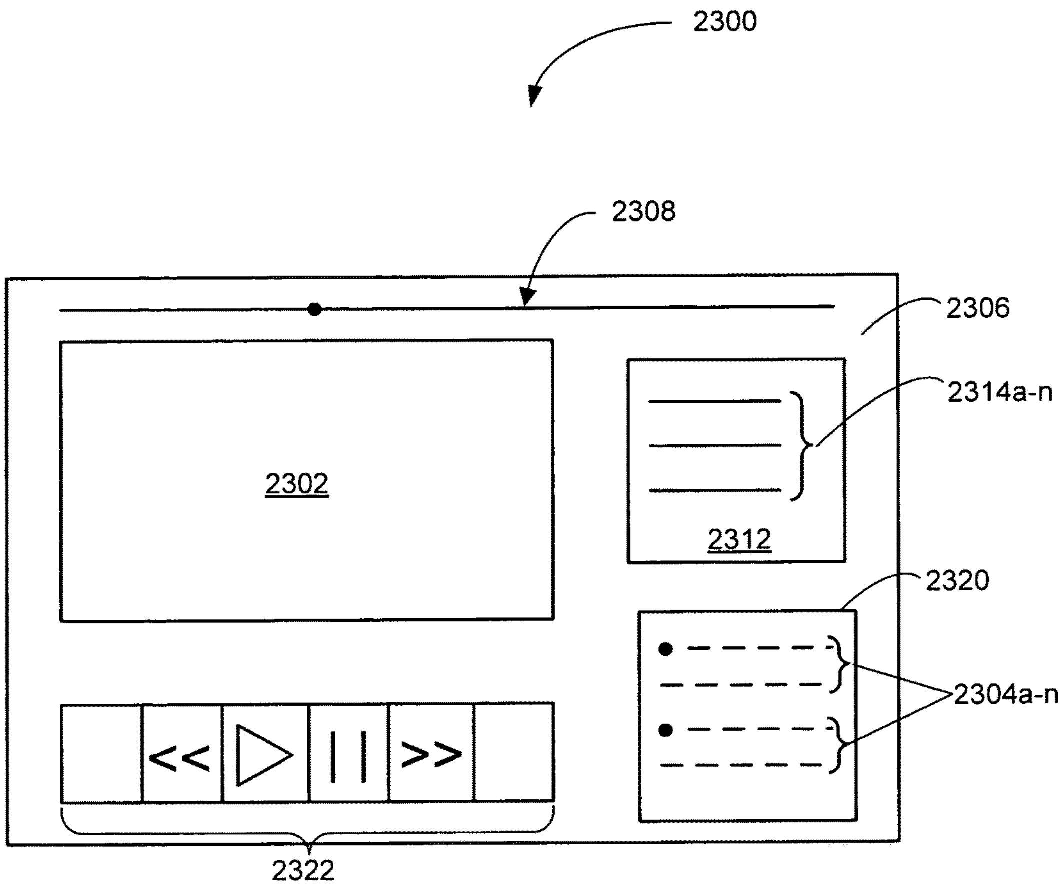
FIG. 23A is a graphic representation of a user interface for training a worker or for performing a task by a worker, according to one embodiment.

FIG. 23A is a user interface 2300 displayed for training a worker or performing a task, according to one embodiment. The user interface 2300 includes a video displayed in a window 2302. Controls 2322 and a progress bar 2308 showing current position are provided as standard features in the video player application shown in the user interface 2300. The user interface 2300 also includes a window 2312, which contains one or several instructions 2314*a-n*. The instructions may be pictures (graphical images) or even mini-videos (animated or moving images). When a selected scene appears in the window 2302, the video stream may be paused and an instructional video may be displayed in the window 2312 to explain the response or action expected from the viewer. In a window 2320, the worker may enter his results, comments, reactions, reports, or other information according to the instructions.

Figure 23B:
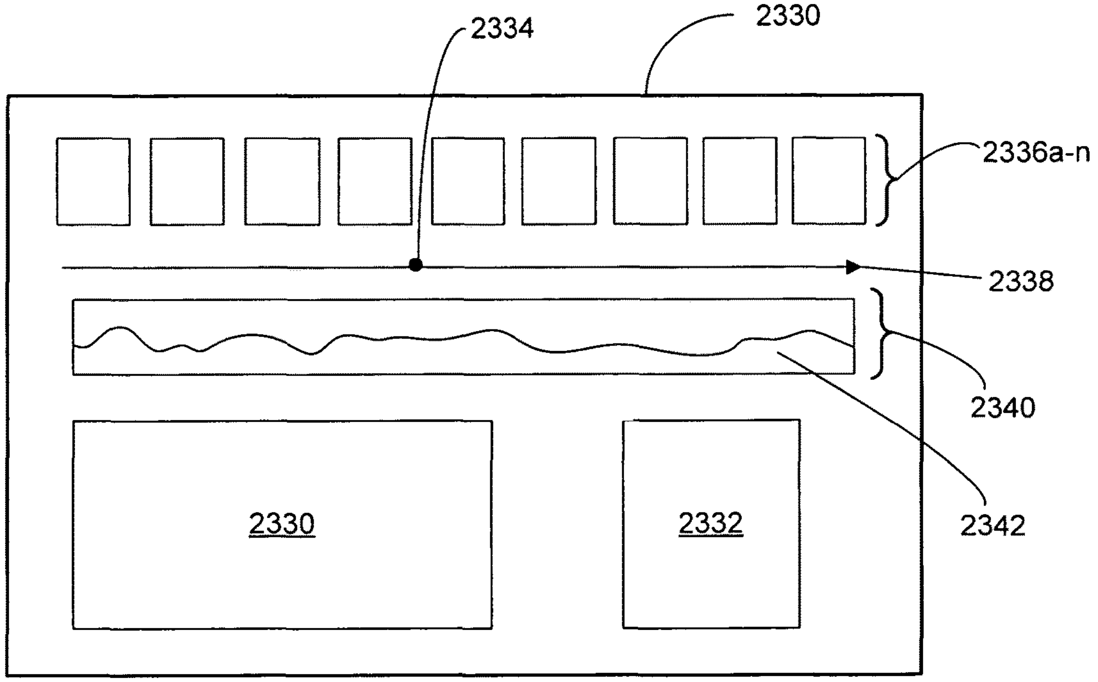
FIG. 23B is a graphic representation of a user interface for indicating major scene changes, according to one embodiment.

FIG. 23B is a user interface 2330 displayed for indicating major scene changes, according to one embodiment. A window 2330 displays a video. A window 2332 may display instructions and/or responses to the instructions (e.g., the contents of windows 2312 and 2320, as described above with reference to FIG. 23A). Also shown is a window 2340 containing a graph 2342. In this example, the graph 2342 represents a potentiometer of quality ratings, similar to what is done when movie studios conduct reviews of their films prior to release. Also shown is a progress bar 2338 with a position indicator 2334 of a current position. Storyboards 2336*a-n* indicating the transition to each new major scene is provided on the user interface 2330. The position of the position indicator 2334 in relation to the scenes in storyboards 2336*a-n* allows the user to understand the location of the scene in a video displayed in the window 2330 and compare the various scenes in the video to the corresponding state in graph 2342. The user interface 2330 may be used for the evaluation of results or for enhancing the actual review process. Portions of the user interface 2330 may be blanked out or hidden from the user at times to ensure that the users provide independently formed opinions.

Figure 23C:
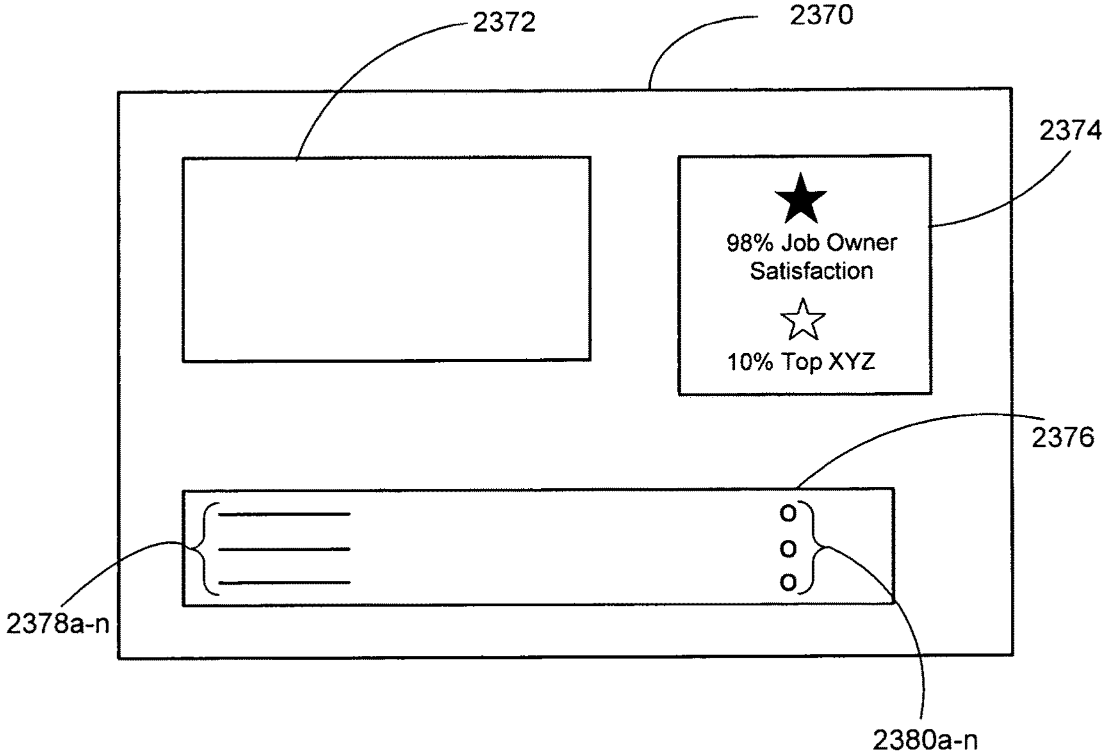
FIG. 23C is a graphic representation of a user interface displaying badges of accomplishments awarded to a worker, according to one embodiment.

FIG. 23C is a user interface 2370 displaying badges of accomplishments awarded to a worker, according to one embodiment. The user's data is shown in a window 2372. Available jobs or tasks are displayed in a window 2376, with each job 2378*a-n* listed separately. Additionally, the list of jobs 2378*a-n* is accompanied by indicators 2380*a-n* indicating capabilities ("badges") required for taking the job. Window 2374 is a space (need not be a separate window) where indicia of the user's badges are displayed when appropriate. The badges may be awarded to workers as indications of qualifications, endorsements, certifications, and other designations of accomplishments. Indicia of required badges 2380*a-n* may be highlighted if the user already has them, and may be grayed out or blinking if the user does not have them. Ways of earning additional badges may be displayed, for example, as a yellow exclamation mark or some other indicator. These indicators may be used to draw attention as well as to open additional windows, pop-ups or mouse-overs, etc., giving the user hints or links about how to earn these badges.

Alternative Embodiments

In one embodiment, an optimal team of workers may be recommended by the work management server 160. These teams could be suggested to job owners or workers who wish to assemble a team, and could be suggested in detail or in general terms. Multiple sets of expertise may be needed to best do certain kinds of work such as solving a puzzle or multiple language skills for certain kinds of translation. These teams could be assembled optimized to given factors (such as length, time, etc.) based on recommendations from the work management server.

In one embodiment, a job may be analyzed to improve the performance of tasks or subtasks based on desired parameters (e.g., faster accomplishment of work, and increased accuracy). The work management system may request a media file with higher audio resolution to increase the accuracy of transcription.

In one embodiment, the work management server also simultaneously integrates work and worker requirements by creating dynamic job descriptions that adjust the requirements (e.g., training and experience) for workers according to the job output to modify pre-work training, the task to be performed or payment dynamically.

In one embodiment, the work management server determines whether a worker has indeed performed a similar task in the past by receiving and verifying evidence associated with the past task. Compensation associated with the task may be differentiated based on whether such evidence was provided by the worker.

In one embodiment, the work management server assigns two or more tasks as a group to the same worker. Tasks such as answering to survey questions may be packaged with other time-consuming or highly sought-after work. In this way, unattractive tasks may be also be assigned.

In one embodiment, the work management server receives job templates not only from job owners but also from workers and job owners. The job templates submitted by the workers defines narrow variations of work that the workers are willing to provide at a given cost and time (e.g., creation of a will at a given price only if the preferred template is used).

In one embodiment, instead of offering a fixed price for a job completed by satisfying a single set of criteria, a range of prices may be offered depending on several factors. These factors may include, among others, the speed of completion and the level of completion. Under such a scheme, a worker may choose to produce a result up to a level that the worker prefers. The job owners may also optimize the tasks based on worker's preferences.

In one embodiment, non-monetary compensation may be provided in return for performing a task. The non-monetary compensation includes, among others, currency for use in an online environment (e.g., massively multiplayer online role-playing game (MMORPG)), special items or tokens or exchanging virtual and actual value.

In one embodiment, the work management server evaluates worker's training and productivity, calculates a total systemic profile of a worker's cost (including training, job matching) and outputs (work) instead of evaluating workers based solely on the output of workers. In this way, the "internal" value of a worker may be captured to determine if the workers should be laid off or be retained.

In one embodiment, a system of evaluations with staged revelation may be offered where ratings can be made private during periods of negotiation. For example, as a worker and a job owner are negotiating on a bulk work provision, the evaluation history of a party may be selectively kept confidential to the counterparty.

In one embodiment, the work management server also uses a method of auto-regression to judge training and reputation, determining the best variables to use to predict training effectiveness and reputation accuracy. Any variable with meaningful predictive strength may be used in the computation (regression).

In one embodiment, the worker is required to provide evidence that the task was performed to the work management server. The items and information submitted as evidence may be verified automatically.

In one embodiment, control data may be sent to workers for various reasons. The control data may be used, for example, to test worker's alertness, aid anonymity, improve the quality of task completion, develop worker reputations, and avoid potential worker collusion.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX

"Please choose the type of question you would like to ask:"
[DROP DOWN SELECT: Choice - One Answer (Radio Buttons), Choice-One Answer (Drop Down), Choice - Multiple Answers (Check Boxes), Heading, Image, Name and Address (General), Date and Time, Open Ended - One Line, Open Ended - Comments Box, Rating Scale - One Answer (Horizontal), Rating Scale - Matrix, Ranking Question, Yes or No, Upload a File]

-continued

APPENDIX

[IF "Choice - One Answer (Radio Buttons)", THEN]
["Question?"
[Multi-line Text Box to allow the user to enter her question /direction]
"Answer Choices?"
[Multi-line Text Box in which survey creator can type answer choices. When displayed to the survey respondent, each choice is accompanied by a Radio Button.
[Checkbox] "If you click the box, the final answer will be "Other" with its own text field to allow a survey respondent to enter a different answer.]
Randomize order of answers? [Checkbox]
Mandatory to answer this question? [Checkbox]
[IF "Choice - One Answer (Drop Down)", THEN]
["Question?"
[Multi-line Text Box to allow the user to enter her question /direction]
"Answer Choices?"
[Multi-line Text Box in which survey creator can type answer choices. When displayed to the survey respondent, each choice is presented in a DROP-DOWN box.
[Checkbox] "If you click the box, the final answer will be "Other" with its own text field to allow a survey respondent to enter a different answer.]
Randomize order of answers? [Checkbox]
[IF "Choice - Multiple Answers (Check Box)", THEN]
["Question?"
[Multi-line Text Box to allow the user to enter her question /direction]
"Answer Choices?
[Multi-line Text Box in which survey creator can type answer choices. When displayed to the survey respondent, each choice is accompanied by a check box so that more than one selection can be made.
[Checkbox] "If you click the box, the final answer will be "Other" with its own text field to allow a survey respondent to enter a different answer.]
Randomize order of answers? [Checkbox]
Mandatory to answer this question? [Checkbox]
[IF "Heading", THEN]
[Multi-line Text Box in which the survey creator can type directions or other text that will be displayed to the survey respondent.]
[IF "Image", THEN]
[[Text Box][Browse...][Upload] functions allow image file to be uploaded to ClearShift. The image will be displayed to the survey respondent when completing the survey. The survey creator can "Add a caption." [Text Box] which will be displayed next to the image when the survey is delivered.]
[IF "Name and Address", THEN]
["Question?"
[Multi-line Text Box to allow the user to enter her question /direction wherein the answer must be an address. The inputs provided to the survey respondent when completing the survey will be the complete set of name and address fields]
Mandatory to answer this question? [Checkbox]
[IF "Date and Time", THEN]
["Question?"
[Multi-line Text Box to allow the user to enter her question /direction wherein the answer must be a date and time. The inputs provided to the survey respondent when completing the survey will be the MM/DD/YY fields.]
Mandatory to answer this question? [Checkbox]
[IF "Open Ended - One Line", THEN]
["Question?"
[Multi-line Text Box to allow the user to enter her question /direction wherein the answer will be open-ended and entered via a one-line text box. The Survey Respondent will input her answer to a one-line text box.]
Mandatory to answer this question? [Checkbox]
[IF "Open Ended - Comment Box", THEN]
["Question?"
[Multi-line Text Box to allow the user to enter her question /direction wherein the answer will be open-ended and entered via a multi-line text box.]
Mandatory to answer this question? [Checkbox]

-continued

APPENDIX

[IF "Ratings Scale" - One Answer (Horizontal), THEN]
["Question?"
[Multi-line Text Box to allow the user to enter her question /direction.]
"Answer Options:"
"Select the number of options (answers) and then type in an option to correspond to each number."
[DROP DOWN Select 2 - 10]
[FUNCTION: Selecting the number in the drop down box reloads the page and designates the number of textboxes that immediately follow.]
1. [Text box][Default = "Excellent"]
2. [Text box] [Default = "Good"]
3. [Text box] [Default = "Fair"]
4. [Text box] [Default = "Poor"]
5. ...Up to 10 Text boxes here
[These boxes enable the survey creator to generate a variety of responses that correspond to numerical values. This is for generating multiple choice, Likert scale questions (ex. "Rate my performance on a scale of 1 to 4 where 1 = Excellent and 4 = Poor")].
Mandatory to answer this question? [Checkbox]
[IF "Ratings Scale" - Matrix), THEN]
[Note: This type of question enables the survey taker to select ratings for several different aspects of a particular question (e.g., overall performance, and then efficiency, timeliness, quality, etc). The question and rating scale appears at the top and then each aspect of the question appears below. When filling out the answer options, the survey creator can select the number of options and then type in an answer label to correspond with each number.]
["Question?"
[Multi-line Text Box to allow the user to enter her question /direction.]
"Answer Options:"
[Multi-line text box. Each line in the text box corresponds to a specific aspect of the performance being rated in the main question specified immediately prior.
For example, the "Question" might be "How was our performance?" and each line in the multi-line text box might be Cleanliness, Responsiveness, Efficiency, etc. The survey respondent will respond to the same rating scale defined below for each of these aspects of the main question.]
"Select the number of options (answers) and then type in an option to correspond to each number."
[DROP DOWN Select 2 - 10]
[FUNCTION: Selecting the number in the drop down box reloads the page and designates the number of textboxes that immediately follow.]
6. [Text box][Default = "Excellent"]
7. [Text box] [Default = "Good"]
8. [Text box] [Default = "Fair"]
9. [Text box] [Default = "Poor"]
10. ...Up to 10 Text boxes here
[These boxes enable the survey creator to generate a variety of responses that correspond to numerical values. This is for generating multiple choice, Likert scale questions (ex. "Rate my performance") The ratings choice can be presented as radio buttons].
Mandatory to answer this question? [Checkbox]
[IF "Rankings)", THEN]
["Question?"
[Multi-line Text Box to allow the user to enter her question /direction]
"Answer Choices?"
[Multi-line Text Box in which survey creator can type the items that she wants the respondent to rank. Each line in the multi-line text box will become a new item to be ranked.]
[Checkbox] "If you click the box, the final answer will be "Other" with its own text field to allow a survey respondent to enter a different answer.]
Randomize order of answers? [Checkbox]
Mandatory to answer this question? [Checkbox]

-continued

APPENDIX

[IF "Yes or No", THEN]
["Question?"
[Multi-line Text Box to allow the user to enter her question /direction]
[Checkbox] "Click here to add a text box to request additional comment from the survey respondents."]
Mandatory to answer this question? [Checkbox]
[IF "Upload of File", THEN]
[[Text Box][Browse...][Upload] functions allow a file to be uploaded and shared with the survey respondent at the time of the survey.
Mandatory to answer this question? [Checkbox]

The invention claimed is:

1. A computer-implemented method for creating a customized task template in an online work-management system to accommodate information from partner systems comprising:

in a computing device including one or more data processors and memory storing executable code for at least one data processor to execute a plurality of control and web-based interface actions for providing task templates within a web-based user interface and receiving input data representative of modifications from a particular user into the task templates to directly connect to a particular user avatar representative of a user online persona for the particular user selected from a set of classified avatars used with partner systems hosting partner programs, including:

providing a first task template from a plurality of different task templates, by said one or more data processors and said executable code within the web-based user interface for display to said particular user and receiving within a first region of the first task template, by said at least one or more data processors and said executable code, at least one user input for said particular user to indicate information associated with the particular user avatar selected from the set of classified avatars, the information configured to generate a description defining at least one task;

obtaining, by said at least one or more data processors and said executable code, the information for accessibility to the partner systems including a plurality of websites, including a password and login operation provided through the web-based user interface from the partner systems, and upon receiving a user login, creating a link between two avatars identified from the set of classified avatars;

receiving within a second region of the first task template by said one or more data processors and said executable code, available options associated with the particular user avatar for said particular user, including 1) a selection of a leisure suit for a user avatar for certain recreation applications and 2) a business suit for a user avatar for business applications;

storing information by said one or more data processors and said executable code from within the first task template associated with the user avatars including user selections in a local repository and a database associated with the partner systems to allow users to combine activities with the partner systems based on linked avatars;

generating within a third descriptive region of the first task template, by said at least one or more data processors and said executable code, a task description for the task based on the user input and the description generated;

assigning, by said at least one or more data processors and said executable code, the task to a first user based on the task description, wherein the first user assigns at least part of the task to a second user through the web-based user interface;

sending for display, by said at least one or more data processors and said executable code, assignment information indicating the assignment of the task to the first user and the assignment of part of the task to the second user on at least one of user terminals used by the first and second users;

receiving, by said at least one or more data processors and said executable code, a first request to view a modified customized task template with one or more of the task, the part of the task, the assignment of the first user and the assignment of the second user, wherein one or more of the task, the part of the task, the first user, the second user and a task owner are assigned a linked avatar for both said first user and said second user;

responsive to receiving the first request, by the one or more data processors and said executable code, sending a first set of one or more linked avatars for display;

receiving, by at least one of the one or more data processors and said executable code, a second request to view the modified customized task template with one or more of the task, the part of the task, the assignment of the first user and the assignment of the second user;

sending, by at least one of the one or more data processors and executable code, a second set of one or more avatars for display, the second set of one or more avatars including at least one avatar different from that of the first set of one or more avatars for one or more of a task, a part of the task, an assignment of the first user and an assignment of the second user common to both the first request and the second request;

receiving, by at least one of the one or more data processors and executable code, a further modification to the customized task template including a task description from the first user defining the task, the task including at least a first subtask;

generating, by at least one or more data processors and executable code, a subtask description within the user interface, defining the first subtask based on the task description; and assigning by the web-based user interface the first subtask to the second user based on the subtask description.

2. The method of claim 1, wherein the task further includes a second subtask performed by the first user.

3. The method of claim 2, further comprising:

displaying, by the one or more data processors and said executable code, the subtask description responsive to assigning the task to the first user;

receiving, by at least one of the one or more data processors and said executable code, applications from a group of users for the subtask responsive to showing the subtask description; and receiving, by at least one of the one or more data processors and said executable code, a selection of the second user from the group of users responsive to receiving the applications.

4. The method of claim 3, wherein the first user is anonymized so that an identity of the first user is concealed from a task owner assigning the task to the first user.

5. The method of claim 4, further comprising:

receiving, by at least one or more data processors and executable code, applications for the task from a first set of users for a predetermined amount of time; and receiving, by the one or more data processors and executable code, applications for the task from a second set of users after the predetermined amount of time passed.

6. The method of claim 5, further comprising:

accessing, by at least the one or more data processors and executable code, an information source external to the online work-management system to search for users qualified for executing the subtask; and selecting, by at least the one or more data processors and executable code, the second user from the users searched from the external information source.

* * * * *